US012626112B2

(12) United States Patent
Kim

(10) Patent No.: US 12,626,112 B2
(45) Date of Patent: May 12, 2026

(54) NPU, EDGE DEVICE AND OPERATION METHOD THEREOF

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 1121 days.

(21) Appl. No.: 17/502,008

(22) Filed: Oct. 14, 2021

(65) Prior Publication Data

US 2022/0318606 A1 Oct. 6, 2022

(30) Foreign Application Priority Data

Apr. 1, 2021 (KR) ........................ 10-2021-0042950

(51) Int. Cl.
| | |
|---|---|
| *G06N 3/0455* | (2023.01) |
| *G06N 3/045* | (2023.01) |
| *G06N 3/0464* | (2023.01) |
| *G06N 3/063* | (2023.01) |
| *G06N 3/08* | (2023.01) |
| *G06N 3/09* | (2023.01) |

(52) U.S. Cl.
CPC ............. *G06N 3/063* (2013.01); *G06N 3/045* (2023.01)

(58) Field of Classification Search
CPC ........... G06N 3/063; G06N 3/045; G06N 3/08
See application file for complete search history.

(56) References Cited

U.S. PATENT DOCUMENTS

| | | | |
|---|---|---|---|
| 12,061,956 B1 * | 8/2024 | Pushkin | G06F 11/3688 |
| 2020/0090030 A1 * | 3/2020 | Huang | G06N 3/04 |
| 2020/0285891 A1 * | 9/2020 | Yellin | H04L 67/34 |

(Continued)

FOREIGN PATENT DOCUMENTS

| | | |
|---|---|---|
| KR | 10-2019-0096305 A | 8/2019 |
| KR | 10-2020-0110092 A | 9/2020 |
| KR | 10-2020-0139620 A | 12/2020 |

OTHER PUBLICATIONS

Yujeong Choi et al., "PREMA: A Predictive Multi-task scheduling Algorithm For Preemptible Neural Processing Units", 2020 IEEE International Symposium on High Performance Computer Architecture (HPCA), Sep. 6, 2019.

(Continued)

*Primary Examiner* — Nhat Huy T Nguyen
(74) *Attorney, Agent, or Firm* — Bridgeway IP Law Group, PLLC; Jihun Kim

(57) ABSTRACT

A neural processing unit (NPU) includes an internal memory storing information on combinations of a plurality of artificial neural network (ANN) models, the plurality of ANN models including first and second ANN models; a plurality of processing elements (PEs) to process first operations and second operations of the plurality of ANN models in sequence or in parallel, the plurality of PEs including first and second groups of PEs; and a scheduler to allocate to the first group of PEs a part of the first operations for the first ANN model and to allocate to the second group of PEs a part of the second operations for the second ANN model, based on an instruction related to information on an operation sequence of the plurality of ANN models or further based on ANN data locality information. The first and second operations may be performed in parallel or in a time division.

19 Claims, 47 Drawing Sheets

(56)　　　　　　References Cited

U.S. PATENT DOCUMENTS

| | | | | |
|---|---|---|---|---|
| 2022/0277231 | A1* | 9/2022 | Ostergaard | G06N 20/20 |
| 2022/0413934 | A1* | 12/2022 | Karri | G06F 9/5077 |
| 2024/0087303 | A1* | 3/2024 | Bufi | G06N 3/045 |

OTHER PUBLICATIONS

Yujeong Choi et al., "PREMA: A Predictive Multi-task Scheduling Algorithm For Preemptible Neural Processing Units", 2020 IEEE International Symposium on High Performance Computer Architecture (HPCA), Feb. 21, 2020, IEEE, KR.

\* cited by examiner

110

PE1

(N)bit          (M)bit

Multiplier ⟋111

(N+M)bit

Adder ⟋112

(N+M+log2(L))bit

Accumulator ⟋113  Initialization Reset (N+M+log2(L))bit (L)loops

Bit quantization unit ⟋114

(X)bit

1000

ORIGINAL          σ= 2.0          σ= 4.0          σ= 6.0

Restored (Car: 82%)

Ground truth (Car: 74%)

Blurred (Car: 61%)

NPU, EDGE DEVICE AND OPERATION METHOD THEREOF

CROSS-REFERENCE TO RELATED APPLICATIONS

This application claims the priority of Korean Patent Application No. 10-2021-0042950 filed on Apr. 1, 2021, in the Korean Intellectual Property Office, the disclosure of which is incorporated herein by reference.

BACKGROUND OF THE DISCLOSURE

Technical Field

The present disclosure relates to an artificial neural network.

Background Art

Humans have intelligence to perform recognition, classification, inference, prediction, control/decision making, and the like. Artificial Intelligence (AI) means artificially imitating human intelligence.

The human brain is made up of a multitude of nerve cells called neurons. Each neuron is connected to hundreds to thousands of other neurons through connections called synapses. The modeling of the working principle of biological neurons and the connection relationship between neurons operates to mimic human intelligence and is called an artificial neural network (ANN) model. In other words, an artificial neural network is a system in which nodes imitating neurons are connected in a layer structure.

The ANN model is divided into a monolayer neural network and a multilayer neural network according to the number of layers, and a general multilayer neural network consists of input layers, hidden layers, and output layers. Here, the input layer is a layer receiving external data, in which the number of neurons of the input layer is the same as the number of input variables; the hidden layer is located between the input layer and the output layer and receives a signal from the input layer to extract features and transmit the features to the output layer; and the output layer receives a signal from the hidden layer and outputs the received signal to the outside. The input signal between the neurons is multiplied and then summed by each connection strength with a value of zero (0) to one (1), and if the sum is greater than a threshold of the neuron, neurons are activated and implemented as an output value through an activation function.

In order to implement higher artificial intelligence, increasing the number of hidden layers of the ANN is referred to as a deep neural network (DNN).

On the other hand, the ANN model may be used in various edge devices, and the edge devices may use a plurality of ANN models depending on its type.

SUMMARY OF THE DISCLOSURE

However, in the case of using a plurality of artificial neural network (ANN) models, the inventors of the present disclosure have recognized a problem in that an optimized method is not present.

When a neural processing unit (NPU) is provided separately for each ANN model, the inventors of the present disclosure have recognized a problem in that the time that the NPU exists in an idle state is increased, which reduces efficiency.

Further, in the case of performing computations of the plurality of ANN models with one NPU, the inventors of the present disclosure have recognized a problem in that, absent the setting of an efficient operation sequence among the plurality of ANN models, a computation processing time is increased.

In order to solve the aforementioned problems, there is provided a neural processing unit (NPU). The NPU may include at least one internal memory for storing information on combinations of a plurality of artificial neural network (ANN) models, the plurality of ANN models including first and second ANN models; a plurality of processing elements (PEs) operably configurable to process first operations and second operations of the plurality of ANN models in sequence or in parallel, the plurality of PEs including first and second groups of PEs; and a scheduler operably configurable to allocate to the first group of PEs a part of the first operations for the first ANN model and to allocate to the second group of PEs a part of the second operations for the second ANN model, based on an instruction related to information on an operation sequence of the plurality of ANN models.

Each of the allocations by the scheduler may be further based on ANN data locality information.

The first operations for the first ANN model and the second operations for the second ANN model may be performed in parallel or in a time division.

The first group of the PEs and the second group of the PEs may be partially the same or completely different from each other. In other words, the first group of PEs may include at least one PE that is different from the second group of PEs and may include at least one PE that coincides with the second group of PEs.

The information on the operation sequence may include at least one of information on a layer, information on a kernel, information on a processing time, information on a remaining time, and information on a clock. The information on the layer may represent an ith layer among all layers of the first ANN model, and the second ANN model may be initiated after the ith layer of the first ANN model is initiated. The information on the kernel may represent a kth kernel among all kernels of the first ANN model, and the second ANN model may be initiated after the kth kernel of the first ANN model is used. The information on the processing time may represent a time elapsed after performing operations of the first ANN model, and the second ANN model may be initiated after the elapsed time. The information on the remaining time may represent a time remaining until completing operations of the first ANN model, and the second ANN model may be initiated before reaching the remaining time.

The information on the operation sequence of the plurality of ANN models may be stored in the at least one internal memory.

The scheduler may generate the instruction based on the information on the operation sequence of the plurality of ANN models.

The NPU may be mounted in an edge device, and the edge device may include a memory and a central processing unit (CPU) configured to execute commands for an application.

The memory of the edge device may be configured to store the information on the operation sequence of the plurality of ANN models.

The CPU of the edge device may generate the instruction when the CPU executes the commands for the application.

According to another aspect of the present disclosure, there is provided an edge device. The edge device may include a system bus; a memory electrically connected to the system bus; a plurality of neural processing units (NPUs) electrically connected to the system bus, the plurality of NPUs including first and second NPUs, each NPU including an internal memory for storing information on combinations of a plurality of artificial neural network (ANN) models, the plurality of ANN models including at least one first ANN model and at least one second ANN model, and a plurality of processing elements (PEs) operably configurable to process first operations and second operations of the plurality of ANN models in sequence or in parallel, the plurality of PEs including first and second groups of PEs; and a central processing unit (CPU) electrically connected to the system bus, the CPU configured to access the memory via the system bus and execute commands for an application, allocate a part of the first operations for the first ANN model to the first NPU or to the first group of PEs in the first NPU, and allocate a part of the second operations for the second ANN model to the second NPU or to the second group of PEs in the first NPU, wherein the CPU performs the allocations by considering information on an operation sequence of the plurality of ANN models.

According to another aspect of the present disclosure, there is provided a method for operating neural processing unit (NPU). The method may include allocating a part of first operations for a first artificial neural network (ANN) model of a plurality of ANN models to a first NPU or to a first group of processing elements (PEs) of a plurality of PEs in the first NPU; performing the part of the first operations for the first ANN model; and allocating a part of second operations for a second ANN model of the plurality of ANN models to a second NPU or to a second group of PEs of the plurality of PEs in the first NPU, wherein the allocations are performed based on an instruction related to information on an operation sequence of the plurality of ANN models.

According to the present disclosure, it is possible to simultaneously process a plurality of artificial neural network models in parallel through one NPU.

According to the present disclosure, since the high priority data is first maintained in the NPU internal memory, it is possible to increase a memory reuse rate by reusing the stored data.

According to the present disclosure, it is possible to reduce power consumption of the edge device by driving any artificial neural network model only in a specific condition.

According to the present disclosure, since the edge device includes the NPU capable of independently operating, it is possible to shorten the time delay and reduce the power consumption.

According to the present disclosure, the edge device has effects of providing convenience to users and simultaneously blocking a privacy data leakage problem while reducing power consumption.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
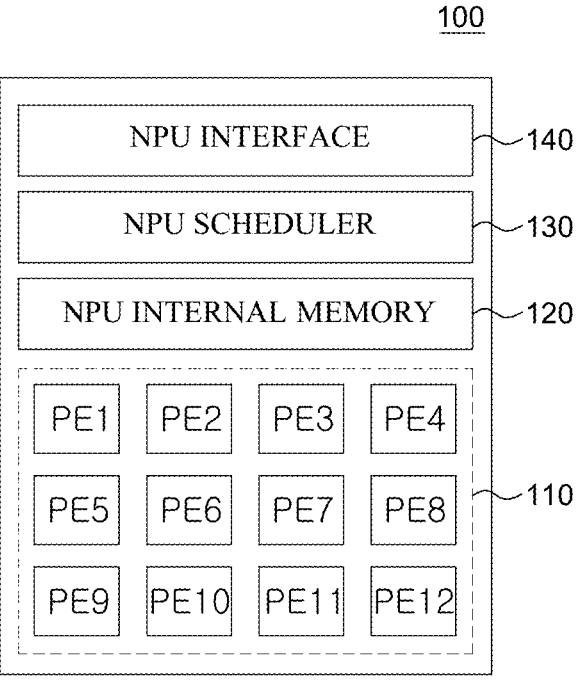
FIG. 1 is a schematic conceptual diagram illustrating a neural network processing unit according to the present disclosure.

Specific structural or phased descriptions for embodiments in accordance with the concepts of the present disclosure disclosed in the present disclosure or application are just exemplified for the purpose of explaining embodiments according to the concepts of the present disclosure. The embodiments according to the concepts of the present disclosure may be implemented in various forms and shall not be construed as limited to the embodiments described in the present specification or application.

Embodiments according to a concept of the present disclosure may have various modifications and specific embodiments will be illustrated in the drawings and described in detail in the present specification or application. However, this does not limit the exemplary embodiment according to the concept of the present disclosure to specific exemplary embodiments, and it should be understood that the present disclosure covers all the modifications, equivalents and replacements included within the idea and technical scope of the present disclosure.

Terms such as first and/or second are used for describing various constituent elements, but the constituent elements are not limited by the terms. The terms may be used merely for a purpose of distinguishing one component from other components and for example, a first component may be referred to as a second component, and similarly, the second component may be referred to even as the first component within a range without departing from the scope of the present disclosure according to a concept of the present disclosure.

It should be understood that, when it is described that a component is "coupled" or "connected" to the other component, the component may be directly coupled or connected to the other component, but there may be another component therebetween. In contrast, it should be understood that, when it is described that a component is "directly coupled" or "directly connected" to the other component, it is understood that no component is present therebetween. Meanwhile, other expressions describing the relationship of the components, that is, expressions such as "between" and "directly between" or "adjacent to" and "directly adjacent to" should be similarly interpreted.

Terms used in the present specification are used only to describe specific exemplary embodiments and are not intended to limit the present disclosure. A singular form may include a plurality of forms unless otherwise clearly indicated in the context. In the present specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present specification.

In the explanation of the embodiments, the description of the techniques that are known in the art and are not directly related to the present disclosure will be omitted. This is to be more clearly delivered without blurring the gist of the present disclosure by omitting the unnecessary description.

Terms used herein will be briefly summarized to help understand the present disclosure. For example, NPU, as an abbreviation of a neural processing unit, may mean a processor that is specialized for computations of an artificial neural network model separately from a central processing unit (CPU). ANN, as an abbreviation of an artificial neural network, may mean a network that connects nodes with a layer structure by imitating neurons in the human brain connected through a synapse for imitating the human intelligence. Information on structure of artificial neural network includes information on the number of layers, information on the number of nodes in the layer, information on the values of each node, and information on a computation processing method, information on a weight matrix applied to each node, etc. Information on data locality of an artificial neural network is information to predict a computation order of an artificial neural network model which is processed by the NPU based on a data access request order required to a separate memory by the NPU. DNN, as an abbreviation of a deep neural network, in order to implement higher artificial intelligence, may mean increasing the number of hidden layers of the artificial neural network. CNN, as an abbreviation of a convolutional neural network, means a neural network that performs a function similar to processing videos in the visual cortex of the human brain. The CNN is known to be suitable for video processing and is known to easily extract features of the input data and identify the patterns of features. Kernel may mean a weight matrix applied to the CNN.

Hereinafter, preferred exemplary embodiments of the present disclosure will be described in detail with reference to the accompanying drawings.

FIG. 1 illustrates a neural network processing unit according to the present disclosure.

Referring to FIG. 1, a neural network processing unit (NPU) 100 is a processor specialized to perform an operation for an artificial neural network (ANN).

The ANN refers to a network that is gathered with artificial neurons which multiply and add weights when inputting several inputs or stimuli and which additionally modify and transmit values added with a deviation through an activation function. This learned ANN may be used to output an inference result from the input data.

The NPU 100 may be an electric/electronic circuit implemented by a semiconductor. The electric/electronic circuit may mean that a large number of electronic devices (e.g., transistors, capacitors) are included. The NPU 100 may include a processing element (PE) array 110, an NPU internal memory 120, an NPU scheduler 130, and an NPU interface 140. Each of the processing element array 110, the NPU internal memory 120, the NPU scheduler 130, and the NPU interface 140 may be a semiconductor circuit in which a lot of transistors are connected. Thus, some of these components may not be identified and distinguished by the naked eye and may be identified only by an operation. For example, any circuit may operate as the processing element array 110 and may also operate as the NPU scheduler 130.

The NPU 100 may include the processing element array 110, the NPU internal memory 120 configured to store the ANN model which may be inferred in the processing element array 110, and the NPU scheduler 130 configured to control the processing element array 110 and the NPU internal memory 120 based on data locality information or information on a structure of the ANN model. Here, the ANN model may include data locality information or information on a structure of the ANN model. The ANN model may mean an AI recognition model that has been learned to perform a specific inference function.

The processing element array 110 may perform an operation for the ANN. For example, when the input data is input, the processing element array 110 may allow the ANN to perform learning. When the input data is input after the learning is completed, the processing element array 110 may perform an operation of deriving the inference result through the learned ANN.

The NPU interface 140 may, through a system bus, communicate with various components (e.g., a memory) in the edge device. For example, the NPU 100 may import the data of the ANN model stored in the memory 200 of FIG. 4A or 4B to the NPU internal memory 120 through the NPU interface 140.

The NPU scheduler 130 is configured to control a computation of the processing element array 110 for an inference computation of the NPU 100 and the read and write order of the NPU internal memory 120.

The NPU scheduler 130 may be configured to analyze data locality information or information on a structure of the ANN model to control the processing element array 110 and the NPU internal memory 120.

The NPU scheduler 130 may analyze or receive the structure of the ANN model to operate in the processing element array 110. The data of the ANN that may be included in the ANN model may store node data of each layer, arrangement data locality information or information on a structure of layers, and weight data of each connection network connecting nodes of each layer. The data of the ANN may be stored in the memory or NPU internal memory 120 provided in the NPU scheduler 130. The NPU scheduler 130 may access the memory 200 of FIG. 4A or 4B to utilize the data required. However, the present disclosure is not limited thereto; that is, the NPU scheduler 130 may generate data locality information or information on a structure of the ANN model based on data such as node data and weight data of the ANN model. The weight data may be also referred to as a weight kernel. The node data may be also referred to as a feature map. For example, the data defined in the structure of the ANN model may design the ANN model or may be generated when the learning is completed. However, the present disclosure is not limited thereto.

The NPU scheduler 130 may schedule the computation order of the ANN model based on the data locality information or the information on the structure of the ANN model.

The NPU scheduler 130 may acquire a memory address value in which the node data of the layer and the weight data of the connection network of the ANN model are stored based on the data locality information or the information on the structure of the ANN model. For example, the NPU scheduler 130 may acquire a memory address value in which the node data of the layer and the weight data of the connection network of the ANN model stored in the memory are stored. Accordingly, the NPU scheduler 130 may bring the node data of the layer and the weight data of the connection network of the ANN model to be driven from the memory 200 and store the data in the NPU internal memory 120. The node data of each layer may have each corresponding memory address value. The weight data of each connection network may have each corresponding memory address value.

The NPU scheduler 130 may schedule the computation order of the processing element array 110 based on the data locality information or the information on the structure of the ANN model, for example, the arrangement data locality information or the information on a structure of the layers of the ANN of the ANN model.

Since the NPU scheduler 130 schedules the computation order based on the data locality information or the information on the structure of the ANN model, the NPU scheduler 130 may operate differently from a scheduling concept of a general CPU. The scheduling of the general CPU operates to exhibit the best efficiency in consideration of fairness, efficiency, stability, reaction time, etc. That is, it is scheduled to perform the most processing at the same time by considering the priority, computation time, and the like.

A conventional CPU uses an algorithm for scheduling operations in consideration of data such as priority, computation processing time, etc. of each processing. In contrast, the NPU scheduler 130 may determine the processing order based on the data locality information or the information on the structure of the ANN model.

Furthermore, the NPU scheduler 130 may determine the processing order based on the data locality information or the information on the structure of the ANN model and/or the data locality information or the information on the structure of the NPU 100 to be used.

However, the present disclosure is not limited to the data locality information or the information on the structure of the NPU 100. For example, the data locality information or the information on the structure of the NPU 100 may determine the processing order by using one or more data of a memory size of the NPU internal memory 120, a hierarchy structure of the NPU internal memory 120, number data of processing elements PE1 to PE12, and a computer structure of the processing elements PE1 to PE12. That is, the data locality information or the information on the structure of the NPU 100 may include at least one or more data of a memory size of the NPU internal memory 120, a hierarchy structure of the NPU internal memory 120, number data of processing elements PE1 to PE12, and a computer structure of the processing elements PE1 to PE12. However, the present disclosure is not limited to the data locality information or the information on the structure of the NPU 100. The memory size of the NPU internal memory 120 includes information on a memory capacity. The hierarchy structure of the NPU internal memory 120 includes information on a connection relationship between specific layers for each hierarchy structure. The computer structure of the processing elements PE1 to PE12 includes information on components in the processing element.

According to an embodiment of the present disclosure, the NPU 100 may include at least one processing element, the NPU internal memory 120 configured to store the ANN model which may be inferred by at least one processing element, and the NPU scheduler 130 configured to control at least one processing element and the NPU internal memory 120 based on data locality information or information on a structure of the ANN model. In addition, the NPU scheduler 130 may be configured to further receive the data locality information or the information on the structure of the NPU 100. Further, the data locality information or the information on the structure of the NPU 100 may include one or more data of a memory size of the NPU internal memory 120, a hierarchy structure of the NPU internal memory 120, number data of at least one processing element, and a computer structure of at least one processing element.

According to the structure of the ANN model, the computation for each layer is performed sequentially. That is, when the structure of the ANN model is confirmed, the computation order for each layer may be determined. The computation order or the order of data flow according to the structure of the ANN model may be defined as the data locality of the ANN model at an algorithm level.

When the compiler compiles the ANN model to be executed on the NPU 100, the ANN data locality of the ANN model at the NPU-memory level may be reconfigured.

That is, the data locality of the ANN model at the NPU-memory level may be configured according to the compiler, the algorithms applied to the ANN model, and the operation characteristic of the NPU 100.

For example, even in the case of the same ANN model, the ANN data locality of the ANN model to be processed may be configured differently according to a method of computing the corresponding ANN model by the NPU 100, such as feature map tiling, a stationary method of processing elements, etc., the number of processing elements of the NPU 100, a cache memory capacity of a feature map, a weight, etc. in the NPU 100, a memory hierarchy structure in the NPU 100, an algorithm characteristic of a compiler that determines the order of the computation operation of the NPU 100 for computing the corresponding ANN model, etc. The reason is that even if the same ANN model is computed by the above-mentioned factors, the NPU 100 may differently determine the order of the data required every moment in a clock unit.

The compiler may determine the order of the data required for a physical computation processing by configuring the ANN data locality of the ANN model at the NPU-memory level in a word unit of the NPU 100.

In other words, the ANN data locality of the ANN model at the NPU-memory level may be defined as information to predict the computation order of the ANN model processed by the NPU 100 based on a data access request order requested to the memory 200 by the NPU 100.

The NPU scheduler 130 may be configured to store data locality information or information on a structure of the ANN.

That is, the NPU scheduler 130 may determine the processing order even if only the data locality information and/or the information on the structure of the ANN of the ANN model is used. That is, the NPU scheduler 130 may determine the computation order by using the data locality information or the information on the structure to an output layer from an input layer of the ANN. For example, the input layer computation may be scheduled in a first rank and the output layer computation may be last scheduled. Therefore, when the NPU scheduler 130 receives the data locality information or the information on the structure of the ANN model, an order of all computations of the ANN model may be determined. Therefore, it is possible to determine all scheduling orders.

Furthermore, the NPU scheduler 130 may determine a processing order by considering the data locality information or the information on the structure of the ANN model and the data locality information or the information on the structure of the NPU 100 and enables processing optimization for each determined order.

Accordingly, when the NPU scheduler 130 receives both the data locality information or the information on the structure of the ANN model and the data locality information or the information on the structure of the NPU 100, it is possible to further improve the computation efficiency of each scheduling order determined by the data locality information or the information on the structure of the ANN model. For example, the NPU scheduler 130 may acquire connection network data having weight data of three layers connecting the ANN layers of four layers and each layer. In this case, a method of scheduling a processing order based on the data locality information or the information on the structure of the ANN model by the NPU scheduler 130 will be described below as an example.

For example, the NPU scheduler 130 may configure input data for inference computation as node data of a first layer which is an input layer of the ANN model and schedule a multiplication and accumulation (MAC) computation of the node data of the first layer and the weight data of the first connection network corresponding to the first layer to be first performed. However, examples of the present disclosure are not limited to the MAC computation, and the ANN computation may be performed by using a multiplier and an adder which may be variously modified. Hereinafter, merely for convenience of the description, the corresponding computation is referred to as a first computation, a result of the first computation is referred to as a first computation value, and the corresponding scheduling may be referred to as a first scheduling.

For example, the NPU scheduler 130 configures the first computation value as the node data of the second layer corresponding to the first connection network and may schedule the MAC computation of the node data of the second layer and the weight data of the second connection network corresponding to the second layer to be performed after the first scheduling. Hereinafter, merely for convenience of the description, the corresponding computation is referred to as a second computation, a result of the second computation is referred to as a second computation value, and the corresponding scheduling may be referred to as a second scheduling.

For example, the NPU scheduler 130 configures the second computation value as the node data of the third layer corresponding to the second connection network and may schedule the MAC computation of the node data of the third layer and the weight data of the third connection network corresponding to the third layer to be performed for the second scheduling. Hereinafter, merely for convenience of the description, the corresponding computation is referred to as a third computation, a result of the third computation is referred to as a third computation value, and the corresponding scheduling may be referred to as a third scheduling.

For example, the NPU scheduler 130 configures the third computation value as node data of a fourth layer which is an output layer corresponding to the third connection network and may schedule an inference result stored in the node data of the fourth layer to be stored in the NPU internal memory 120. Hereinafter, merely for convenience for the description, the corresponding scheduling may be referred to as a fourth scheduling.

In summary, the NPU scheduler 130 may control the NPU internal memory 120 and the processing element array 110 so as to perform the computation in order of the first scheduling, the second scheduling, the third scheduling, and the fourth scheduling. That is, the NPU scheduler 130 may be configured to control the NPU internal memory 120 and the processing element array 110 so as to perform the computation in the configured scheduling order.

In summary, the NPU 100 according to an embodiment of the present disclosure may be configured to schedule the processing order based on the structure of the layers of the ANN and the computation order data corresponding to the structure. For example, the NPU scheduler 130 may be configured to schedule the processing order based on the data locality information or the information on the structure from the input layer to the output layer of the ANN of the ANN model.

The NPU scheduler 130 controls the NPU internal memory 120, by using the scheduling order based on the data locality information or the information on the structure of the ANN model, to improve the computation rate of the NPU and to improve a memory reuse rate.

The computation value of one layer may have a feature to be input data of the next layer due to the characteristic of the ANN computation driven by the NPU 100 according to the embodiment of the present disclosure.

Thus, the NPU 100 controls the NPU internal memory 120 according to the scheduling order to improve the memory reuse rate of the NPU internal memory 120. The memory reuse may be determined by how many times the data stored in the memory are read. For example, when specific data is stored in the memory, the specific data is read only once, and then the corresponding data is deleted or overwritten, the memory reuse rate may be 100%. For example, when specific data is stored in the memory, the specific data is read four times, and then the corresponding data is deleted or overwritten, the memory reuse rate may be 400%. That is, the memory reuse rate may be defined as the number of reuse times of data stored once. In other words, the memory reuse may mean reusing the data stored in memory or a specific memory address in which the specific data is stored.

In detail, when the NPU scheduler 130 is configured to receive the data locality information or the information on the structure of the ANN model, and thereby may determine order data in which the computation of the ANN is performed by the received data locality information or information on a structure of the ANN model, the NPU scheduler 130 recognizes that the computation result of the node data of the specific layer of the ANN model and the weight data of the specific connection network becomes the corresponding node data of the next layer.

Accordingly, the NPU scheduler 130 may reuse a value of a memory address in which the specific computation result is stored in the subsequent (next) computation. Therefore, the memory reuse rate may be improved.

For example, the first computation value of the first scheduling described above is configured as the node data of the second layer of the second scheduling. Specifically, the NPU scheduler 130 may reconfigure the memory address value corresponding to the first computation value of the first scheduling stored in the NPU internal memory 120 to a memory address value corresponding to the node data of the second layer of the second scheduling. That is, the memory address value may be reused. Accordingly, the NPU scheduler 130 reuses the data of the memory address of the first scheduling, so that the NPU internal memory 120 has an effect of being usable as the node data of the second layer of the second scheduling without a separate memory writing operation.

For example, the second computation value of the second scheduling described above is configured as the node data of the third layer of the third scheduling. Specifically, the NPU scheduler 130 may reconfigure the memory address value corresponding to the second computation value of the second scheduling stored in the NPU internal memory 120 to a memory address value corresponding to the node data of the third layer of the third scheduling. That is, the memory address value may be reused. Accordingly, the NPU scheduler 130 reuses the data of the memory address of the second scheduling, so that the NPU internal memory 120 has an effect of being usable as the node data of the third layer of the third scheduling without a separate memory writing operation.

For example, the third computation value of the third scheduling described above is configured as the node data of the fourth layer of the fourth scheduling. Specifically, the NPU scheduler 130 may reconfigure the memory address value corresponding to the third computation value of the third scheduling stored in the NPU internal memory 120 to a memory address value corresponding to the node data of the fourth layer of the fourth scheduling. That is, the memory address value may be reused. Accordingly, the NPU scheduler 130 reuses the data of the memory address of the third scheduling, so that the NPU internal memory 120 has an effect of being usable as the node data of the fourth layer of the fourth scheduling without a separate memory writing operation.

Furthermore, the NPU scheduler 130 may be configured to determine the scheduling order and the memory reuse to control the NPU internal memory 120. In this case, the NPU scheduler 130 has an effect of analyzing the data locality information or the information on the structure of the ANN model and providing efficient scheduling. In addition, since the data required for a computation capable of reusing the memory may be not redundantly stored in the NPU internal memory 120, there is an effect of reducing the memory usage. In addition, the NPU scheduler 130 has an effect of calculating the memory usage reduced by the memory reuse to improve the efficiency of the NPU internal memory 120.

Furthermore, the NPU scheduler 130 may be configured to monitor a resource usage of the NPU internal memory 120 and a resource usage of the processing elements PE1 to PE12 based on the data locality information or the information on the structure of the NPU 100. Therefore, it is possible to improve the efficiency of hardware resource usage of the NPU 100.

The NPU scheduler 130 of the NPU 100 according to an embodiment of the present disclosure has an effect of reusing the memory by using the data locality information or the information on the structure of the ANN model.

In detail, when the ANN model is a deep neural network, the number of layers and the number of connection networks may be significantly increased, and in this case, the effect of memory reuse may be further maximized.

That is, when the NPU 100 does not determine the data locality information or the information on the structure of the ANN model and the computation order, the NPU scheduler 130 may not determine whether the values stored in the NPU internal memory 120 are reused in the memory. Accordingly, the NPU scheduler 130 may generate unnecessarily a memory address required for each processing and needs to copy substantially the same data from one memory address to another memory address. Accordingly, unnecessary memory read and write operations occur, and values duplicated in the NPU internal memory 120 may be stored, which may cause a problem that the memory is unnecessarily wasted.

The processing element array 110 refers to a configuration in which a plurality of processing elements PE1 to PE12 configured to compute the node data of the ANN and the weight data of the connection network are disposed. Each processing element may include a multiplication and accumulation (MAC) computer and/or an arithmetic logic unit (ALU) computer. However, the embodiments according to the present disclosure are not limited thereto.

In FIG. 1, the plurality of processing elements has been illustrated, but computers implemented by a plurality of multipliers and an adder tree are disposed and configured in parallel by replacing the MAC in one processing element. In this case, the processing element array 110 may be referred to as at least one processing element including the plurality of computers.

The processing element array 110 is configured to include a plurality of processing elements PE1 to PE12. The plurality of processing elements PE1 to PE12 of FIG. 1 is just exemplified for convenience of description, and the number of the plurality of processing elements PE1 to PE12 is not limited. The size or number of the processing element array 110 may be determined by the number of the plurality of processing elements PE1 to PE12. The size of the processing element array 110 may be implemented in the form of an N×M matrix. Here, N and M are integers greater than zero. The processing element array 110 may include N×M processing elements. That is, the processing element may number at least one.

The size of the processing element array 110 may be designed by considering the characteristics of the ANN model that the NPU 100 operates. In detail, the number of processing elements may be determined by considering a data size of the ANN model to be operated, a required operating speed, required power consumption, and the like. The data size of the ANN model may be determined in response to the number of layers of the ANN model and a weight data size of each layer.

Therefore, the size of the processing element array 110 of the NPU 100 according to an embodiment of the present disclosure is not limited. As the number of processing elements of the processing element array 110 is increased, the parallel computation capability of the operating ANN model is increased, but the manufacturing cost and physical size of the NPU 100 may be increased.

For example, the ANN model that operates in the NPU 100 may be an artificial neural network learned to detect thirty specific keywords, that is, an AI keyword recognition model. In this case, the size of the processing element array 110 of the NPU 100 may be designed as 4×3 in consideration of the characteristic of the computation amount. Alternatively, the NPU 100 may include 12 processing elements. However, the present disclosure is not limited thereto, and the number of the plurality of processing elements PE1 to PE12 may be selected, for example, within the range of 8 to 16,384. That is, the embodiments of the present disclosure are not limited to the number of processing elements.

The processing element array 110 is configured to perform functions such as addition, multiplication, and accumulation required for ANN computations. In other words, the processing element array 110 may be configured to perform a multiplication and accumulation (MAC) computation.

Hereinafter, a first processing element PE1 of the processing element array 110 will be described as an example.

Figure 2:
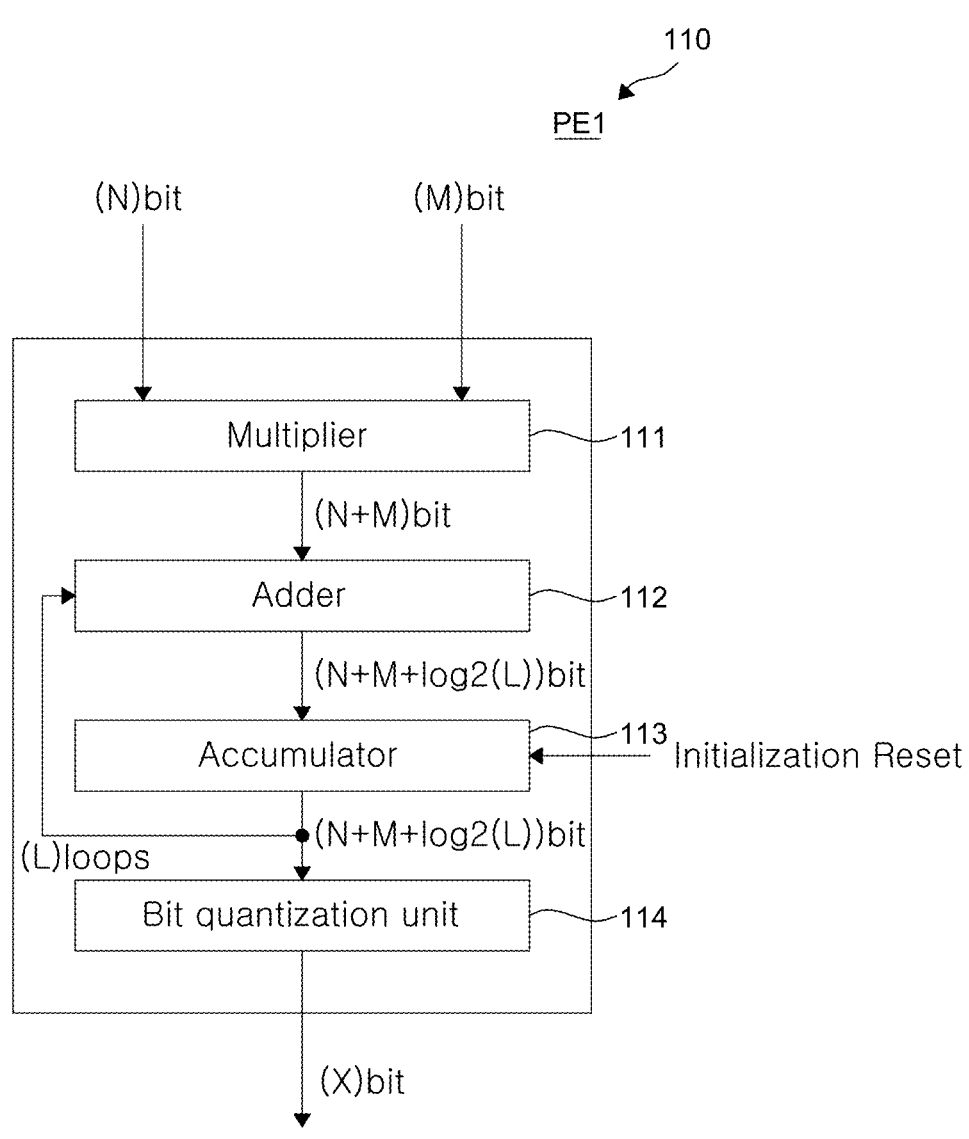
FIG. 2 is a schematic conceptual diagram illustrating one processing element in a processing element array that may be applied to the present disclosure.

FIG. 2 illustrates one processing element in a processing element array that may be applied to the present disclosure.

The NPU 100 according to an embodiment of the present disclosure may include a processing element array 110, an NPU internal memory 120 configured to store the ANN model which may be inferred in the processing element array 110, and an NPU scheduler 130 configured to control the processing element array 110 and the NPU internal memory 120 based on data locality information or information on a structure of the ANN model. The processing element array 110 is configured to perform an MAC computation, and the processing element array 110 may be configured to quantize and output an MAC computation result. However, the embodiments of the present disclosure are not limited thereto.

The NPU internal memory 120 may store all or a part of the ANN model according to a memory size and a data size of the ANN model.

Referring to FIG. 2, the first processing element PE1 may include a multiplier 111, an adder 112, an accumulator 113, and a bit quantization unit 114. However, embodiments according to the present disclosure are not limited thereto, and the processing element array 110 may be modified in consideration of the computation characteristics of the ANN.

The multiplier 111 multiplies (N) bit data and (M) bit data input. A computation value of the multiplier 111 is output to (N+M) bit data. Here, N and M are integers greater than zero. A first input unit for receiving the (N) bit data may be configured to receive a value having a characteristic such as a variable and a second input unit for receiving the (M) bit data may be configured to receive a value having a characteristic such as a constant. When the NPU scheduler 130 distinguishes variable value and constant value characteristics, the NPU scheduler 130 has an effect of increasing the memory reuse rate of the NPU internal memory 120. However, the input data of the multiplier 111 is not limited to the constant value and the variable value. That is, according to the embodiments of the present disclosure, the input data of the processing element may operate by understanding the characteristics of the constant value and the variable value, thereby improving the computation efficiency of the NPU

100. However, the NPU 100 is not limited to the characteristics of the constant value and the variable value of the input data.

Here, the value having the characteristic such as the variable or the meaning of the variable means updating whenever the entering input data is updated when the corresponding value is the stored memory address value. For example, the node data of each layer may be an MAC computation value reflected with the weight data of the ANN model, and when object recognition, etc. of video data are inferred as the corresponding ANN model, the input video is changed for each fame so that the node data of each layer is changed.

Here, the value having the characteristic such as constant or the meaning of the constant means preserving the value regardless of the updating of the entering input data when the corresponding value is the stored memory address value. For example, even if the weight data of the connection network infers the object recognition, etc. of the video data to the corresponding ANN model based on unique inference determination of the ANN model, the weight data of the connection network may not be changed.

That is, the multiplier 111 may be configured to receive one variable and one constant. In detail, the variable value input to the first input unit may be node data of the layer of the ANN, and the node data may be input data of the input layer of the ANN, an accumulation value of the hidden layer, and an accumulation value of the output layer. The constant value input to the second input unit may be weight data of the connection network of the ANN.

The NPU scheduler 130 may be configured to improve the memory reuse rate in consideration of the characteristics of the constant value.

The variable value is a computation value of each layer, and the NPU scheduler 130 recognizes a variable value reusable based on the data locality information or the information on the structure of the ANN model and may control the NPU internal memory 120 to reuse the memory.

The constant value is the weight data of each connection network, and the NPU scheduler 130 recognizes a constant value of the connection network repetitively used based on the data locality information or the information on the structure of the ANN model and may control the NPU internal memory 120 to reuse the memory.

That is, the NPU scheduler 130 may be configured to recognize a reusable variable value and a reusable constant value based on the data locality information or the information on the structure of the ANN model and the NPU scheduler 130 may be configured to control the NPU internal memory 120 to reuse the memory.

The processing element may limit an operation so that the multiplier 111 does not compute, because the computation result being zero is known even if the computation is not performed when a zero value is input to the input unit of one of the first input unit and the second input unit of the multiplier 111. For example, when the zero value is input to one of the first input unit and the second input unit of the multiplier 111, the multiplier 111 may be configured to operate in a zero skipping manner.

A bit width of the data input to the first input unit and the second input unit may be determined according to the quantization of the node data and the weight data of each layer of the ANN model. For example, the node data of the first layer may be quantized to 5 bits and the weight data of the first layer may be quantized to 7 bits. In this case, the first input unit is configured to receive 5-bit data, and the second input unit may be configured to receive 7-bit data.

The NPU 100 may control the quantized bit width to be converted in real time when the quantized data stored in the NPU internal memory 120 is input to the input units of the processing element. That is, the quantized bit width may vary for each layer. The processing element may be configured to convert the bit width in real time, by receiving bit width information from the NPU 100 in real time when the bit width of the input data is converted, and to generate input data.

The accumulator 113 accumulates a computation value of the multiplier 111 and a computation value of the accumulator 113 by using the adder 112 by the number of (L)loops. Accordingly, the bit width of the data of the output unit and the input unit of the accumulator 113 may be output to (N+M+log 2(L)) bits. Here, L is an integer greater than zero.

The accumulator 113 may initialize the data stored in the accumulator 113 to zero by receiving an initialization reset when the accumulation is terminated. However, the embodiments according to the present disclosure are not limited thereto.

The bit quantization unit 114 may reduce the bit width of the data output from the accumulator 113. The bit quantization unit 114 may be controlled by the NPU scheduler 130. The bit width of the quantized data may be output as (X) bit. Here, X is an integer greater than zero. According to the above-described configuration, the processing element array 110 is configured to perform a MAC computation, and the processing element array 110 has an effect of quantifying and outputting the MAC computation result. In particular, the quantization has an effect of further reducing the power consumption as (L)loops are increased. Further, when the power consumption is reduced, the heating may be reduced. In particular, when the heating is reduced, it is possible to reduce a possibility of malfunction by the high temperature of the NPU 100.

The output data (X) bit of the bit quantization unit 114 may be node data of the next layer or input data of convolution. If the ANN model is quantized, the bit quantization unit 114 may be configured to receive quantized information from the ANN model. However, the present disclosure is not limited thereto, and the NPU scheduler 130 may be configured to extract the quantized information by analyzing the ANN model. Therefore, the output data (X) bit may be converted and output to the quantized bit width so as to correspond to the quantized data size. The output data (X) bit of the bit quantization unit 114 may be stored in the NPU internal memory 120 with the quantized bit width.

The processing element array 110 of the NPU 100 according to an embodiment of the present disclosure includes a multiplier 111, an adder 112, an accumulator 113, and a bit quantization unit 114. The processing element array 110 may reduce the data of the bit width of (N+M+log 2(L)) bit output from the accumulator 113 to the bit width of (X) bit by the bit quantization unit 114. The NPU scheduler 130 controls the bit quantization unit 114 to reduce the bit width of the output data by predetermined bits from the least significant bit (LSB) to the most significant bit (MSB). When the bit width of the output data is reduced, the power consumption, the computation amount, and the memory usage may be reduced. However, when the bit width is reduced to a predetermined length or less, there is a problem that the inference accuracy of the ANN model may be rapidly reduced. Accordingly, the reduction in bit width of the output data, that is, the quantization level may be determined by comparing the degree of reducing the power consumption, the computation amount, and the memory usage with the reduction level of the inference accuracy of the ANN model. The quantization level may be determined by determining target inference accuracy of the ANN model and testing the bit width while gradually reducing the bit width. The quantization level may be determined for each computation value of each layer.

According to the first processing element PE1 described above, the bit width of the (N) bit data and the (M) bit data of the multiplier 111 is controlled and the bit width of the computation value (X) bit is reduced by the bit quantization unit 114. As a result, the processing element array 110 has an effect of reducing the power consumption while improving the MAC computation speed and also has an effect of further efficiently performing the convolution computation of the ANN.

The NPU internal memory 120 of the NPU 100 may be a memory system configured in consideration of the MAC computation characteristics and power consumption characteristics of the processing element array 110.

For example, the NPU 100 may be configured to reduce the bit width of the computation value of the processing element array 110 in consideration of the MAC computation characteristics and power consumption characteristics of the processing element array 110.

The NPU internal memory 120 of the NPU 100 may be configured to minimize the power consumption of the NPU 100.

The NPU internal memory 120 of the NPU 100 may be a memory system configured to control the memory with low power in consideration of the data size and computation step of the operating ANN model.

The NPU internal memory 120 of the NPU 100 may be a low-power memory system configured to reuse a specific memory address in which the weight data is stored in consideration of the data size and computation step of the operating ANN model.

The NPU 100 may provide various activation functions for imparting nonlinearity. For example, a sigmoid function, a hyperbolic tangent function, or a ReLU function may be provided. The activation function may be selectively applied after the MAC computation. The computation value to which the activation function is applied may be referred to as an activation map.

Figure 3:
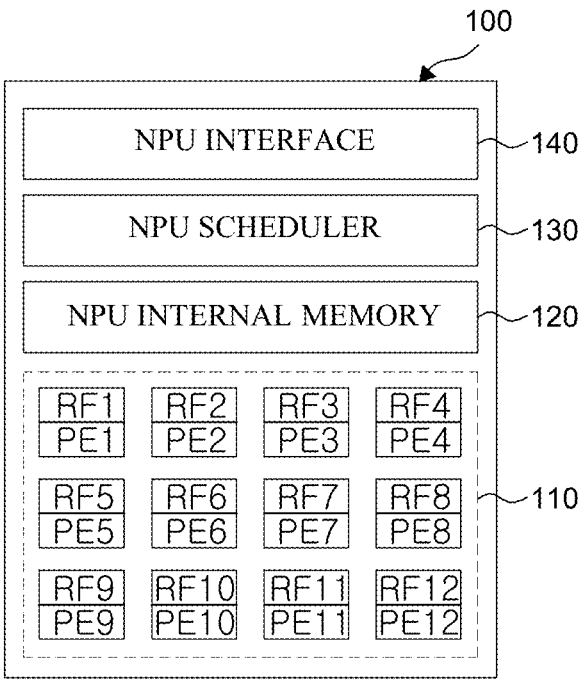
FIG. 3 is an exemplary diagram illustrating a modification of an NPU 100 of FIG. 1.

FIG. 3 illustrates a modification of an NPU 100 of FIG. 1. The NPU 100 of FIG. 3 is substantially the same as the NPU 100 of FIG. 1, except for the processing element array 110. Thus, hereinafter, duplicate description may be omitted merely for convenience of description.

The processing element array 110 of FIG. 3 may further include register files RF1 to RF12 corresponding to the plurality of processing elements PE1 to PE12, respectively, in addition to the plurality of processing elements PE1 to PE12. In FIG. 3, the processing elements PE1 to PE12 and the register files RF1 to RF12 are exemplified for convenience of description, such that the number (size) of the plurality of processing elements PE1 to PE12 and the number (size) the plurality of register files RF1 to RF12 are not limited.

The size or number of the processing element array 110 may be determined by the numbers of the plurality of processing elements PE1 to PE12 and the plurality of register files RF1 to RF12. The sizes of the processing element array 110 and the plurality of register files RF1 to RF12 may be implemented in the form of an N×M matrix. Here, N and M are integers greater than zero.

The array size of the processing element array 110 may be designed by considering the characteristics of the ANN model that the NPU 100 operates. In detail, the memory size of the register file may be determined by considering a data size of the ANN model to be operated, a required operating speed, required power consumption, and the like.

The register files RF1 to RF12 of the NPU 100 are static memory units directly connected to the processing elements PE1 to PE12. The register files RF1 to RF12 may be configured for, for example, flip flops, and/or latches. The register files RF1 to RF12 may be configured to store MAC computation values of the corresponding processing elements PE1 to PE12. The register files RF1 to RF12 may be configured to provide or receive the weight data and/or the node data to or from the NPU system memory 120.

Figure 4A:
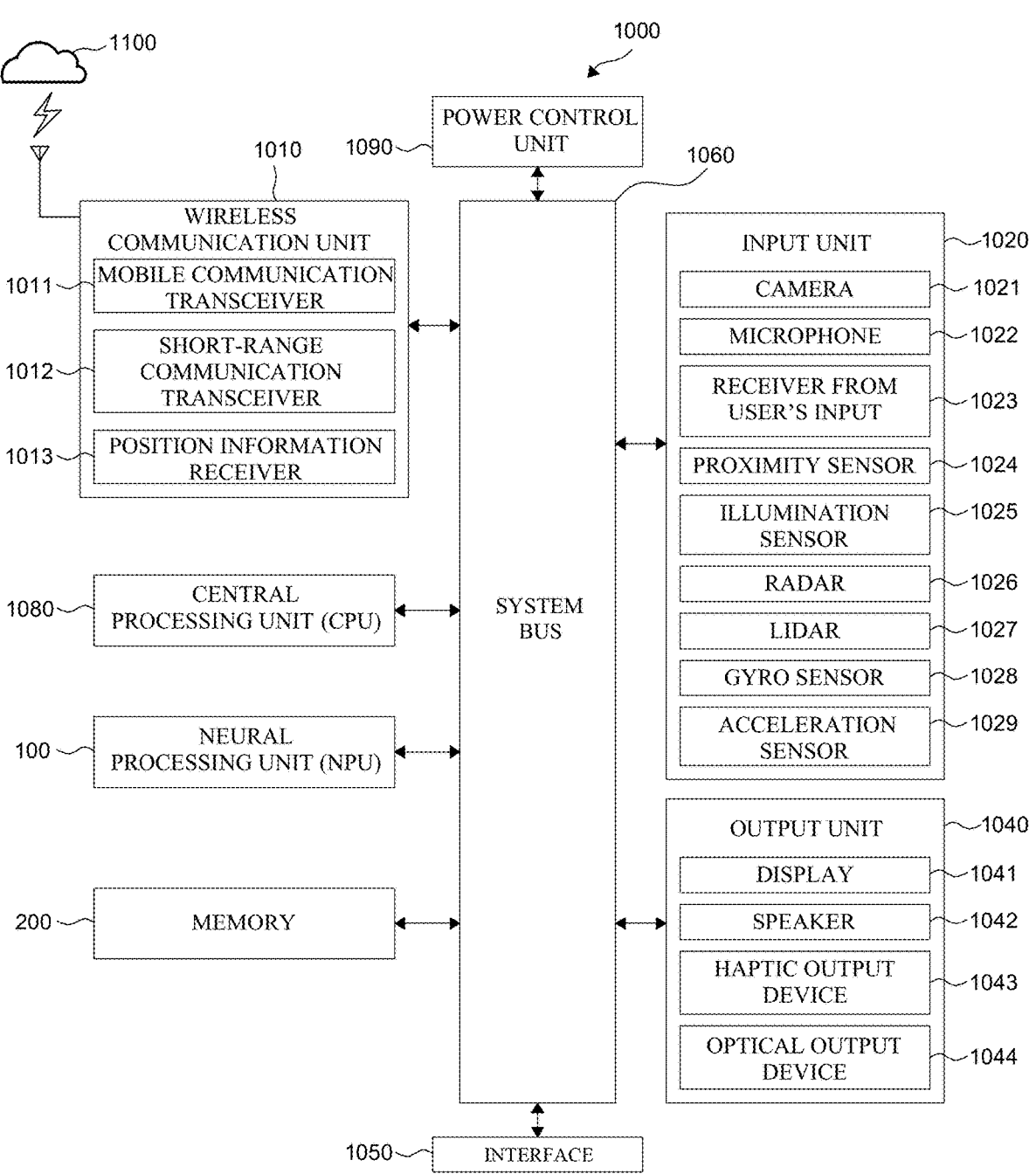
FIG. 4A is a block diagram illustrating a configuration of an edge device 1000 including the NPU 100 according to the present disclosure.

FIG. 4A illustrates a configuration of the edge device 1000 including the NPU 100 according to the present disclosure.

Referring to FIG. 4A, the edge device 1000 is one example of various electronic devices that may be variously modified.

The edge device 1000 includes the NPU 100 of FIG. 1 or 3 and may mean various electronic devices capable of being used for edge computing by using the ANN model inferred by the NPU 100. Here, the edge computing may refer to an edge or peripheral portion where computing occurs and may mean terminals directly producing data or various electronic devices near the terminals. The NPU 100 may be referred to as a neural processing unit (NPU).

The edge device 1000 may include, for example, mobile phones, smartphones, AI speakers, digital broadcasting terminals, navigations, wearable devices, smart watches, smart refrigerators, smart televisions, digital signages, VR devices, AR devices, AI CCTVs, AI robot cleaners, tablets, laptop computers, autonomous driving vehicles, autonomous driving drones, autonomous driving two-legged walking robots, autonomous driving four-legged walking robots, autonomous driving mobilities, AI robots, etc., which include ANNs.

However, the edge device 1000 according to embodiments of the present disclosure is not limited to the above-described electronic devices.

The edge device 1000 may be configured to include at least the NPU 100, and selectively further include at least some of a wireless communication unit 1010, an input unit 1020, an output unit 1040, an interface 1050, a system bus 1060, a memory 200, a central processing unit 1080, and a power control unit 1090. Further, the edge device 1000 may also be connected to the Internet through the wireless communication unit 1010 to receive cloud AI services.

The system bus 1060 is configured to control data communication of each component of the edge device 1000. The system bus 1060 may be implemented by an electrically conductive pattern formed on a substrate. To this end, the above-described components may be fastened on the substrate so as to be electrically connected to the electrically conductive pattern on the substrate.

The system bus 1060 is a transportation system of the edge device 1000. The system bus 1060 may be referred to as a computer bus. All components of the edge device 1000 may have unique addresses, and the system bus 1060 may connect the components to each other through the addresses. The system bus 1060 may process, for example, three types of data. First, the system bus 1060 may process the address in which the data is stored in the memory 200 when data transmission is performed. Second, the system bus 1060 may process meaningful data such as the computation result stored in the corresponding address. Third, the system bus 1060 may process the data flow such as how the address data and the data are processed and when and where the data needs to be moved. However, the embodiments according to the present disclosure are not limited thereto. Various control signals generated in the central processing unit 1080 may be transmitted to the corresponding components through the system bus 1060.

The wireless communication unit 1010 may include one or more communication modules that enable wireless communication between the edge device 1000 and the wireless communication system, between the edge device 1000 and another edge device, or between the edge device 1000 and Internet.

For example, the wireless communication unit 1010 may include at least one of a mobile communication transceiver 1011, a short-range communication transceiver 1012, and a position information receiver 1013.

The mobile communication transceiver 1011 of the wireless communication unit 1010 means a module for transceiving a wireless signal with at least one of a base station, an external terminal, and a server on a mobile communication network constructed according to technical standards or communication methods for mobile communication. The mobile communication transceiver 1011 may be embedded or externally built in the edge device 1000. The technical standards include, for example, long-term evolution (LTE), LTE Advanced, LTE-Pro, 5G (Fifth Generation), 6G, etc. However, the embodiments according to the present disclosure are not limited thereto.

The short-range communication transceiver 1012 of the wireless communication unit 1010 is a transceiver for short-range communication that includes, for example, wireless LAN (WLAN), wireless fidelity (Wi-Fi), Wi-Fi Direct, radio frequency identification (RFID) using Bluetooth, infrared data association (IrDA), ultra-wideband (UWB), ZigBee, near-field communication (NFC), wireless universal serial bus (Wireless USB), etc. However, the embodiments according to the present disclosure are not limited thereto.

Such a short-range communication transceiver 1012 may support wireless communication between the edge device 1000 and the wireless communication system, between the edge device 1000 and another edge device interlocked with the edge device 1000, or between the edge device 1000 and a separate network through wireless local area networks (wireless area networks). For example, another edge device may be a wearable device such as a smartwatch, a smart glass, a head mounted display (HMD), etc. capable of exchanging the data with the edge device 1000 according to the present disclosure. However, the embodiments according to the present disclosure are not limited thereto.

The position information receiver 1013 of the wireless communication unit 1010 refers to a module for acquiring a position of the edge device 1000. Position information techniques include, for example, a method using a global navigation satellite system (GNSS) using a satellite, a method of using Bluetooth, a method of using a beacon, a method of using wireless fidelity (Wi-Fi). The GNSS includes a global positioning system (GPS) in the US, a global navigation satellite system (GLONASS) in Russia, a European satellite navigation system (GALILEO) in Europe, or the like.

For example, the edge device 1000 may acquire a position of the edge device 1000 using a signal transmitted from the satellite. As another example, the edge device 1000 may acquire a position of the edge device 1000 by using the Wi-Fi module based on the data of a wireless access point (AP) that transmits or receives a wireless signal to or from the Wi-Fi module. However, the embodiments according to the present disclosure are not limited thereto.

Through the wireless communication unit 1010, the edge device 1000 may be connected with the Internet, and the edge device 1000 may receive various types of AI services.

For example, the edge device 1000 transmits a voice signal of "How's the weather today?" to a cloud AI service on the Internet through the wireless communication unit 1010 and the cloud AI service may transmit an inference result of the received voice signal to the edge device 1000 through the wireless communication unit 1010. However, the embodiments according to the present disclosure are not limited thereto.

The input unit 1020 may include various components that provide various data or signals input to the edge device 1000. The input unit 1020 may include a camera 1021 for inputting a video signal, a microphone 1022 for inputting an acoustic signal, a receiver from a user's input 1023 for receiving data from a user, a proximity sensor 1024 for detecting a distance, an illumination sensor 1025 for detecting an ambient light amount, a radar 1026 for detecting an object by emitting a radio wave of a specific frequency, a LiDAR 1027 for detecting an object by radiating a laser, a gyroscope sensor 1028, an acceleration sensor 1029, etc.

The input unit 1020 may be configured to perform a function of providing at least one data of video data, acoustic data, user input data, and distance data.

The camera 1021 of the input unit 1020 may be a camera for image processing, gesture recognition, object recognition, event recognition, etc., which are inferred by the NPU 100.

The camera 1021 of the input unit 1020 may provide still image or video data.

The video signal of the camera 1021 of the input unit 1020 may be transmitted to the central processing unit 1080. When the video signal is transmitted to the central processing unit 1080, the central processing unit 1080 may be configured to transmit the video signal to the NPU 100. At this time, the central processing unit 1080 may perform image processing, and the processed video signal may be transmitted to the NPU 100. However, the present disclosure is not limited thereto, and the system bus 1060 may transmit the video signal to the NPU 100.

The video signal of the camera 1021 of the input unit 1020 may be transmitted to the NPU 100. When the video signal is transmitted to the NPU 100, the NPU 100 may be configured to transmit the inferred result to the central processing unit 1080. At this time, the inference computation, such as image processing, gesture recognition, object recognition, and event recognition, may be performed according to the ANN model operated by the NPU 100, and the inferred result may be transmitted to the central processing unit 1080. However, the present disclosure is not limited thereto, and the NPU 100 may transmit the inferred result to other components other than the central processing unit 1080 through the system bus 1060.

The camera 1021 of the input unit 1020 may be configured by at least one camera. For example, the camera 1021 of the input unit 1020 may be a plurality of cameras for providing a video signal in front, rear, left, and right directions for autonomous driving of an autonomous driving vehicle. In addition, a vehicle indoor camera may be further included to determine condition of a driver inside the vehicle. For example, the camera 1021 of the input unit 1020 may be a plurality of cameras having different viewing angles on a smartphone.

The camera 1021 of the input unit 1020 may be configured by at least one of a visible-light cameras, a near-infrared camera, and a thermal video camera. However, the present disclosure is not limited thereto, and the camera 1021 consists of a composite image sensor configured to simultaneously detect visible light and near-infrared rays, and may be configured to simultaneously detect visible light and near-infrared rays.

When the camera 1021 of the input unit 1020 is a plurality of cameras, the edge device 1000 may provide the video signal to the NPU 100 in the form of a batch mode in order to improve the inference performance of the NPU 100.

The microphone 1022 of the input unit 1020 converts and outputs an external acoustic signal into electrical voice data. The voice data may be output to an analog signal or a digital signal. Various noise removal algorithms may be implemented in the microphone 1022 to remove noise generated in a process of receiving the external acoustic signal.

The microphone 1022 of the input unit 1020 may be configured by at least one microphone. For example, a plurality of microphones 1022 may be microphones disposed in a pair of earphones located in each ear.

The acoustic signal of the microphone 1022 of the input unit 1020 may be transmitted to the central processing unit 1080. When the acoustic signal is transmitted to the central processing unit 1080, the acoustic signal may be transmitted to the NPU 100 through the system bus 1060. At this time, the central processing unit 1080 may convert the acoustic signal into a frequency domain with a Fourier transform, and the converted acoustic signal may be transmitted to the NPU 100. However, the present disclosure is not limited thereto, and the video signal may be transmitted to the NPU 100 through another component other than the central processing unit 1080 through the system bus 1060.

The acoustic signal of the microphone 1022 of the input unit 1020 may be transmitted to the NPU 100. When the acoustic signal is transmitted to the NPU 100, the NPU 100 may be configured to transmit the inferred result to the central processing unit 1080. At this time, the inference computation, such as acoustic processing, keyword recognition, noise removal, sentence recognition, and translation into other languages, may be performed according to the ANN model operated by the NPU 100, and the inferred result may be transmitted to the central processing unit 1080. However, the present disclosure is not limited thereto, and the NPU 100 may transmit the inferred result to other components, such as the power control unit 1090, the wireless communication unit 1010, the interface 1050, the output unit 1040, the memory 200, etc., rather than the central processing unit 1080.

The receiver from the user's input 1023 of the input unit 1020 may include at least one of, for example, a touch button, a push button, a touch panel, a mouse, a keyboard, a touch pad, a remote controller, and a user's gesture recognizer. However, the embodiments according to the present disclosure are not limited thereto. The NPU 100 may be configured to receive the signal of the receiver from the user's input 1023 according to the operating ANN model and perform the corresponding inference computation. However, the embodiments according to the present disclosure are not limited thereto.

The receiver from the user's input 1023 of the input unit 1020 is for receiving data from the user, and when the data is input through the receiver from the user's input 1023, the central processing unit 1080 may control the operation of the edge device 1000 in response to the input data. The receiver from the user's input 1023 may include a mechanical input means, a button, a switch, and a touch type input means. The touch type input means may consist of a visual key displayed on a touch screen through a software processing or a touch key disposed at a portion other than the touch screen. The touch screen may detect a touch input to the display 1041 by using at least one of various touch methods, such as a resistive method, a capacitive method, an infrared method, an ultrasonic method, and a magnetic field method. The touch screen may be configured to detect a position, an area, a pressure, and the like of a touch object. For example, a capacitive touch screen may be configured to convert changes in pressure applied to a specific site or in capacitance in a specific site into an electrical input signal. For example, the touch object may be a finger, a touch pen or a stylus pen, a pointer, and the like.

The proximity sensor 1024 of the input unit 1020 refers to a sensor that detects the presence or absence of an object approaching the edge device 1000 or an object present around the edge device 1000 without a mechanical contact by using an electromagnetic force, infrared, or the like. Examples of the proximity sensor 1024 include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. However, the embodiments according to the present disclosure are not limited thereto. The NPU 100 may be configured to receive the signal of the proximity sensor 1024 according to the operating ANN model and perform the corresponding inference computation. However, the embodiments according to the present disclosure are not limited thereto.

The illumination sensor 1025 of the input unit 1020 refers to a sensor capable of detecting an ambient light amount of the edge device 1000 by using a photodiode. The NPU 100 may be configured to receive the signal of the illumination sensor 1025 according to the operating ANN model and perform the corresponding inference computation. However, the embodiments according to the present disclosure are not limited thereto.

The radar 1026 of the input unit 1020 may detect a signal reflected to an object by transmitting an electromagnetic wave to provide data such as the distance, angle, and speed of the object. The edge device 1000 may be configured to include a plurality of radars 1026. The radar 1026 may be configured to include at least one of a short range radar, a middle range radar, and a long range radar. The NPU 100 may be configured to receive the signal of the radar 1026 according to the operating ANN model and to perform the corresponding inference computation. However, the embodiments according to the present disclosure are not limited thereto.

The LiDAR 1027 of the input unit 1020 may irradiate an optical signal in a constant manner to analyze the optical energy reflected to the object and provide surrounding three-dimensional space data. The edge device 1000 may be configured to include a plurality of LiDARs 1027.

The gyro sensor 1028 may detect a rotation operation of the edge device 1000. Specifically, the gyro sensor 1028 may measure a rotation angular velocity. The angular velocity may be calculated by converting a Coriolis force generated in the rotational movement into an electrical signal. The Coriolis force refers to a force perpendicular to a movement direction in proportion to the speed of the moving object. The gyro sensor 1028 may measure and output a rotation angle, a slope, etc.

The acceleration sensor 1029 may measure the movement acceleration when the edge device 1000 is moved.

Various motions of the edge device 1000 may be measured through a combination of the gyro sensor 1028 and the acceleration sensor 1029.

The NPU 100 may be configured to receive the signal of the LiDAR 1027 according to the operating ANN model and perform the corresponding inference computation. However, the embodiments according to the present disclosure are not limited thereto.

However, the input unit 1020 is not limited to the aforementioned embodiments and may be configured to further include at least one of a magnetic sensor, a G-sensor, a motion sensor, a finger scan sensor, an ultrasonic sensor, a battery gauge, a barometer, a hygrometer, a thermometer, a radioactive sensor, a thermal detection sensor, a gas detection sensor, and a chemical detection sensor.

The NPU 100 of the edge device 1000 according to the embodiments of the present disclosure may be configured to receive the signal of the input unit 1020 according to the operating ANN model, and perform the corresponding inference computation.

The edge device 1000 according to the embodiments of the present disclosure may be configured to provide various input data input from the input unit 1020 to the NPU 100 to perform various inference computations. The input data may be input to the NPU 100 after being pre-processed in the central processing unit 1080.

For example, the NPU 100 may be configured to selectively input the input data of each of the camera 1021, the radar 1026, and the LiDAR 1027, and infer the ambient environment data for autonomous driving.

For example, the NPU 100 may be configured to receive the input data of the camera 1021 and the radar 1026 and infer the ambient environment data required for autonomous driving.

The output unit 1040 generates an output related to sight, hearing, or touch, and may include at least one of a display 1041, a speaker 1042, a haptic output device 1043, and an optical output device 1044. The display 1041 may be a liquid crystal panel, an organic light emitting display panel, or the like including a plurality of pixel arrays. However, the embodiments according to the present disclosure are not limited thereto. The optical output device 1044 may output an optical signal for informing an event occurrence by using the light of a light source of the edge device 1000. Examples of the occurring event may include message reception, missed call, alarm, schedule notification, email reception, data reception through application, and the like.

The interface 1050 serves as a passage to all external devices connected to the edge device 1000. The interface 1050 receives the data from the external device, receives power to transmit the power to each component inside the edge device 1000, or transmits the data inside the edge device 1000 to the external device. For example, the interface 1050 may include a wireless/wired headset port, an external charger port, a wired/wireless data port, a memory card port, a port connecting a device with an identification module, an audio input/output (I/O) port, a video input/output (I/O) port, an earphone port, and the like.

The memory 200 is a device for storing data according to the control of the edge device 1000. The memory 200 may selectively include a volatile memory and a non-volatile memory. The volatile memory device may be a memory device in which data is stored only when the power is supplied, and the stored data is destroyed (dumped) when the power supply is interrupted. The non-volatile memory device may be a device in which the data is stored even when the power supply is interrupted.

The memory 200 may store a program for the operation of the central processing unit 1080 or the NPU 100 and temporarily store input/output data. The memory 200 may include at least one type of storage medium of a flash memory type, a hard disk type, a solid state disk (SSD) type, a silicon disk drive (SDD) type, a multimedia card micro type, a card type memory (e.g., SD or XD memory, etc.), a random access memory (RAM), a dynamic random access memory (DRAM), a static random access memory (SRAM), a magnetic random access memory (MRAM), a spin-transfer torque magnetic random access memory (STT-MRAM), an embedded magnetic random access memory (eMRAM), an orthogonal spin transfer magnetic random access memory (OST-MRAM), a phase change RAM (PRAM), a ferroelectric RAM (FeRAM), a read-only memory (ROM), an electrically erasable programmable read-only memory (EE-PROM), a programmable read-only memory (PROM), a magnetic memory, a magnetic disk and an optical disk.

The various ANN models to be described below may be stored in the non-volatile memory device of the memory 200. At least one of the ANN models may be stored in the volatile memory of the NPU 100 by an instruction of the edge device 1000 to provide an inference computation function.

The central processing unit 1080 may control the overall operation of the edge device 1000. For example, the central processing unit 1080 may be a central processing unit (CPU), an application processor (AP), or a digital signal processor (DSP). The central processing unit 1080 may control the edge device 1000 or perform various instructions. The central processing unit 1080 may provide or receive the data required for the NPU 100. The central processing unit 1080 may control various components connected to the system bus 1060.

The power control unit 1090 is configured to control the power of each component. The central processing unit 1080 may be configured to control the power control unit 1090. The power control unit 1090 receives external power and internal power to provide the powers to each component included in the edge device 1000. The power control unit 1090 may include a battery. The power control unit 1090 may selectively block the supply of the power of each component of the edge device 1000, when not receiving a control signal from the central processing unit 1080 for a certain time. The NPU 100 may also operate at all times and may be configured to infer a specific situation to provide a weather signal to the central processing unit 1080. The central processing unit 1080 may control the power control unit 1090 to supply power to a specific component of the edge device 1000 by the inference results of the NPU 100.

The NPU 100 is configured to perform various ANN inference computations. The NPU 100 is characterized in that the central processing unit 1080 is configured to efficiently compute the inefficient ANN inference computation.

The NPU 100 is only one example of the edge device 1000 of FIG. 4A, and various components that may be included in the edge device 1000 are illustrated. However, the embodiments according to the present disclosure are not limited thereto, and each component may be selectively included or excluded depending on the object and configuration of the example. That is, some of the components of FIG. 4A may not be required components in some cases, and it may be preferred that each example includes or excludes some of the components of FIG. 4A in terms of optimization.

Figure 4B:
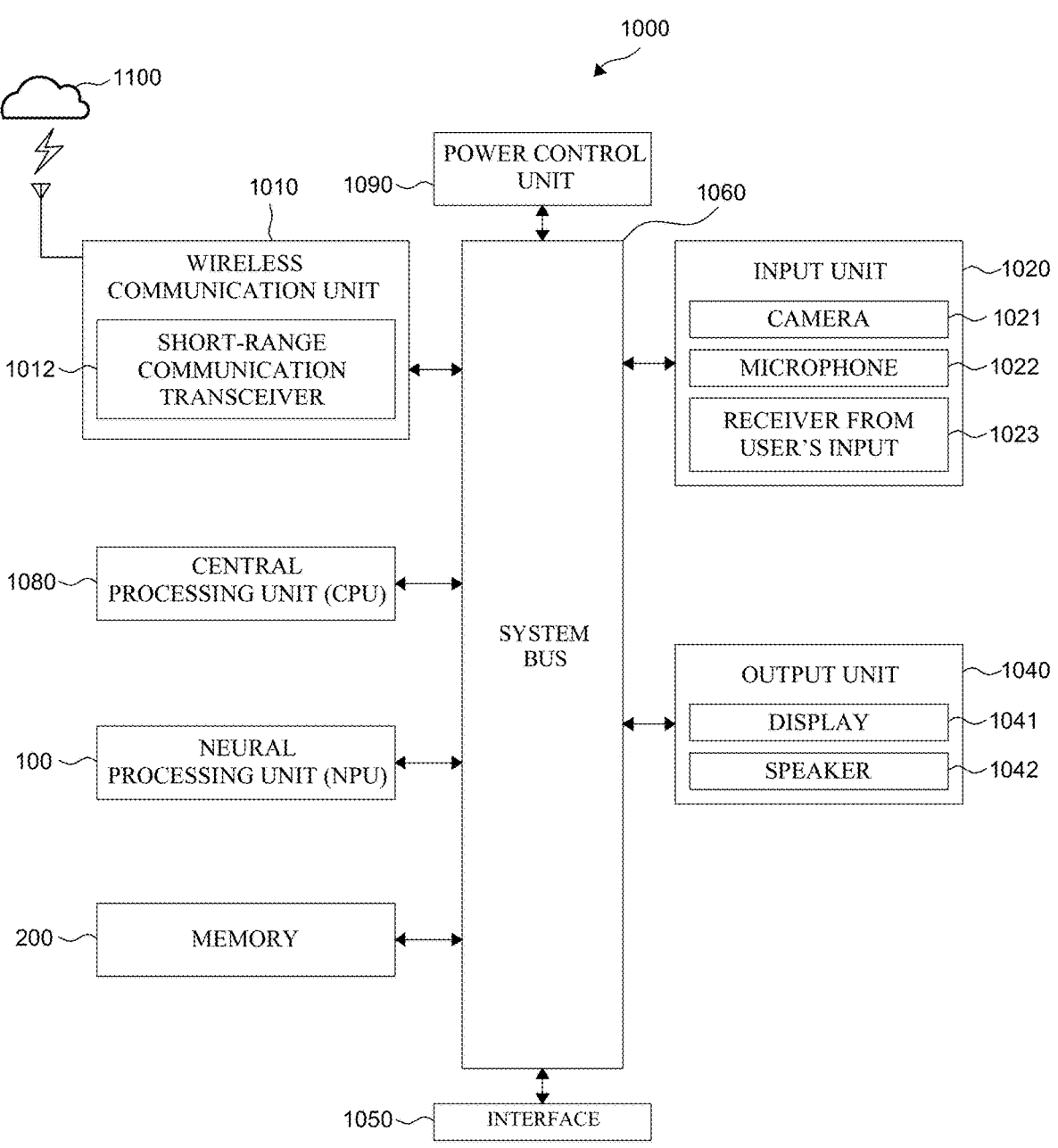
FIG. 4B is a block diagram illustrating a modification of the edge device 1000 of FIG. 4A.

FIG. 4B illustrates a modification of the edge device 1000 of FIG. 4A, The edge device 1000 of FIG. 4B includes only some components, unlike the edge device of FIG. 4A. As such, the edge device 1000 may be implemented by including only some components depending on an application.

If the edge device 1000 of FIG. 4B is, for example, an augmented reality (AR) device or a virtual reality (VR) device, the edge device 1000 may perform image recognition, keyword recognition, and gesture recognition by using one NPU 100. That is, one NPU 100 may provide a plurality of inference functions.

As such, it is possible to reduce the number of components and the manufacturing costs of the edge device 1000 by performing a plurality of inference computations by one NPU 100.

Figure 5:
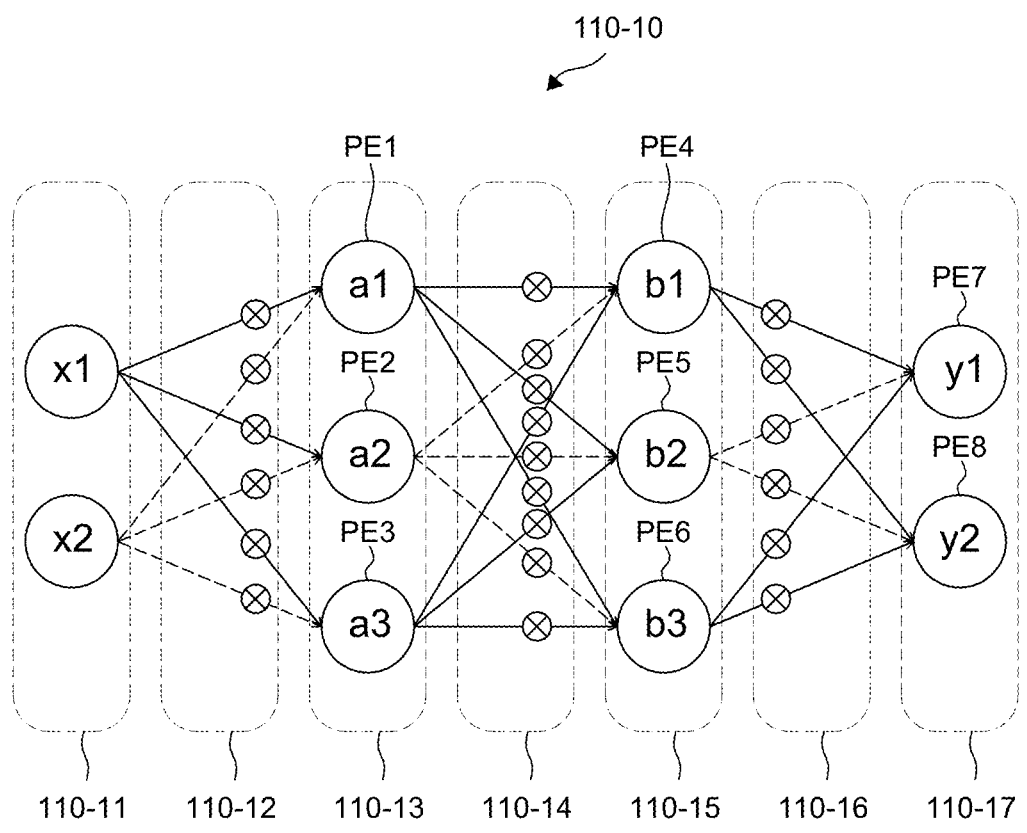
FIG. 5 is a schematic conceptual diagram illustrating an exemplary artificial neural network model.

FIG. 5 illustrates an exemplary ANN model.

Hereinafter, an exemplary ANN model 110-10 capable of operating in the NPU 100 will be described.

The ANN model 110-10 of FIG. 5 may be an ANN which is learned in the NPU 100 of FIG. 1 or 3 or learned in a separate machine learning device. The ANN model may be an ANN that is learned to perform various inference functions such as object recognition and voice recognition.

The ANN model 110-10 may be a deep neural network (DNN). However, the ANN model 110-10 according to embodiments of the present disclosure is not limited to the DNN.

For example, the ANN model 110-10 may be implemented as models of VGG, VGG16, DenseNet, and a deep neural network (DNN), such as fully convolutional network (FCN) having an encoder-decoder structure, SegNet, DeconvNet, DeepLAB V3+, and U-net, SqueezeNet, Alexnet, ResNet18, MobileNet-v2, GoogLeNet, Resnet-v2, Resnet50, Resnet101, Inception-v3, etc. However, the present disclosure is not limited to the aforementioned models. In addition, the ANN model 110-10 may be an ensemble model based on at least two different models.

The ANN model 110-10 may be stored in the NPU internal memory 120 of the NPU 100. Alternatively, the ANN model 110-10 may be implemented to be stored in the memory 200 of the edge device 1000 of FIG. 4A or 4B, and then loaded in the NPU internal memory 120 of the NPU 100 when driving the ANN model 110-10.

Hereinafter, the inference process of the exemplary ANN model 110-10 performed by the NPU 100 will be described with reference to FIG. 5.

The ANN model 110-10 is an exemplary DNN model including an input layer 110-11, a first connection network 110-12, a first hidden layer 110-13, a second connection network 110-14, a second hidden layer 110-15, a third connection network 110-16, and an output layer 110-17. However, the present disclosure is not limited only to the ANN model of FIG. 4. The first hidden layer 110-13 and the second hidden layer 110-15 may be referred to as a plurality of hidden layers.

The input layer 110-11 may include x1 and x2 input nodes as an example. That is, the input layer 110-11 may include information on two input values. The NPU scheduler 130 of FIG. 1 or 3 may configure a memory address, in which information on the input values from the input layer 110-11 is stored, in the NPU internal memory 120 of FIG. 1 or 3.

The first connection network 110-12 may include, for example, information on six weight values for connecting each node of the input layer 110-11 to each node of the first hidden layer 110-13. The NPU scheduler 130 of FIG. 1 or 3 may configure a memory address, in which information on the weight values of the first connection network 110-12 is stored, in the NPU internal memory 120. Each weight value is multiplied by an input node value, and an accumulated value of the multiplied values is stored in the first hidden layer 110-13.

The first hidden layer 110-13 may exemplarily include a1, a2, and a3 nodes. That is, the first hidden layer 110-13 may include information on three node values. The NPU scheduler 130 of FIG. 1 or 3 may configure a memory address for storing information on the node values of the first hidden layer 110-13 in the NPU internal memory 120.

The second connection network 110-14 may include, for example, information on nine weight values for connecting each node of the first hidden layer 110-13 to each node of the second hidden layer 110-15. The NPU scheduler 130 of FIG. 1 or 3 may configure a memory address for storing information on the weight values of the second connection network 110-14 in the NPU internal memory 120. The weight value of the second connection network 110-14 is multiplied by the node value input from the first hidden layer 110-13, respectively, and the accumulated value of the multiplied values is stored in the second hidden layer 110-15.

The second hidden layer 110-15 may exemplarily include b1, b2, and b3 nodes. That is, the second hidden layer 110-15 may include information on three node values. The NPU scheduler 130 may configure a memory address for storing information on the node values of the second hidden layer 110-15 in the NPU internal memory 120.

The third connection network 110-16 may include, for example, information on six weight values for connecting each node of the second hidden layer 110-15 to each node of the output layer 110-17. The NPU scheduler 130 may configure a memory address for storing information on the weight values of the third connection network 110-16 in the NPU internal memory 120. The weight values of the third connection network 110-16 are multiplied by the node values input from the second hidden layer 110-15, respectively, and the accumulated value of the multiplied values is stored in the output layer 110-17.

The output layer 110-17 may include y1 and y2 nodes as an example. That is, the output layer 110-17 may include information on two node values. The NPU scheduler 130 may configure a memory address for storing information on the node values of the output layer 110-17 in the NPU internal memory 120.

That is, the NPU scheduler 130 may analyze or receive the structure of the ANN model to operate in the processing element array 110. The information of the ANN that may be included in the ANN model may include information on node values of each layer, arrangement data locality information or information on a structure of layers, and information on weight values of each connection network connecting nodes of each layer.

Since the NPU scheduler 130 has received the data locality information or the information on the structure of the exemplary ANN model 110-10, the NPU scheduler 130 may determine a computation order from the input to the output of the ANN model 110-10.

Thus, the NPU scheduler 130 may configure the memory address, in which the MAC computation values of each layer are stored, in the NPU internal memory 120 in consideration of the scheduling order. For example, a specific memory address may be a MAC computation value of the input layer 110-11 and the first connection network 110-12, and simultaneously, may be the input data of the first hidden layer 110-13. However, the present disclosure is not limited to the MAC computation value, and the MAC computation value may be also referred to as an ANN computation value.

At this time, since the NPU scheduler 130 knows that the MAC computation result of the input layer 110-11 and the first connection network 110-12 will be the input of the first hidden layer 110-13, the NPU scheduler 130 may control the same memory address to be used. That is, the NPU scheduler 130 may reuse the MAC computation value based on the data locality information or the information on the structure of the ANN model. Accordingly, the NPU system memory 120 may provide a memory reuse function.

That is, the NPU scheduler 130 stores the MAC computation value of the ANN model 110-10 in a specific area specified in any memory address of the NPU internal memory 120 according to the scheduling order and may be used as input data of the MAC computation of the next scheduling order in the specific area in which the MAC computation value is stored.

MAC Computation in Terms of First Processing Element PE1

The MAC computation will be described in detail in terms of the first processing element PE1. The first processing element PE1 may be designated to perform the MAC computation of the a1 node of the first hidden layer 110-13.

First, the first processing element PE1 inputs x1 node data of the input layer 110-11 to the first input unit of the multiplier 111, and inputs weight data between the x1 node and the a1 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the first processing element PE1 inputs x2 node data of the input layer 110-11 to the first input unit of the multiplier 111, and inputs weight data between the x2 node and the a1 node to the second input unit. The adder 112 adds the computation value of the multiplier 111 and the computation value of the accumulator 113. At this time, when (L)loops is one, the x1 node data computed in the previous step and a weight multiplication value between the x1 node and the a1 node are stored. Accordingly, the adder 112 generates the MAC computation value of the x1 node corresponding to the a1 node and the x2 node.

Third, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero.

The bit quantization unit 114 may be appropriately adjusted according to the accumulated value. In detail, as (L)loops increase, the bit width of the output value is increased. At this time, the NPU scheduler 130 may remove a predetermined sub bit so that the bit width of the computation value of the first processing element PE1 is (X) bit.

MAC Computation in Terms of Second Processing Element PE2

The MAC computation will be described in detail in terms of the second processing element PE2. The second processing element PE2 may be designated to perform the MAC computation of the a2 node of the first hidden layer 110-13.

First, the second processing element PE2 inputs x1 node data of the input layer 110-11 to the first input unit of the multiplier 111, and inputs weight data between the x1 node and the a2 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the second processing element PE2 inputs x2 node data of the input layer 110-11 to the first input unit of the multiplier 111, and inputs weight data between the x2 node and the a2 node to the second input unit. The adder 112 adds the computation value of the multiplier 111 and the computation value of the accumulator 113. At this time, when (L)loops is one, the x1 node data computed in the previous step and a weight multiplication value between the x1 node and the a2 node are stored. Accordingly, the adder 112 generates the MAC computation value of the x1 node corresponding to the a2 node and the x2 node.

Third, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

MAC Computation in Terms of Third Processing Element PE3

The MAC computation will be described in detail in terms of the third processing element PE3. The third processing element PE3 may be designated to perform the MAC computation of the a3 node of the first hidden layer 110-13.

First, the third processing element PE3 inputs x1 node data of the input layer 110-11 to the first input unit of the multiplier 111, and inputs weight data between the x1 node and the a3 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the third processing element PE3 inputs x2 node data of the input layer 110-11 to the first input unit of the multiplier 111, and inputs weight data between the x2 node and the a3 node to the second input unit. The adder 112 adds the computation value of the multiplier 111 and the computation value of the accumulator 113. At this time, when (L)loops is one, the x1 node data computed in the previous step and a weight multiplication value between the x1 node and the a3 node are stored. Accordingly, the adder 112 generates the MAC computation value of the x1 node corresponding to the a3 node and the x2 node.

Third, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

Therefore, the NPU scheduler 130 of the NPU 100 may perform the MAC computation of the first hidden layer 110-13 by using simultaneously the three processing elements PE1 to PE3.

MAC Computation in Terms of Fourth Processing Element PE4

The MAC computation will be described in detail in terms of the fourth processing element PE4. The fourth processing element PE4 may be designated to perform the MAC computation of the b1 node of the second hidden layer 110-15.

First, the fourth processing element PE4 inputs a1 node data of the first hidden layer 110-13 to the first input unit of the multiplier 111, and inputs weight data between the a1 node and the b1 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the fourth processing element PE4 inputs a2 node data of the first hidden layer 110-13 to the first input unit of the multiplier 111, and inputs weight data between the a2 node and the b1 node to the second input unit. The adder 112 adds the computation value of the multiplier 111 and the computation value of the accumulator 113. At this time, when (L)loops is one, the a1 node data computed in the previous step and a weight multiplication value between the a1 node and the b1 node are stored. Accordingly, the adder 112 generates the MAC computation value of the a1 node corresponding to the b1 node and the a2 node. At this time, a counter value of (L)loops may be two.

Third, the fourth processing element PE4 inputs a3 node data of the input layer 110-11 to the first input unit of the multiplier 111, and inputs weight data between the a3 node and the b1 node to the second input unit. The adder 112 adds the computation value of the multiplier 111 and the computation value of the accumulator 113. At this time, when (L)loops are two, the MAC computation value of the a1 node corresponding to the b1 node computed in the previous step and the a2 node is stored. Accordingly, the adder 112 generates the MAC computation value of the a1 node corresponding to the b1 node, the a2 node, and the a3 node.

Fourth, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

MAC Computation in Terms of Fifth Processing Element PE5

The MAC computation will be described in detail in terms of the fifth processing element PE5. The fifth processing element PE5 may be designated to perform the MAC computation of the b2 node of the second hidden layer 110-15.

First, the fifth processing element PE5 inputs a1 node data of the first hidden layer 110-13 to the first input unit of the multiplier 111, and inputs weight data between the a1 node and the b2 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the fifth processing element PE5 inputs a2 node data of the first hidden layer 110-13 to the first input unit of the multiplier 111, and inputs weight data between the a2 node and the b2 node to the second input unit. The adder 112 adds the computation value of the multiplier 111 and the computation value of the accumulator 113. At this time, when (L)loops is one, the a1 node data computed in the previous step and a weight multiplication value between the a1 node and the b2 node are stored. Accordingly, the adder 112 generates the MAC computation value of the a1 node corresponding to the b2 node and the a2 node. At this time, a counter value of (L)loops may be two.

Third, the fifth processing element PE5 inputs a3 node data of the input layer 110-11 to the first input unit of the multiplier 111, and inputs weight data between the a3 node and the b2 node to the second input unit. The adder 112 adds the computation value of the multiplier 111 and the computation value of the accumulator 113. At this time, when (L)loops is two, the MAC computation value of the a1 node corresponding to the b2 node computed in the previous step and the a2 node is stored. Accordingly, the adder 112 generates the MAC computation value of the a1 node corresponding to the b2 node, the a2 node, and the a3 node.

Fourth, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

MAC Computation in Terms of Sixth Processing Element PE6

The MAC computation will be described in detail in terms of the sixth processing element PE6. The sixth processing element PE6 may be designated to perform the MAC computation of the b3 node of the second hidden layer 110-15.

First, the sixth processing element PE6 inputs a1 node data of the first hidden layer 110-13 to the first input unit of the multiplier 111, and inputs weight data between the a1 node and the b3 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the sixth processing element PE6 inputs a2 node data of the first hidden layer 110-13 to the first input unit of the multiplier 111, and inputs weight data between the a2 node and the b3 node to the second input unit. The adder 112 adds the computation value of the multiplier 111 and the computation value of the accumulator 113. At this time, when (L)loops is one, the a1 node data computed in the previous step and a weight multiplication value between the a1 node and the b3 node are stored. Accordingly, the adder 112 generates the MAC computation value of the a1 node corresponding to the b3 node and the a2 node. At this time, a counter value of (L)loops may be two.

Third, the sixth processing element PE6 inputs a3 node data of the input layer 110-11 to the first input unit of the multiplier 111, and inputs weight data between the a3 node and the b3 node to the second input unit. The adder 112 adds the computation value of the multiplier 111 and the computation value of the accumulator 113. At this time, when (L)loops is two, the MAC computation value of the a1 node corresponding to the b3 node computed in the previous step and the a2 node is stored. Accordingly, the adder 112 generates the MAC computation value of the a1 node corresponding to the b3 node, the a2 node, and the a3 node.

Fourth, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

Therefore, the NPU scheduler 130 of the NPU 100 may perform the MAC computation of the second hidden layer 110-15 by using simultaneously the three processing elements PE4 to PE6.

MAC Computation in Terms of Seventh Processing Element PE7

The MAC computation will be described in detail in terms of the seventh processing element PE7. The seventh processing element PE7 may be designated to perform the MAC computation of the y1 node of the output layer 110-17.

First, the seventh processing element PE7 inputs b1 node data of the second hidden layer 110-15 to the first input unit of the multiplier 111, and inputs weight data between the b1 node and the y1 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the seventh processing element PE7 inputs b2 node data of the second hidden layer 110-15 to the first input unit of the multiplier 111, and inputs weight data between the b2 node and the y1 node to the second input unit. The adder 112 adds the computation value of the multiplier 111 and the computation value of the accumulator 113. At this time, when (L)loops is one, the b1 node data computed in the previous step and a weight multiplication value between the b1 node and the y1 node are stored. Accordingly, the adder 112 generates the MAC computation value of the b1 node corresponding to the y1 node and the b2 node. At this time, a counter value of (L)loops may be two.

Third, the seventh processing element PE7 inputs b3 node data of the input layer 110-11 to the first input unit of the multiplier 111, and inputs weight data between the b3 node and the y1 node to the second input unit. The adder 112 adds the computation value of the multiplier 111 and the computation value of the accumulator 113. At this time, when (L)loops is two, the MAC computation value of the b1 node corresponding to the y1 node computed in the previous step and the b2 node is stored. Accordingly, the adder 112 generates the MAC computation value of the b1 node corresponding to the y1 node, the b2 node, and the b3 node.

Fourth, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

MAC Computation in Terms of Eighth Processing Element PE8

The MAC computation will be described in detail in terms of the eighth processing element PE8. The eighth processing element PE8 may be designated to perform the MAC computation of the y2 node of the output layer 110-17.

First, the eighth processing element PE8 inputs b1 node data of the second hidden layer 110-15 to the first input unit of the multiplier 111, and inputs weight data between the b1 node and the y2 node to the second input unit. The adder 112 adds the computation value of the multiplier 111 and the computation value of the accumulator 113. At this time, when (L)loops are zero, the accumulated value is zero because there is no accumulated value. Accordingly, the computation value of the adder 112 may be the same as the computation value of the multiplier 111. At this time, a counter value of (L)loops may be one.

Second, the eighth processing element PE8 inputs b2 node data of the second hidden layer 110-15 to the first input unit of the multiplier 111, and inputs weight data between the b2 node and the y2 node to the second input unit. The adder 112 adds the computation value of the multiplier 111 and the computation value of the accumulator 113. At this time, when (L)loops is one, the b1 node data computed in the previous step and a weight multiplication value between the b1 node and the y2 node are stored. Accordingly, the adder 112 generates the MAC computation value of the b1 node corresponding to the y2 node and the b2 node. At this time, a counter value of (L)loops may be two.

Third, the eighth processing element PE8 inputs b3 node data of the input layer 110-11 to the first input unit of the multiplier 111, and inputs weight data between the b3 node and the y2 node to the second input unit. The adder 112 adds the computation value of the multiplier 111 and the computation value of the accumulator 113. At this time, when (L)loops is two, the MAC computation value of the b1 node corresponding to the y2 node computed in the previous step and the b2 node is stored. Accordingly, the adder 112 generates the MAC computation value of the b1 node corresponding to the y2 node, the b2 node, and the b3 node.

Fourth, the NPU scheduler 130 may terminate the MAC computation of the first processing element PE1 based on the data locality information or the information on the structure of the ANN model. At this time, the accumulator 113 may be initialized by inputting an initialization reset. That is, the counter value of (L)loops may be initialized to zero. The bit quantization unit 114 may be appropriately adjusted according to the accumulated value.

Therefore, the NPU scheduler 130 of the NPU 100 may perform the MAC computation of the output layer 110-17 by using simultaneously the two processing elements PE7 to PE8.

When the MAC computation of the eighth processing element PE8 is completed, the inference computation of the ANN model 110-10 may be completed. That is, it may be determined that the ANN model 110-10 has completed the inference computation of one frame. If the NPU 100 infers video data in real time, image data of the next frame may be input to the x1 and x2 input nodes of the input layer 110-11. At this time, the NPU scheduler 130 may store the image data of the next frame to a memory address that stores the input data of the input layer 110-11. If this process is repeated for each frame, the NPU 100 may process the inference computation in real time. Further, there is also an effect of reusing the memory address configured once.

In the case of the ANN model 110-10 in FIG. 5, the NPU scheduler 130 may determine a computation scheduling order based on the data locality information or the information on the structure of the ANN model 110-10 for the inference computation of the ANN model 110-10 by the NPU 100. The NPU scheduler 130 may configure a memory address required for the NPU internal memory 120 based on the computation scheduling order. The NPU scheduler 130 may configure a memory address that reuses the memory based on data locality information or information on a structure of the ANN model 110-10. The NPU scheduler 130 may perform the inference operation by designating the processing elements PE1 to PE8 required for the inference computation.

In detail, when the weight data connected to one node increases by L, the number of (L)loops of the accumulator of the processing element may be configured to be L−1. That is, even if the weight data of the ANN increases, the accumulator may easily perform the inference computation by increasing the cumulative number of the accumulator.

That is, the NPU scheduler 130 of the NPU 100 according to an embodiment of the present disclosure may control the processing element array 110 and the NPU internal memory 120 based on the data locality information or the information on the structure of the ANN model including the data locality information or the information on the structure of the input layer 110-11, the first connection network 110-12, the first hidden layer 110-13, the second connection network 110-14, the second hidden layer 110-15, the third connection network 110-16, and the output layer 110-17.

That is, the NPU scheduler 130 may configure memory address values corresponding to node data of the input layer 110-11, node data of the first connection network 110-12, node data of the first hidden layer 110-13, node data of the second connection network 110-14, node data of the second hidden layer 110-15, node data of the third connection network 110-16, and node data of the output layer 110-17 in the NPU memory system 110.

Hereinafter, the scheduling of the NPU scheduler 130 will be described in detail. The NPU scheduler 130 may schedule the computation order of the ANN model based on the data locality information or the information on the structure of the ANN model.

The NPU scheduler 130 may acquire a memory address value in which the node data of the layer and the weight data of the connection network of the ANN model are stored based on the data locality information or the information on the structure of the ANN model.

For example, the NPU scheduler 130 may acquire a memory address value in which the node data of the layer and the weight data of the connection network of the ANN model stored in a main memory are stored. Accordingly, the NPU scheduler 130 may bring the node data of the layer and the weight data of the connection network of the ANN model to be driven from the main memory and store the data in the NPU internal memory 120. The node data of each layer may have each corresponding memory address value. The weight data of each connection network may have each corresponding memory address value.

The NPU scheduler 130 may schedule a computation order of the processing element array 110 based on the data locality information or the information on the structure of the ANN model, for example, the arrangement data locality information or the information on a structure of the layers of the ANN of the ANN model.

For example, the NPU scheduler 130 may acquire weight data, that is, connection network data having weight values of three layers connecting four ANN layers and each layer. In this case, a method of scheduling a processing order based on the data locality information or the information on the structure of the ANN model by the NPU scheduler 130 will be described below as an example.

For example, the NPU scheduler 130 may configure input data for inference computation as node data of a first layer which is an input layer 110-11 of the ANN model 110-10 and schedule an MAC computation of the node data of the first layer and the weight data of the first connection network corresponding to the first layer to be first performed. Hereinafter, merely for convenience of the description, the corresponding computation is referred to as a first computation, a result of the first computation is referred to as a first computation value, and the corresponding scheduling may be referred to as a first scheduling.

For example, the NPU scheduler 130 configures the first computation value as the node data of the second layer corresponding to the first connection network and may schedule the MAC computation of the node data of the second layer and the weight data of the second connection network corresponding to the second layer to be performed after the first scheduling. Hereinafter, merely for convenience of the description, the corresponding computation is referred to as a second computation, a result of the second computation is referred to as a second computation value, and the corresponding scheduling may be referred to as a second scheduling.

For example, the NPU scheduler 130 configures the second computation value as the node data of the third layer corresponding to the second connection network and may schedule the MAC computation of the node data of the third layer and the weight data of the third connection network corresponding to the third layer to be performed after the second scheduling. Hereinafter, merely for convenience of the description, the corresponding computation is referred to as a third computation, a result of the third computation is referred to as a third computation value, and the corresponding scheduling may be referred to as a third scheduling.

For example, the NPU scheduler 130 configures the third computation value as node data of the fourth layer which is the output layer 110-17 corresponding to the third connection network and schedule an inference result stored in the node data of the fourth layer to be stored in the NPU internal memory 120. Hereinafter, merely for convenience for the description, the corresponding scheduling may be referred to as a fourth scheduling. The inference result value may be transmitted and used to various components of the edge device 1000.

For example, if the inference result value is a result value of detecting a specific keyword, the NPU 100 may transmit the inference result to the central processing unit 1080, and the edge device 1000 may perform an operation corresponding to the specific keyword.

For example, the NPU scheduler 130 may drive the first to third processing elements PE1 to PE3 in the first scheduling.

For example, the NPU scheduler 130 may drive the fourth to sixth processing elements PE4 to PE6 in the second scheduling.

For example, the NPU scheduler 130 may drive the seventh to eighth processing elements PE7 to PE8 in the third scheduling.

For example, the NPU scheduler 130 may output the inference result in the fourth scheduling.

In summary, the NPU scheduler 130 may control the NPU internal memory 120 and the processing element array 110 so as to perform the computations in order of the first scheduling, the second scheduling, the third scheduling, and the fourth scheduling. That is, the NPU scheduler 130 may be configured to control the NPU internal memory 120 and the processing element array 110 so as to perform the computations in the configured scheduling order.

In summary, the NPU 100 according to an embodiment of the present disclosure may be configured to schedule the processing order based on the structure of the layers of the ANN and the computation order data corresponding to the structure. The processing order to be scheduled may be a sequence including at least one process. For example, since the NPU 100 may predict all computation orders, it is also possible to schedule the next computation and to schedule computations in a specific order.

The NPU scheduler 130 may control the NPU internal memory 120 by using the scheduling order based on the data locality information or the information on the structure of the ANN model, thereby improving the memory reuse rate.

The computation value of one layer may have a feature to be an input data of the next layer due to the characteristic of the ANN computation driven by the NPU 100 according to the embodiment of the present disclosure.

Thus, the NPU 100 controls the NPU internal memory 120 according to the scheduling order, thereby improving the memory reuse rate of the NPU internal memory 120.

In detail, when the NPU scheduler 130 is configured to receive the data locality information or the information on the structure of the ANN model and may determine an order in which the computation of the ANN is performed by the received data locality information or information on a structure of the ANN model, the NPU scheduler 130 may determine that the computation result of the node data of the specific layer of the ANN model and the weight data of the specific connection network becomes the node data of the corresponding layer. Accordingly, the NPU scheduler 130 may reuse a value of a memory address in which the corresponding computation result is stored in the subsequent (next) computation.

For example, the first computation value of the first scheduling described above is configured as the node data of the second layer of the second scheduling. Specifically, the NPU scheduler 130 may reconfigure the memory address value corresponding to the first computation value of the first scheduling stored in the NPU internal memory 120 to a memory address value corresponding to the node data of the second layer of the second scheduling. That is, the memory address value may be reused. Accordingly, the NPU scheduler 130 reuses the memory address value of the first scheduling, so that the NPU internal memory 120 has an effect of being usable as the node data of the second layer of the second scheduling without a separate memory writing operation.

For example, the second computation value of the second scheduling described above is configured as the node data of the third layer of the third scheduling. Specifically, the NPU scheduler 130 may reconfigure the memory address value corresponding to the second computation value of the second scheduling stored in the NPU internal memory 120 to a memory address value corresponding to the node data of the third layer of the third scheduling. That is, the memory address value may be reused. Accordingly, the NPU scheduler 130 reuses the memory address value of the second scheduling, so that the NPU internal memory 120 has an effect of being usable as the node data of the third layer of the third scheduling without a separate memory writing operation.

For example, the third computation value of the third scheduling described above is configured as the node data of the fourth layer of the fourth scheduling. Specifically, the NPU scheduler 130 may reconfigure the memory address value corresponding to the third computation value of the third scheduling stored in the NPU internal memory 120 to a memory address value corresponding to the node data of the fourth layer of the fourth scheduling. That is, the memory address value may be reused. Accordingly, the NPU scheduler 130 reuses the memory address value of the third scheduling, so that the NPU internal memory 120 has an effect of being usable as the node data of the fourth layer of the fourth scheduling without a separate memory writing operation.

Furthermore, the NPU scheduler 130 may be configured to determine the scheduling order and the memory reuse to control the NPU internal memory 120. In this case, the NPU scheduler 130 has an effect of analyzing the data locality information or the information on the structure of the ANN model to provide optimized scheduling. In addition, since the data required for a computation capable of reusing the memory may be not redundantly stored in the NPU internal memory 120, there is an effect of reducing the memory usage. In addition, the NPU scheduler 130 has an effect of calculating the memory usage reduced by the memory reuse to optimize the NPU internal memory 120.

The NPU 100 according to an embodiment of the present disclosure may be configured to receive a (N) bit input which is a first input of the first processing element PE1 as a variable value and receive an (M) bit input which is a second input as a constant value. Such a configuration may be equally configured to other processing elements of the processing element array 110. That is, one input of the processing element may be configured to receive the variable value and the other input may be configured to receive the constant value. Therefore, it is possible to reduce the number of data updates of the constant value.

At this time, the NPU scheduler 130 may configure the node data of the input layer 110-11, the first hidden layer 110-13, the second hidden layer 110-15, and the output layer 110-17 as a variable and configure the weight data of the first connection network 110-12, the weight data of the second connection network 110-14, and the weight data of the third connection network 110-16 as constants by using the data locality information or the information on the structure of the ANN model 110-10. That is, the NPU scheduler 130 may distinguish the constant value and the variable value. However, the present disclosure is not limited to constant and variable data types, and essentially, frequently variable values and non-variable values are divided, thereby improving the reuse rate of the NPU internal memory 120.

That is, the NPU system memory 120 may be configured to preserve the weight data of the connection networks stored in the NPU system memory 120 while the inference computation of the NPU 100 continues. Therefore, it is possible to reduce the memory reading and writing operation.

That is, the NPU system memory 120 may be configured to reuse the MAC computation values stored in the NPU system memory 120 while the inference computation of the NPU 100 continues.

That is, the data updating number of the memory address in which input data (N) bit of the first input unit of each processing element of the processing element array 110 is stored may be greater than the data updating number of the memory address in which input data (M) bit of the second input unit is stored. That is, there is an effect that the data updating number of the second input unit may be less than the data updating number of the first input unit.

On the other hand, in order to implement higher artificial intelligence, increasing the number of hidden layers of the ANN is referred to as a deep neural network (DNN).

The DNN includes various types, but a convolutional neural network (CNN) is known to extract the features of the input data and easily identify the patterns of features.

Figure 6A:
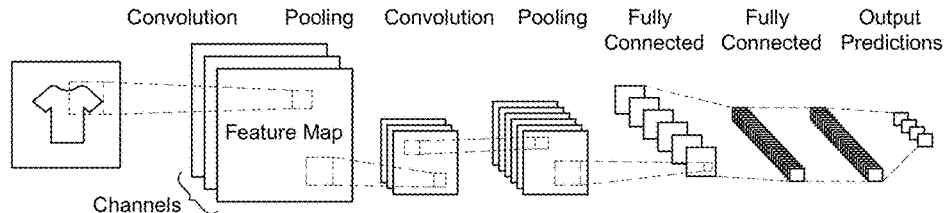
FIG. 6A is a diagram for describing a basic structure of a convolutional neural network.

FIG. 6A shows a basic structure of a convolutional neural network.

The convolutional neural network (CNN) is a neural network that performs a function similar to processing images in the visual cortex of the human brain. The CNN is known to be suitable for image processing.

Referring to FIG. 6A, an input image may be represented by a two-dimensional matrix consisting of a specific number of rows and a specific number of columns. The input image may be divided into several channels, in which the channel may represent the number of color components of the input image.

The CNN is a form in which a convolution operation and a pooling operation are repeated.

The convolution operation is a process of outputting a feature map that represents features of an image after convoluting a kernel matrix to the input image. The kernel matrix may include weight values. In the kernel matrix, the rows may have a predetermined number, and the columns may have a predetermined number. For example, the kernel matrix may have an N×M size. When the number of columns and the number of rows are the same as each other, N=M. The kernel may be present for each channel.

Generally, since the size of the kernel matrix is smaller than the size of the matrix in which the input image is represented, the convolution of the kernel matrix is performed while sliding on the input image.

The pooling operation is an operation for reducing the size of the matrix or emphasizing a specific value in the matrix.

The neural network that actually classifies the pattern is located at the rear end of a feature extraction neural network and is called a fully connected layer.

Figure 6B:
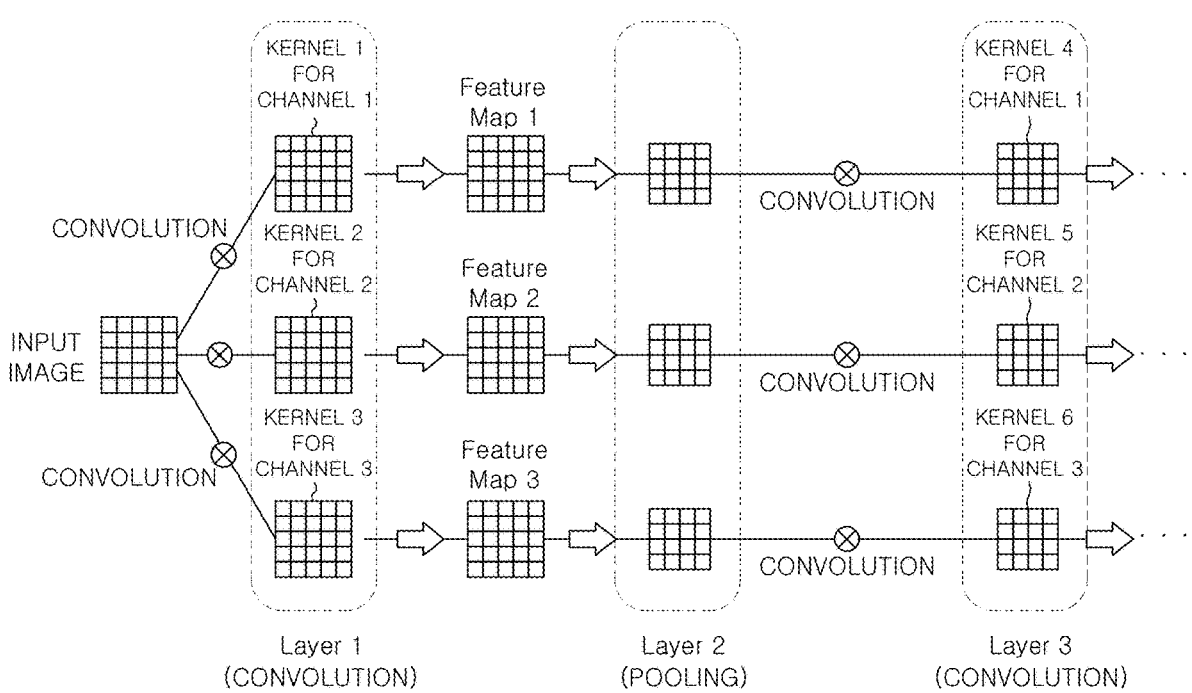
FIG. 6B is a comprehensive diagram for easily understanding an operation of the convolutional neural network.

FIG. 6B shows an operation of the CNN.

Referring to FIG. 6B, for example, it is illustrated that an input image is a two-dimensional matrix with a 5×5 size. FIG. 6B illustrates that three nodes, i.e., Channel 1, Channel 2, and Channel 3, are used as an example.

First, the convolution operation of Layer 1 will be described.

The input image is convoluted with Kernel 1 for Channel 1 in a first node of Layer 1, and as a result, Feature map 1 is output. In addition, the input image is convoluted with Kernel 2 for channel 2 in a second node of Layer 1 and as a result, Feature map 2 is output. In addition, the input image is convoluted with Kernel 3 for Channel 3 in a third node, and as a result, Feature map 3 is output.

Next, a pooling operation of Layer 2 will be described.

Feature map 1, Feature map 2, and Feature map 3 output from Layer 1 are input to three nodes of Layer 2. Layer 2 may receive the feature maps output from Layer 1 and perform polling. The pooling may reduce the size or emphasize a specific value in the matrix. The pooling method includes maximum value pooling, average pooling, and minimum value pooling. The maximum value pooling is used to collect the maximum value of values in a specific area of the matrix, and the average pooling may be used to obtain an average in the specific area.

In an example of FIG. 6B, it is illustrated that the size of the feature map of a 5×5 matrix is reduced to the size of a 4×4 matrix by pooling.

Specifically, the first node of Layer 2 receives Feature map 1 for Channel 1, performs pooling, and then outputs, for example, a 4×4 matrix. The second node of Layer 2 receives Feature map 2 for Channel 2, performs pooling, and then outputs, for example, a 4×4 matrix. The third node of Layer 2 receives Feature map 3 for Channel 3, performs pooling, and then outputs, for example, a 4×4 matrix.

Next, the convolution operation of Layer 3 will be described.

The first node of Layer 3 receives an output from the first node of Layer 2, performs the convolution with Kernel 4, and outputs the result. The second node of Layer 3 receives an output from the second node of Layer 2, performs the convolution with Kernel 5 for Channel 2, and outputs the result. Similarly, the third node of Layer 3 receives an output from the third node of Layer 2, performs the convolution with Kernel 6 for Channel 3, and outputs the result.

As described above, the convolution and the pooling may be repeated and finally output to a fully connected as illustrated in FIG. 6A. The corresponding output may be input to the ANN adapted to recognize an image again.

Figure 7A:
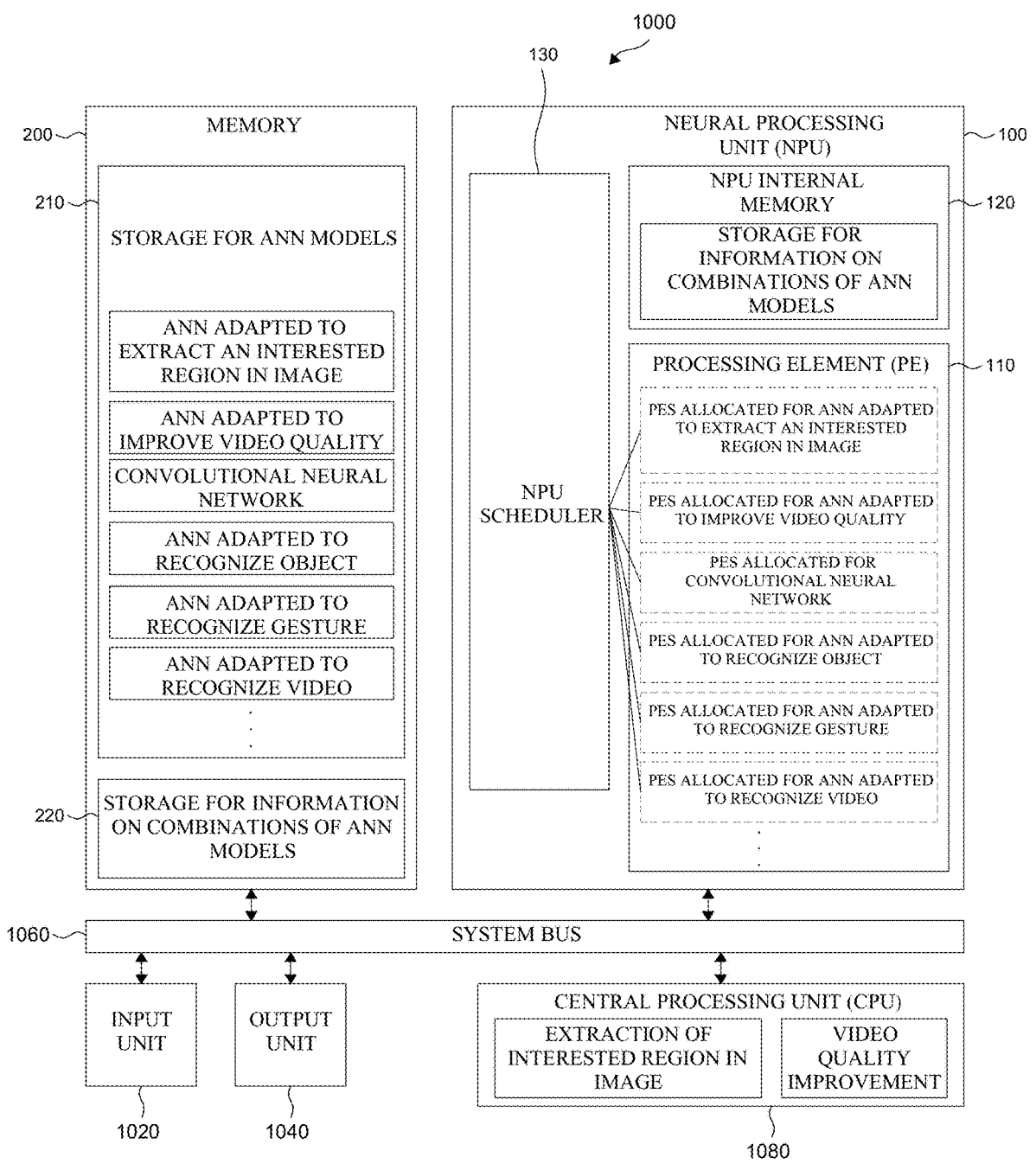
FIG. 7A is an exemplary diagram illustrating a configuration according to the present disclosure using components of the edge device of FIG. 4A or 4B.

FIG. 7A illustrates a configuration according to the present disclosure using components of the edge device of FIG. 4A or 4B.

In order to describe an operation of the edge device 1000, only some of the components of FIG. 4A or 4B are illustrated in FIG. 7. In an example of FIG. 7A, the NPU 100, the memory 200, the input unit 1020, the output unit 1040, the system bus 1060, and the central processing unit (CPU) 1080 are illustrated.

The memory 200 may include a storage for ANN models 210 and a storage for information on combinations of ANN models 220.

The storage for ANN models 210 in the memory 200 may store information on a plurality of ANN models. The information on the ANN model may include data locality information or information on a structure of the ANN model. The data locality information or the information on the structure may include one or more of information on the number of layers, arrangement data locality information or information on a structure of layers, information on channels in each layer, information on nodes in each layer, and information on a connection network. The information on the nodes may include information on a value, for example, a weight value of each node. The information on the connection network may include information on a connection relationship between the layers, or information on a connection relationship between the nodes.

As illustrated in FIG. 7A, the plurality of ANNs may include one or more of a) an ANN adapted to extract a region of interest (ROI) in an image, b) an ANN adapted to improve video quality, c) a CNN, d) an ANN adapted to recognize an object in the image, e) an ANN adapted to recognize a gesture, and f) an ANN adapted to recognize a voice.

The storage for information on combinations of ANN models 220 in the memory 200 may include one or more of information on a combination of one or more ANNs described above and information on a computation order of the ANN models. For example, the information on the combination may include information on a combination of a) the ANN adapted to extract the ROI in the image and c) the CNN. The information on the computation order may include information on sequential order or parallel order in the combination.

The information on the combination may vary for each function or executing application of the edge device 1000.

For example, when an application including voice recognition is being executed in the edge device 1000, the voice of the user input by the microphone 1022 of the input unit 1020 may be recognized. In this case, e) the ANN adapted to recognize the voice may be used alone.

As another example, when an application associated with a virtual reality (VR) game is being executed in the edge device 1000, the user's gesture or user's voice may be used as an input of the game. In this case, a combination of a) the ANN adapted to extract the ROI in the image, c) the CNN, d) the ANN adapted to recognize the object in the image, e) the ANN adapted to recognize the gesture, and f) the ANN adapted to recognize the voice may be required. As a detailed example, when a user's behavioral radius is set to the region of interest, a) the ANN adapted to extract the ROI in the image may extract only an image in the region of interest in the image photographed by the camera in the input unit 1020. The d) ANN adapted to recognize object may identify objects, that is, things, animals, and people in the image. The e) ANN adapted to recognize gesture may recognize a motion that is, a gesture of a person. In addition, f) the ANN adapted to recognize the voice may recognize the user's voice input by the microphone 1022 of the input unit 1020.

The NPU 100 may read information from the storage for information on the combinations 220 storage for information on combinations of ANN models 220 in the memory 200 and store the read information in the NPU internal memory 120. This may be performed when the NPU 100 acquires information on the application that is running from the CPU 1080 or receives a specific command from the CPU 1080.

Alternatively, the CPU 1080 may read information from the storage for information on the combinations 220 storage for information on combinations of ANN models 220 in the memory 200, based on the running application information (e.g., kind, type or identification information of the application). In addition, the CPU 1080 may determine information on the combination of the ANN models associated with the running application and then instruct to perform the computation for one or more ANN models to the NPU 100 based on the determined communication information.

When the function of the edge device 1000 is simple or only one application is executable, the information may be stored in the NPU internal memory 120 at all times to reduce an access frequency to the memory 200.

The NPU scheduler 130 in the NPU 100 configures the processing elements 110 capable of performing an operation for each ANN in the processing element (PE) array 110 based on the information stored in the NPU internal memory 120. For example, the NPU scheduler 130 divides the processing element (PE) array 110 into multiple groups, and then may configure a first group of PEs to perform an operation for the a) ANN adapted to extract ROI in the image and configure a second group of PEs to perform an operation for the c) CNN.

Meanwhile, depending on the type or operation mode of the edge device 1000, the NPU 100 may not drive some neural networks, such as a) the ANN adapted to extract the region of interest in the image or b) the ANN adapted to improve the video quality. Alternatively, in FIG. 7A, the CPU 1080 includes a circuit (e.g., a combination of transistors) configured to extract the region of interest in the image and a circuit (e.g., a combination of transistors) configured to improve the image.

The NPU scheduler 130 illustrated may allocate a plurality of ANN models to the PEs. For example, if the number of PEs is one hundred, thirty PEs may be allocated for the inference computation of the first ANN model, and fifty PEs may be allocated for the inference computation of the second ANN model. In this case, the remaining PEs which are not allocated may not operate.

The NPU scheduler 130 may determine a scheduling order based on the node values of each layer of the plurality of ANN models and the size and structure data of the weight value of each connection network and allocate the determined scheduling order to the PEs according to the scheduling order.

According to this, since the specific PEs may be allocated for the inference of a specific ANN model by the NPU scheduler 130, one NPU 100 has an effect of simultaneously processing a plurality of ANN models in parallel.

Since the NPU scheduler 130 may confirm the sizes of the node value of each layer of the plurality of ANN models and the weight value of each connection network of the plurality of ANN models by using the structure data of the ANN model, the NPU scheduler 130 may calculate the memory size required for the inference computation for each scheduling. Accordingly, the NPU scheduler 130 may store data required for each scheduling order within an available limit of the NPU internal memory capable of performing multitasking.

The NPU scheduler 130 may configure a priority of data stored in the NPU internal memory.

According to the present disclosure, since the high priority data is maintained in the NPU internal memory, it is possible to increase a memory reuse rate by reusing the stored data. Therefore, it is possible to reduce the inference speed and the power consumption.

The NPU 100 may be optimized to provide a multitasking function. The NPU 100 may be configured to drive at least two ANN models to provide at least two different inference computations. In addition, other ANN models may be driven by the inference result of one ANN model. That is, one ANN model may be always operated, and other ANN models may be driven under specific conditions.

As such, it is possible to reduce the power consumption of the edge device 1000 by driving any ANN model only in a specific condition.

Figure 7B:
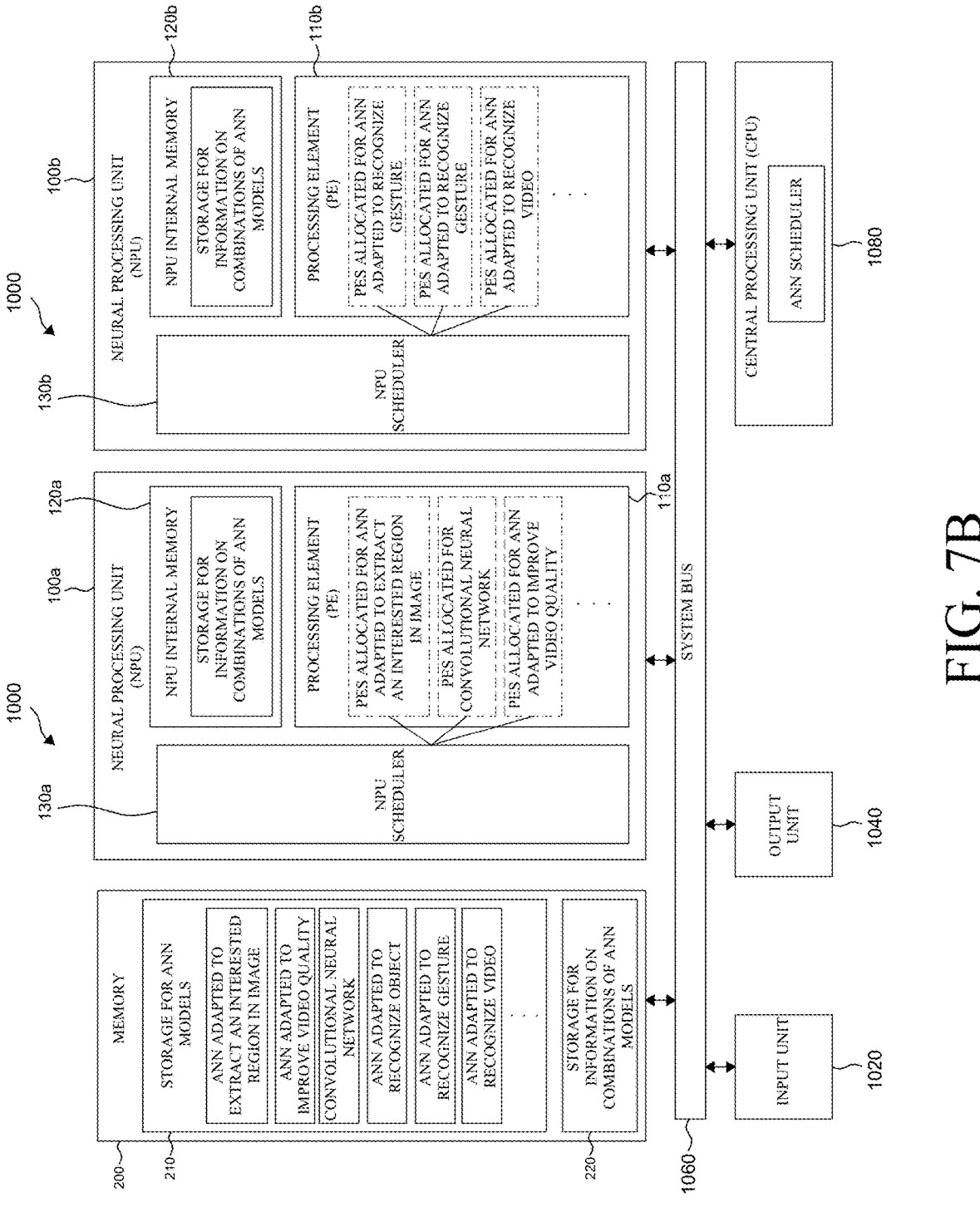
FIG. 7B is an exemplary diagram illustrating a modification of the edge device of FIG. 7A.

FIG. 7B illustrates a modification of the edge device of FIG. 7A.

According to a modification, the edge device 1000 may include a plurality of NPUs. In FIG. 7B, for example, it is illustrated that the edge device 1000 includes two NPUs 100a and 100b.

In FIG. 7B, for example, it is illustrated that PEs 110a in the first NPU 100a includes a first group of PEs that perform computations for the ANN model for extracting the region of interest in the image, a second group of PEs that perform computations for the convolutional ANN model, and a third group of PEs that perform computations for the ANN model for video improvement. In addition, it is illustrated that PEs 110b in the second NPU 100b includes a first group of PEs that perform computations for ANN model adapted to recognize object, a second group of PEs that perform computations for the ANN adapted to recognize gesture model, and a third group of PEs that perform computations for the voice recognition ANN model.

However, this is just exemplified, and the kinds or numbers of ANNs performed by the PEs 110a in the first NPU 100a and the PEs 110b in the second NPU 100b may be freely modified. Alternatively, the PEs 110a in the first NPU 100a and the PEs 110b in the second NPU 100b may also perform the computation for the same ANN model, in order to increase the computation rate through distribution processing.

According to the example illustrated in FIG. 7B, the CPU 1080 may include an ANN scheduler.

Based on the running application, the ANN scheduler in the CPU 1080 may allocate the computation for the first ANN model to the PEs 110a in the first NPU 100a and allocate the computation for the second ANN model to the PEs 110b in the second NPU 100b.

To this end, the CPU 1080 may determine one ANN model or a combination of the plurality of ANN models to be driven for the running application. Specifically, the ANN scheduler of the CPU 1080 may read combination information on the ANN models to be driven for the running application from the storage for information on the combinations 220 in the memory 200 and then distribute and allocate the computations for the plurality of ANN models to the PEs 110a in the first NPU 100a and the PEs 110b in the second NPU 100b. In addition, the ANN scheduler of the CPU 1080 may transmit information on the ANN model stored in the storage for ANN models 210 in the memory 200 to the first NPU 100a and the second NPU 100b.

The information on the combination may include information on the order of a plurality of ANN models.

The NPU scheduler 130 may generate an instruction associated with allocation to the PEs based on the information on the order.

The memory 200 of the edge device 1000 may store information on the operation order.

When the CPU 200 performs instructions for the application, the CPU 200 may generate the instructions.

Figure 8A:
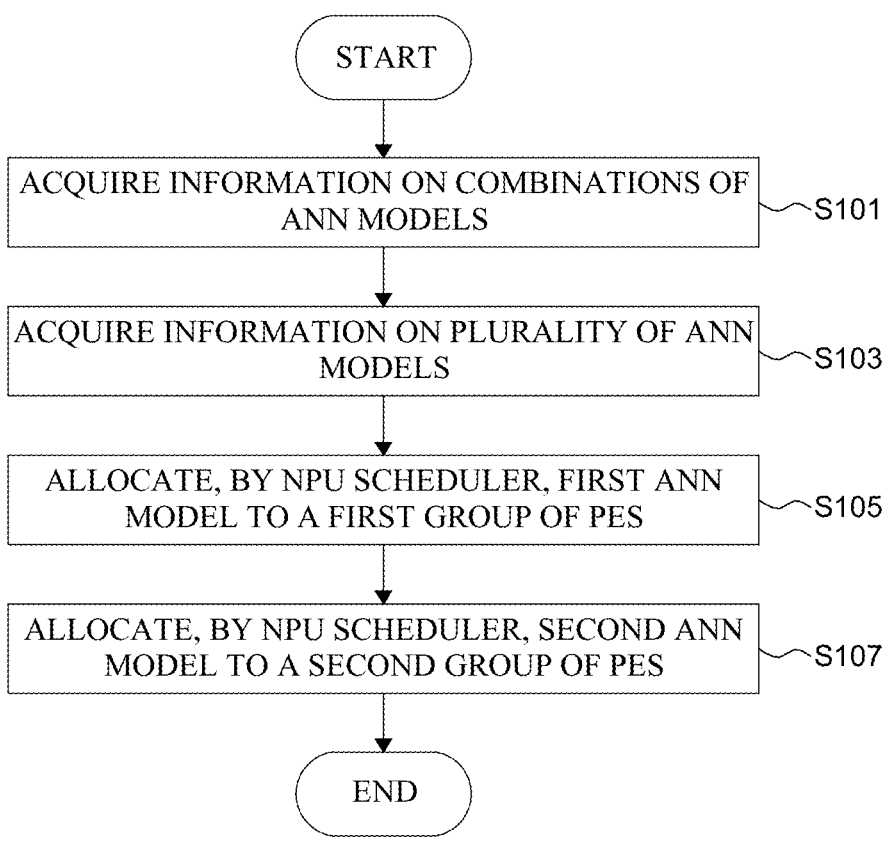
FIG. 8A is a flowchart illustrating an operation of the edge device of FIG. 7A or 7B.

FIG. 8A illustrates an operation of the edge device of FIG. 7A or 7B.

Referring to FIG. 8A, the NPU 100 of the edge device 1000 may acquire combination information on ANN models (S101). Specifically, when the application running in the edge device 1000 is a certain application, information on the combination of the ANN models required for driving the certain application may be acquired. The combination information on the ANN models may be acquired based on the information (e.g., kind, type or identification information of the application) on the application running in the edge device 1000.

The NPU 100 of the edge device 1000 may acquire information on a plurality of ANN models (S103). That is, when the application running in the edge device 1000 is a certain application, information on ANN models required for driving the certain application may be acquired. The information may be acquired based on the combination information described above. The information may include information on the order of the plurality of ANN models.

Then, the NPU scheduler 130 in the NPU 100 may allocate a first ANN model to the PEs in the first group (S105).

In addition, the NPU scheduler 130 in the NPU 100 may allocate a second ANN model to the PEs in the second group (S107).

As illustrated in FIG. 7A, when the edge device 1000 includes only one NPU, the PEs in the first group and the PEs in the second group may be physically different from each other. Alternatively, the PEs in the first group and the PEs in the second group may partially overlap with each other, but may be divided in a time division manner.

As illustrated in FIG. 7B, when the edge device 1000 includes a plurality of NPUs 100a and 100b, the PEs in the first group may be included in the first NPU 100a and the PEs in the second group may be included in the second NPU 100b.

Figure 8B:
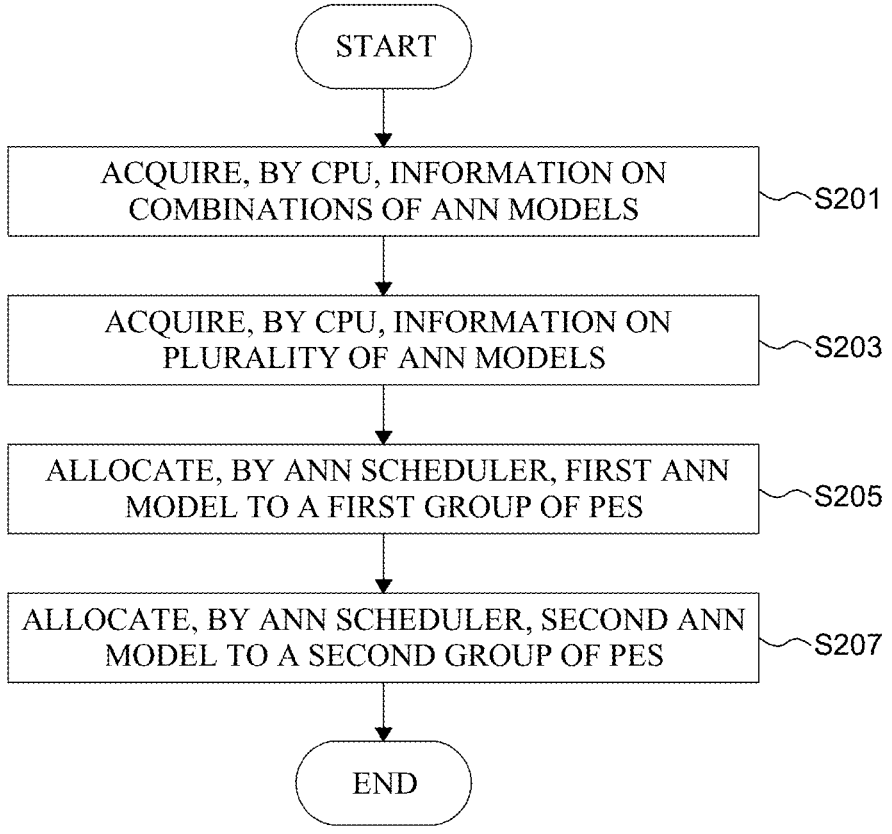
FIG. 8B is a flowchart illustrating a modification of FIG. 8A.

FIG. 8B illustrates a modification of FIG. 8A.

A process illustrated in FIG. 8B may be performed by the CPU 1080, unlike the process illustrated in FIG. 8A. Hereinafter, only portions different from the process illustrated in FIG. 8A will be described, and the same content will follow the content described with reference to FIG. 8A.

The CPU 1080 of the edge device 1000 may acquire combination information of the ANN models (S201).

The CPU 1080 of the edge device 1000 may acquire information on a plurality of ANN models (S203).

Then, the ANN scheduler in the CPU 1080 of FIG. 7B may allocate the first ANN model to the PEs in the first group (S205).

In addition, the ANN scheduler in the CPU 1080 of FIG. 7B may allocate the second ANN model to the PEs in the second group (S207).

Figure 9A:
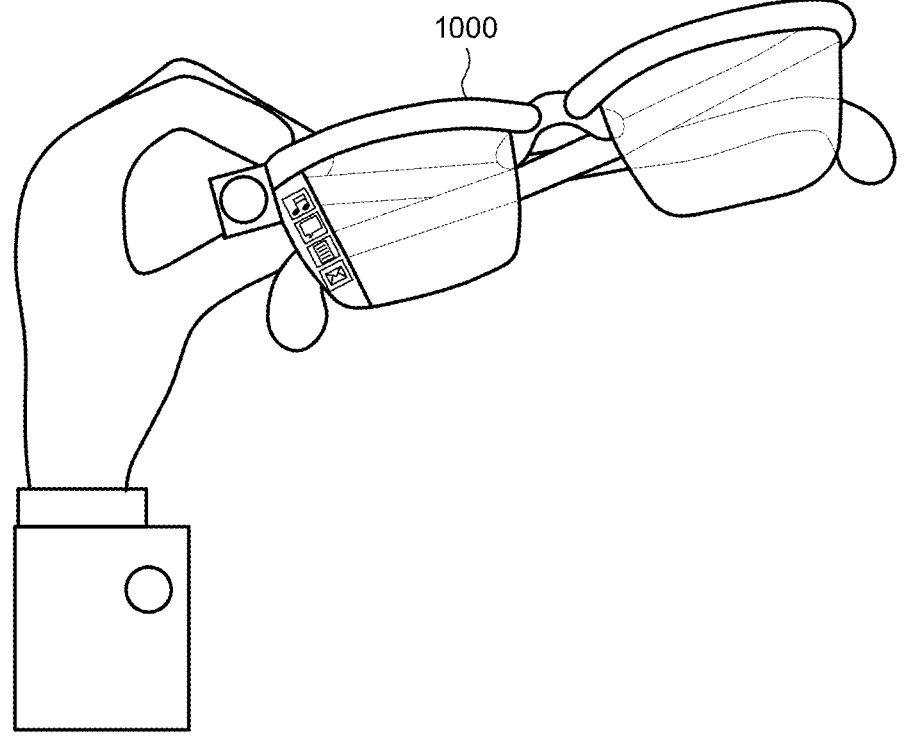
FIGS. 9A and 9B are exemplary diagrams respectively illustrating the edge device according to the present disclosure as an extended reality (XR) device.
Figure 9B:
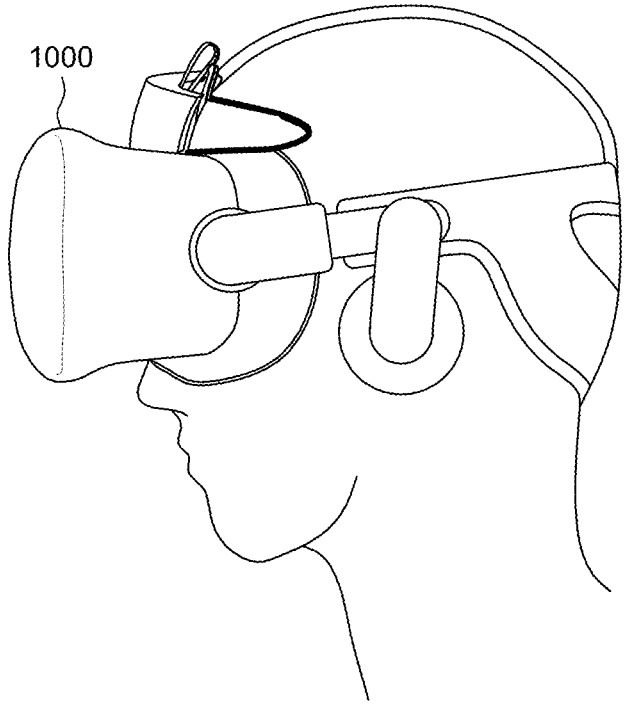

FIGS. 9A and 9B respectively illustrate examples in which the edge device is an extended reality (XR) device.

Extended reality (XR) collectively refers to virtual reality (VR), augmented reality (AR), and mixed reality (MR). The VR technology provides objects or backgrounds of the real world as only CG images, the AR technology provides CG images virtually made on the actual object images, and the MR technology is a computer graphics technology provided by mixing and merging virtual objects in the real world.

The MR technology is similar to the AR technology in that the real objects and the virtual objects are shown together. However, there is a difference in that in the AR technology, the virtual object is used as a complementary form to the real object, whereas in the MR technology, the virtual object and the real object are used in the same nature.

The XR technology may be applied to a head-mounted display (HMD), a head-up display (HUD), a mobile phone, a tablet PC, a laptop computer, a desktop computer, a TV, a digital signage, and the like, in which a device applied with the XR technology may be called an XR device.

Figure 10A:
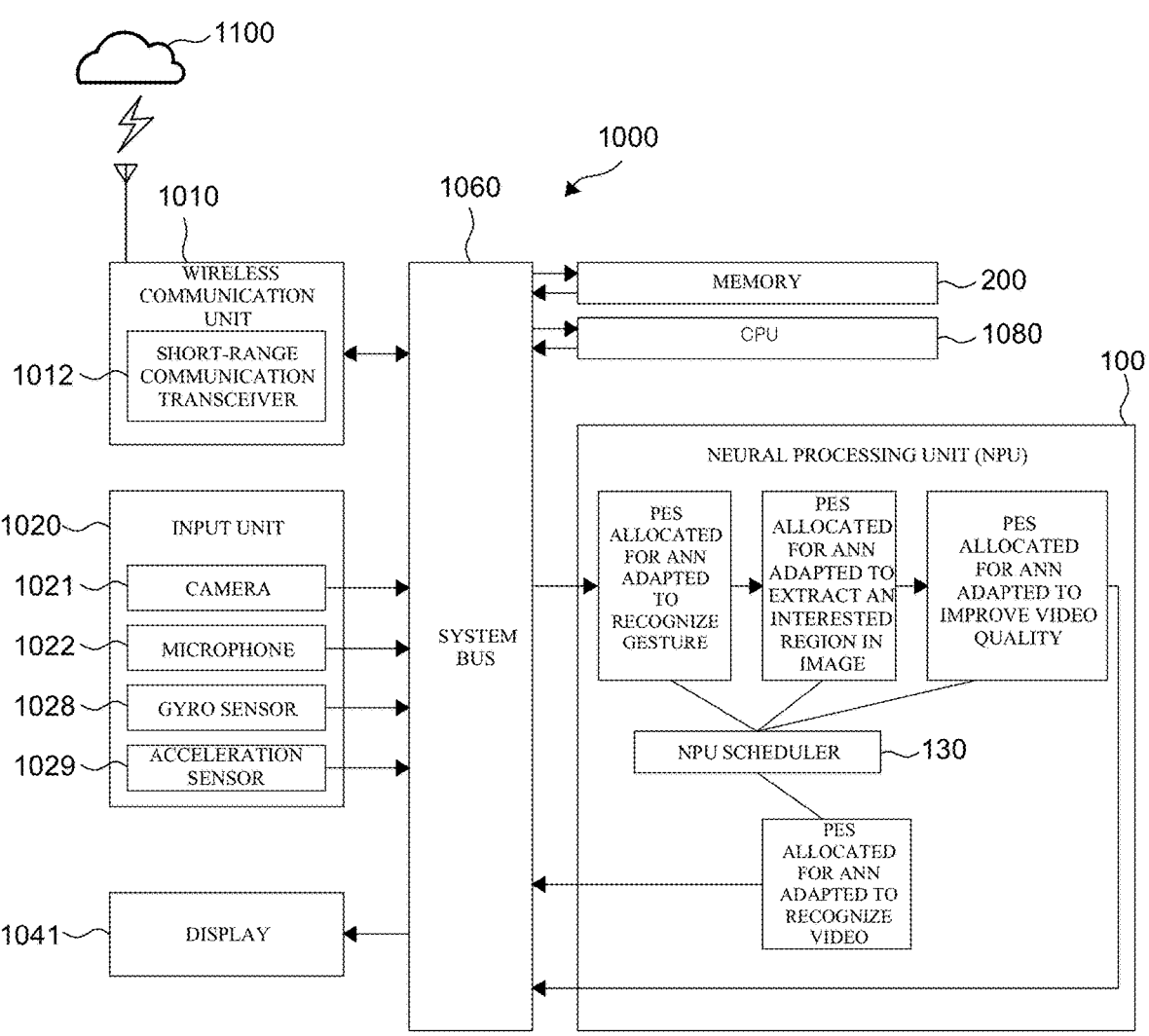
FIG. 10A is a block diagram exemplarily illustrating a configuration of the XR device of FIG. 9A or 9B.

FIG. 10A illustrates a configuration of the XR device of FIG. 9A or 9B.

As can be seen with reference to FIG. 10A, an XR device 1000 as an example of an edge device may include an NPU 100, a memory 200, a wireless communication unit 1010, an input unit 1020, a display 1041, a system bus 1060, and a CPU 1080 of FIG. 1 or 3.

The wireless communication unit 1010 may include a short-range communication transceiver 1012. The short-range communication transceiver 1012 may support, for example, wireless LAN (WLAN), wireless fidelity (Wi-Fi), Wi-Fi Direct, radio frequency identification (RFID) using Bluetooth, infrared data association (IrDA), ultra-wideband (UWB), ZigBee, near-field communication (NFC), wireless universal serial bus (Wireless USB), etc.

In addition, the XR device 1000 may include an acoustic output device or audio signal output terminal such as a speaker.

The NPU 100 may perform computations for a plurality of ANNs required for XR. For example, a plurality of ANNs required for XR may include one or more of an ANN adapted to recognize gesture, an ANN adapted to extract a region of interest in an image, an ANN adapted to improve video quality, and an ANN adapted to recognize voice.

The NPU scheduler 130 of the NPU 100 may allocate computations for the plurality of ANNs to PEs. That is, computations for a first ANN may be allocated to a first group of PEs and computations for a second ANN may be allocated to a second group of PEs. As a detailed example, the NPU scheduler 130 may allocate the computation for the ANN adapted to recognize gesture model to the first group of PEs, allocate the computation for the ANN adapted to extract the region of interest in the image to the second group of PEs, allocate the computation for the ANN adapted to improve video quality to the third group of PEs, and allocate the computation for the ANN adapted to recognize voice to the fourth group of PEs.

Figure 10B:
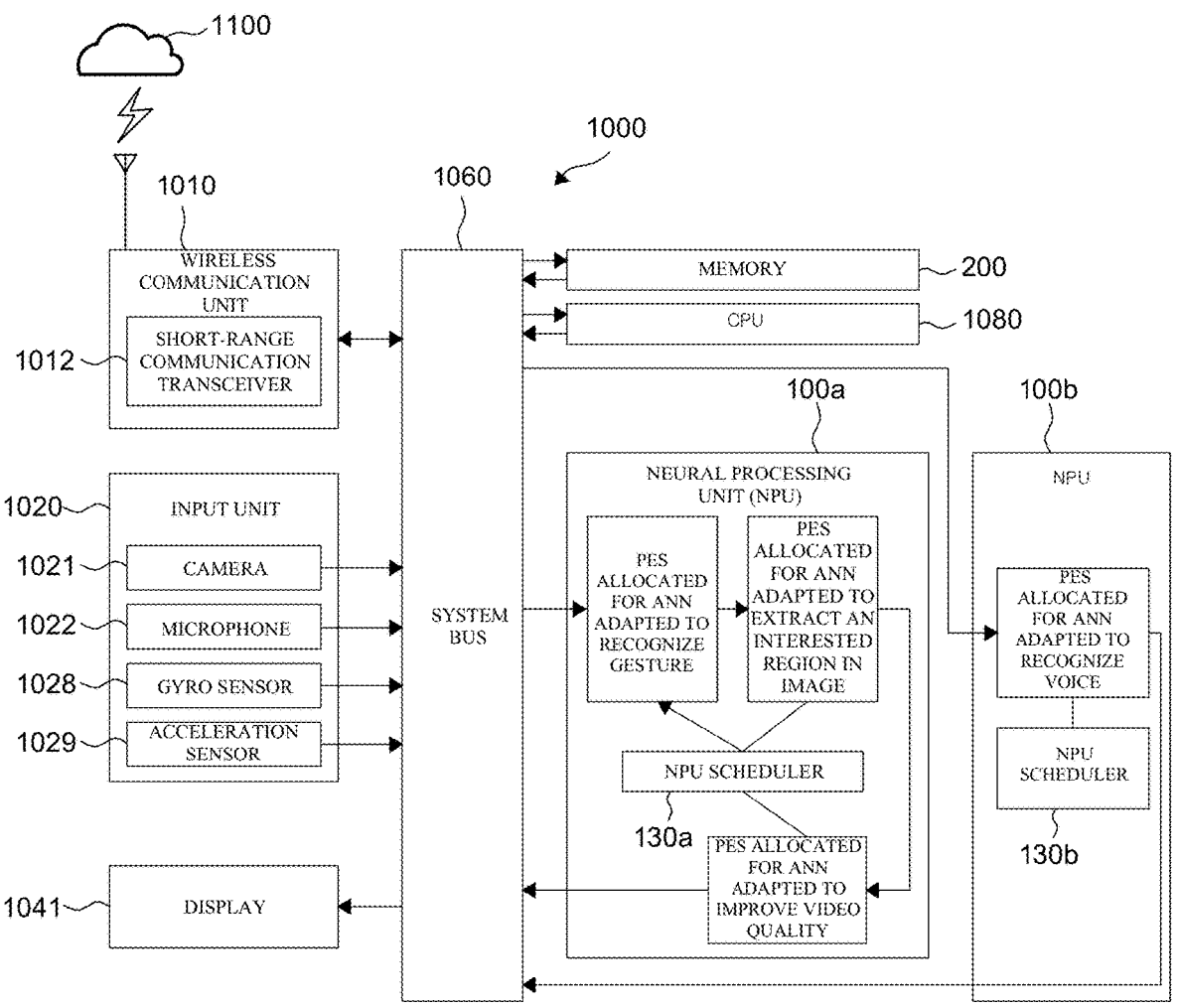
FIG. 10B is a block diagram illustrating a modification of FIG. 10A.

FIG. 10B illustrates a modification of FIG. 10A.

The XR device 1000 of FIG. 10B may include a plurality of NPUs, for example, two NPUs 100a and 100b, unlike FIG. 10A.

The CPU 1080 may acquire combination information on ANN models from the memory 200. The CPU 1080 may acquire information on a plurality of ANN models from the memory 200 based on the acquired combination information. Thereafter, the CPU 1080 may allocate the first ANN model to the first group of PEs and allocate the second ANN model to the second group of PEs.

In the allocation performed by the CPU 1080 as an example, FIG. 10B illustrates the first NPU 100a including a first group of PEs for performing the computation for the ANN adapted to recognize gesture model, a second group of PEs for performing the computation for the ANN adapted to extract the region of interest in the image, and a third group of PEs for performing the computation for the ANN model for video improvement. In FIG. 10B, the second NPU 100b includes a first group of PEs for the ANN adapted to recognize voice. However, this is only an example, and the type or number of neural networks performed by the first NPU 100a and the second NPU 100b may be freely modified.

Hereinafter, the allocation will be described with reference to FIGS. 10A and 10B together.

The XR device 1000 may communicate with an external device such as a server or other user terminals through the short-range communication transceiver 1012.

In addition, the short-range communication transceiver 1012 may receive a video for XR via a communication network. The received video may be transmitted to the CPU 1080.

The camera 1021 may include a plurality of cameras. For example, among a plurality of cameras, a first camera may capture a video in a direction viewed by the user to transmit the video to the CPU 1080. Then, a second camera may capture a left eye of the user to transmit the left eye to the CPU 1080, and a third camera may capture a right eye of the user to transmit the right eye to the CPU 1080.

The video received through the short-range communication transceiver 1012 and the video captured through the camera 1021 may be transmitted to the CPU 1080 after being temporarily stored in the memory 200. That is, the memory 200 may temporarily store the video, and the CPU 1080 may read, and process videos stored in the memory 200.

Further, the XR device 1000 may have a connection terminal for a memory card. The memory card may include, for example, a compact flash card, an SD memory card, a USB memory, and the like. The CPU 1080 may read or retrieve at least one video from the memory card, and the corresponding video may be stored in the memory 200.

The CPU 1080 may receive a video from the short-range communication transceiver 1012, the memory 200, and the camera 1021, and the received videos are combined to be generated as an XR video and output to the display 1041. For example, the CPU 1080 may synthesize a video received from the short-range communication transceiver 1012 and the memory 200 and the video output from the camera 1021 to generate an XR video.

The display 1041 may output the XR video according to the control of the CPU 1080. The display 1041 may include a transparent glass, and the XR video performed by video improvement processing may be output in a region of interest on the transparent glass.

The CPU 1080 may receive a user's command (e.g., a control command associated with an XR video) through the input unit 1020. For example, the CPU 1080 may receive a voice command through the microphone 1022. As another example, the CPU 1080 may receive a user's motion operation-based command through one or more of the camera 1021, the gyro sensor 1028, and/or the acceleration sensor 1029. Specifically, the CPU 1080 may detect the user's motion operation through one or more of the camera 1021, the gyro sensor 1028, and/or the acceleration sensor 1029.

The user's motion operation may include at least one of a user's eye gaze direction (e.g., a position of a user's pupil), a user's head direction and a head slope. In order to detect the user's eye gaze direction, a plurality of cameras 1021 may be provided. That is, the first camera may capture a video in a direction viewed by the user, the second camera may capture the user's left eye, and the third camera may capture the user's right eye.

Meanwhile, in order to recognize the user's motion operation, the CPU 1080 may instruct the NPU, that is, NPU 100 of FIG. 10A or NPUs 100a and 100b of FIG. 10B, to perform the computation for the ANN adapted to recognize gesture. In addition, the CPU 1080 may instruct the NPU 100 or 100a and 100b to perform the computation for the ANN adapted to extract the region of interest in the image.

Then, the NPU scheduler may allocate the computation for the ANN adapted to recognize gesture to the first group of PEs and allocate the computation for the ANN adapted to extract the region of interest in the image to the second group of PEs.

The first group of PEs may infer whether the user's motion is an intended control command, based on the user's motion operation detected through one or more of the camera 1021, the gyro sensor 1028 and/or the acceleration sensor 1029.

The second group of PEs may perform an inference for determining a region of interest (ROI) in the image, based on the user's control command inferred by the first group of PEs.

For example, the first group of PEs may infer what the user's motion is intended through the ANN adapted to recognize gesture, based on at least one of the user's head direction and the head slope detected by one or more of the gyro sensor 1028 and/or the acceleration sensor 1029. Then, the second group of PEs may infer the ROI based on the inferred user intention.

As another example, the first group of PEs may infer the user intention based on the position of the user's pupil detected by the camera 1021. Then, the second group of PEs may infer the ROI based on the inferred user intention. That is, the position of the pupil may be used to infer a position and/or direction of the gaze viewed by the user.

The ROI may be changed in real time according to the motion information of the user. This ROI may be utilized for the ANN adapted to improve video quality.

When the third group of PEs receive information on the ROI, the video in the ROI may be improved through the ANN adapted to improve video quality.

The video improvement may include, as described below with reference to FIG. 18, a decompressing/decoding process (S401), a video preprocessing process (S403), and a super resolution process (S405).

As described above, the XR device 1000 of FIG. 10A or 10B may determine an ROI based on the user's motion and improve a video for the determined ROI, to provide the user with an immersive realistic content. Furthermore, by computing only the ROI to high resolution, the required computation may be minimized to reduce the load on digital rendering.

Figure 11:
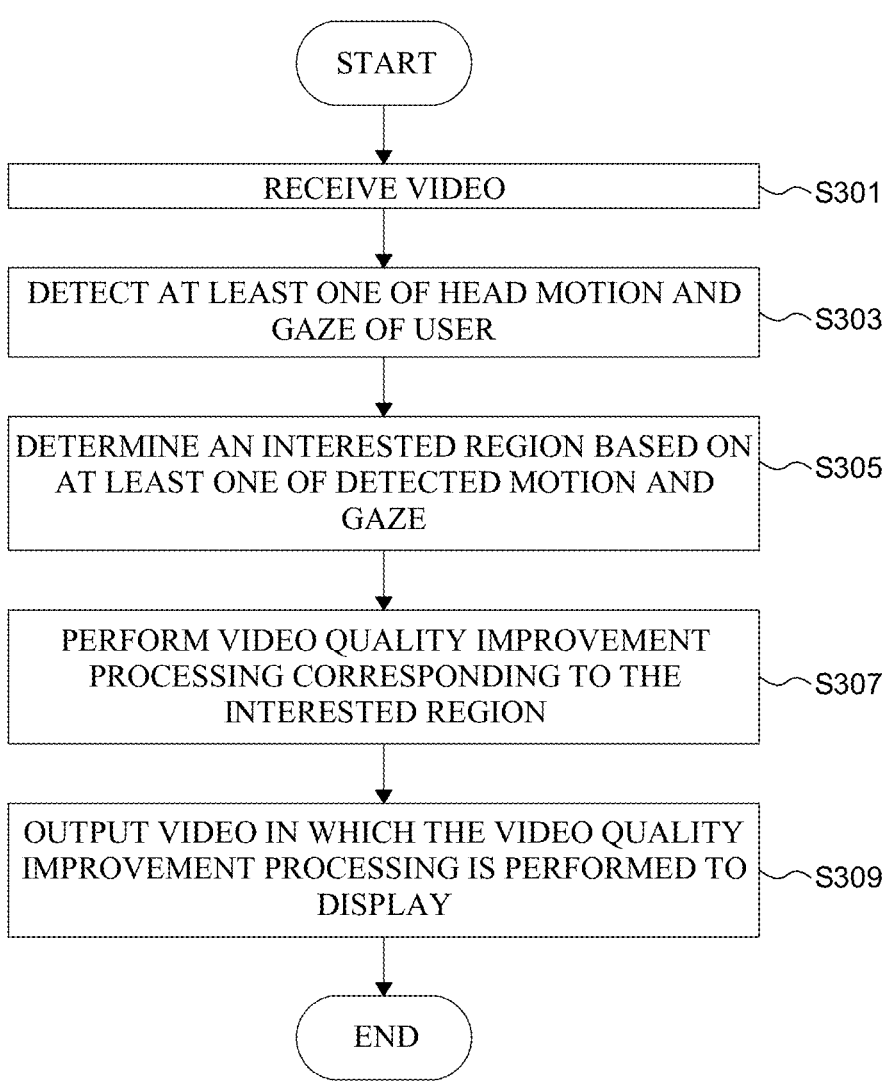
FIG. 11 is a flowchart illustrating an operation of the XR device of FIG. 10A or 10B.

FIG. 11 illustrates an operation of the XR device of FIG. 10A or 10B.

Referring to FIG. 11, the XR device 1000 as a kind of edge device may receive a video (S301). Then, the XR device 1000 may detect at least one of the user's head motion and the gaze (S303). Thereafter, the XR device 1000 may determine the ROI based on at least one of the detected motion and gaze (S305). Then, the XR device 1000 may perform video improvement processing for the ROI (S307). Finally, the XR device 1000 may output the video subjected to the video improvement processing on the display (S309).

Figure 12:
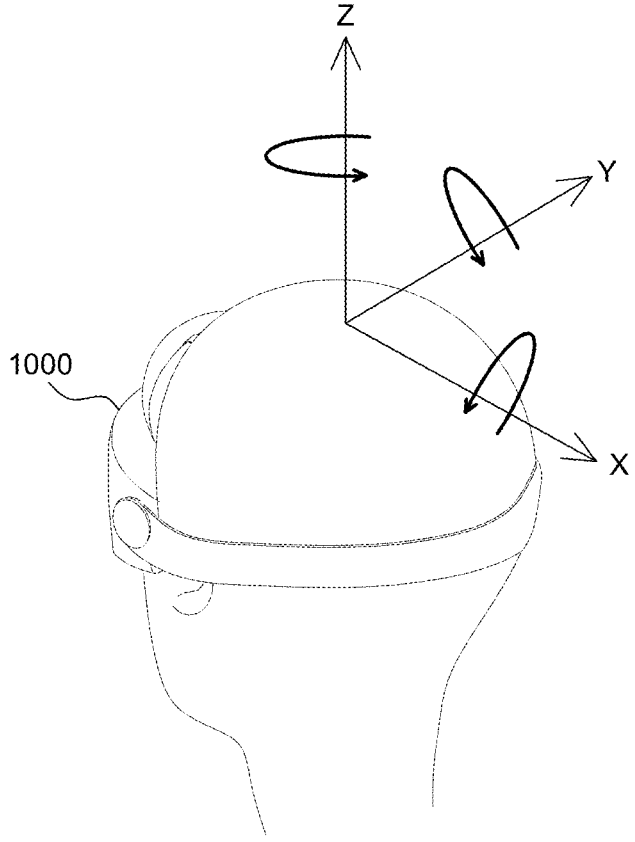
FIG. 12 is an exemplary diagram illustrating the XR device of FIG. 10A or 10B being worn on a user's head.

FIG. 12 illustrates an example in which the XR device of FIG. 10A or 10B is worn on a user's head.

As illustrated in FIG. 12, the XR device 1000 may be worn on the user's head and a display is provided on a front surface to display a video on the user's eye. The XR device 1000 may receive commands from the user through a camera, a microphone, a gyro sensor, and an angular velocity sensor, and may be operated according to the received command signal. The XR device 1000 is not limited thereto as an example of a realistic content providing device and may be configured in various forms that may be worn on the head of the human body, such as a glasses type, a helmet type, a hat type, and the like.

As illustrated in FIG. 12, the display of the XR device 1000 may be disposed to correspond to at least one of the right eye and the left eye of the user to directly output the video in front of the user's eyes.

As described above, the XR device 1000 may include a gyro sensor and/or an angular velocity sensor to detect the user's head motion wearing the XR device 1000.

In an example, the gyro sensor and/or the angular velocity sensor of the XR device 1000 may detect the user's head motion which moves in X axis, Y axis, and Z axis based on the center of the user's head. Here, the user's head motion may include at least one of the head direction and the head slope. The ROI of the user may be determined based on the measured head motion.

Figure 13:
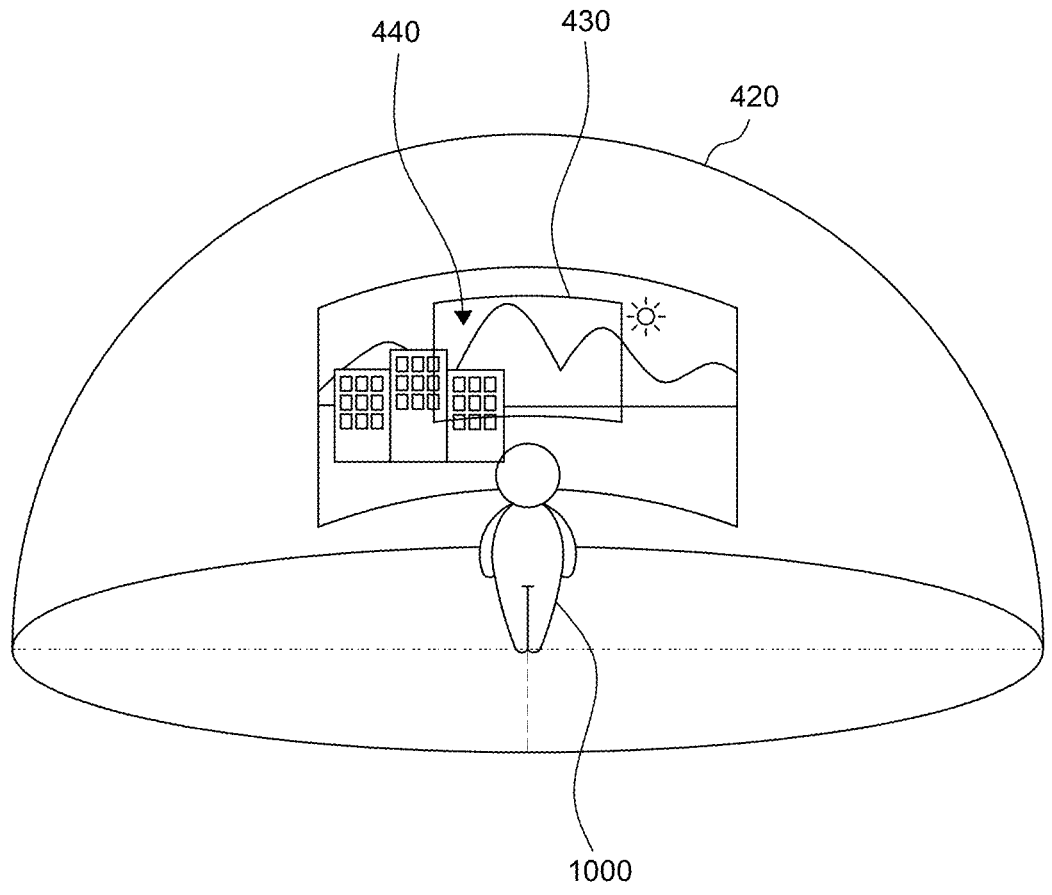
FIG. 13 is an exemplary diagram of a stereoscopic-space display of realistic content provided by the XR device 1000 according to an embodiment of the present disclosure.

FIG. 13 illustrates an example state in which realistic content, as provided by the XR device 1000 according to an embodiment of the present disclosure, is displayed in a stereoscopic space.

The XR device 1000 may output videos provided from a plurality of external devices or videos stored in the memory on the display.

The videos output by the XR device 1000 may be a VR video or an AR video.

The AR video or VR video may be a panoramic image and/or video to provide maximized vividness and immersion to a user.

The AR video or VR video may be a hemispherical video 420 to support watching in all directions (upper, lower, left, and right directions) around the user as a central axis. For example, the hemispherical video 420 may be a 360° video that supports a 360° viewer. The 360° video supporting the 360° viewer may be output to the user through the display of the XR device 1000 and may include a target video 440 corresponding to the ROI 430.

Here, the ROI 430 may correspond to the target video 440, which is a partial video of the video output on the display. For example, as illustrated in FIG. 13, the 360° video may include the target video 440, which is a partial video of the 360° video corresponding to the ROI 430 determined by the user's motion. Such a target video 440 may include a video subjected to the video improvement process by the ANN adapted to improve video quality.

In addition, the target video 440 may be changed and displayed in real time based on the head motion and/or gaze information of a user wearing the XR device 1000. At this time, the ANN adapted to improve video quality may perform the video improvement process for the partial video corresponding to the ROI 430 in real time. The AR video or VR video described above may be configured to allow the user to give a feeling of being in a virtual reality space, such as a hemispherical shape, a spherical shape, and a cylindrical shape, depending on a scene production.

Figure 14:
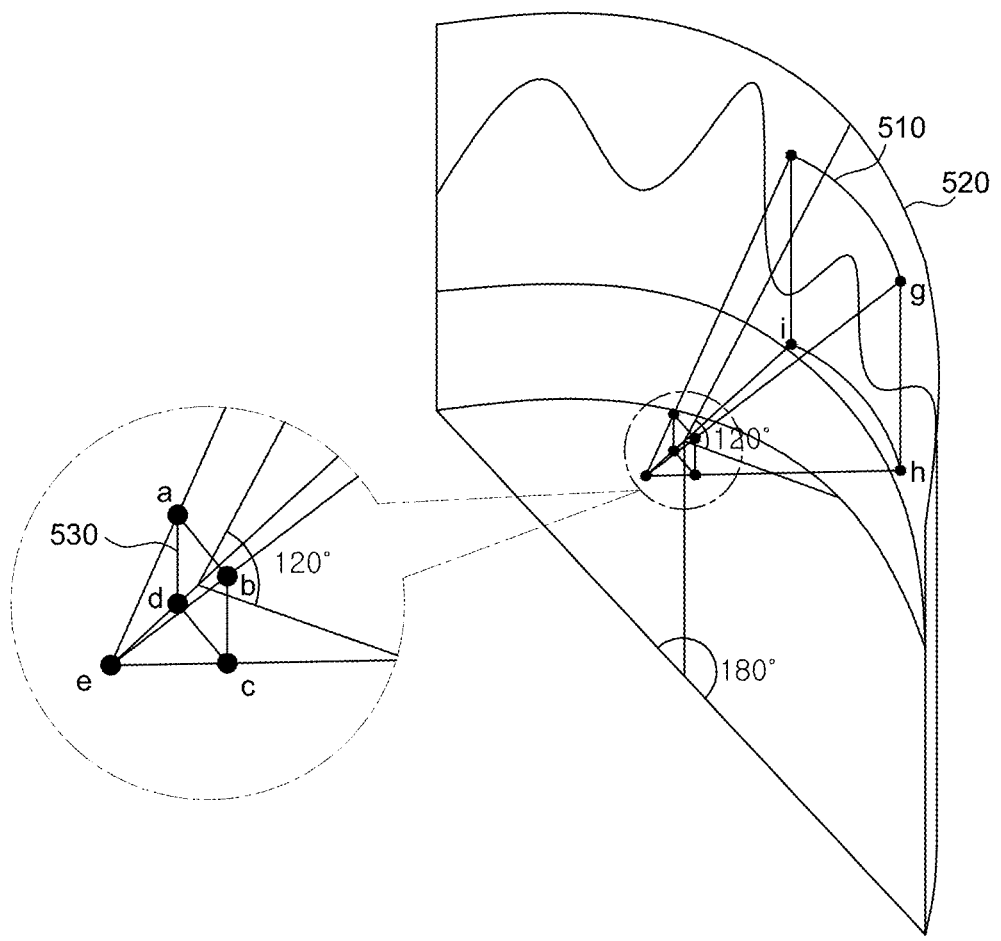
FIG. 14 is an exemplary diagram illustrating a range of a region of interest (ROI) that may be defined based on a viewing angle as viewed by a user.

FIG. 14 illustrates a range of a region of interest (ROI) that may be defined based on a viewing angle as viewed by a user.

A range 510 of the ROI may be defined based on an angle of view viewed from the user, that is, a viewing angle. Here, the range 510 of the ROI may be defined by a head position (e.g., head direction and/or head slope) and/or a gaze position (e.g., a position of pupil) detected by a motion detector. As illustrated in FIG. 14, a user who watches the video may have a predetermined viewing angle. Typically, a range 520 of the viewing angle may vary depending on a position of both eyes, so that the viewing angle varies with each individual. Thus, the range 520 of the viewing angle may be configured to be defined based on a position of both eyes (e.g., positions of the pupils).

The range 520 of the viewing angle may be defined based on a head position (e.g., head direction and head slope) and/or a position of both eyes of the user. As an example, a range of viewing angle combining both eyes of a person may have 180° in a horizontal direction and 120° in a vertical direction as illustrated in FIG. 14, but is not limited thereto, and may be defined as various angles.

The range 510 of the ROI may be determined through the head position and/or the position of both eyes detected by the gyro sensor and/or the angular velocity sensor and may be defined to be equal to or smaller than the range 520 of the viewing angle. For example, the range 510 of the ROI may be defined smaller than the range 520 of the viewing angle, such as 180° in the horizontal direction and 120° in the vertical direction. The gyro sensor and/or the acceleration sensor may detect the position of the head, and the camera may detect the position of the pupil. The position of the user's gaze, the direction of the user's gaze, and the range 510 of the ROI may be determined through the detected head position and/or pupil position.

According to an embodiment, as illustrated in FIG. 14, the position of the user's head (e.g., skull) is detected to generate a quadrangle 530 circumscribed to the shape of the face and detect positions a, b, c, and d of vertices of the quadrangle. Positions f, g, h, and i which meet an extension line connecting the detected four vertices a, b, c, and d and a center point e of the back of the head of the user on the display may be detected. The range 510 of the ROI may be determined based on the detected positions f, g, h, and i. As illustrated in FIG. 14, a region connecting four points f, g, h, and i on the display may be determined as the range 510 of the ROI. The process of defining the range 520 of the viewing angle and the range 510 of the ROI is not limited to the embodiment described above and may be defined by various methods.

FIGS. 15A-15D respectively illustrate a video improvement processing as performed on a region of interest (ROI) determined based on a user's gaze. Here, it is assumed that the XR device is worn on the user's head.

The ANN adapted to extract ROI in the image computed by the NPU may determine the position of the user's gaze on the display device based on the detected position of the pupil.

As an example, the ANN adapted to extract the ROI in the image computed by the NPU may detect a point j on the display which meets a gaze direction 630 of a left eye 610 at a position 612 of the pupil of the left eye 610 and a gaze direction 640 of a right eye 620 at a position 622 of the pupil of the right eye 620 to determine the point j as a position point j of the user's gaze. Here, the gaze direction 630 of the left eye 610 represents a gazing direction of the left eye 610 and the gaze direction 640 of the right eye 620 represents a gazing direction of the right eye 620.

The ANN adapted to extract ROI may designate the position of the central point of a range 650 of a predetermined ROI 652 as the position point j of the gaze to determine the ROI 652.

Figure 15A:
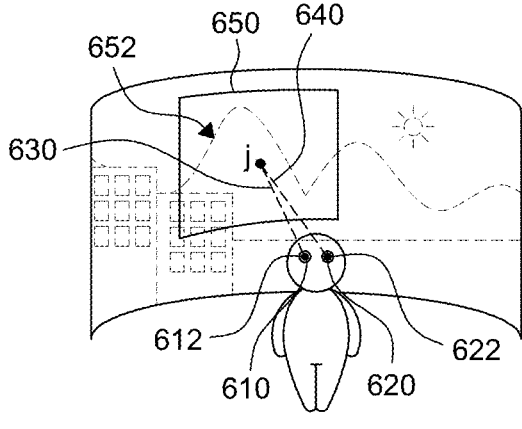
FIGS. 15A-15D are exemplary diagrams respectively illustrating a video improvement processing as performed on a region of interest (ROI) determined based on a user's gaze.

As illustrated in FIG. 15A, the ROI 652 to be projected to the display may be determined based on the position point j of the user's gaze. The ANN adapted to improve video quality computed by the NPU may perform the video improvement processing for the target video corresponding to the determined ROI 652. The ANN adapted to improve video quality may enhance, for example, the resolution of the ROI 652.

Figure 15B:
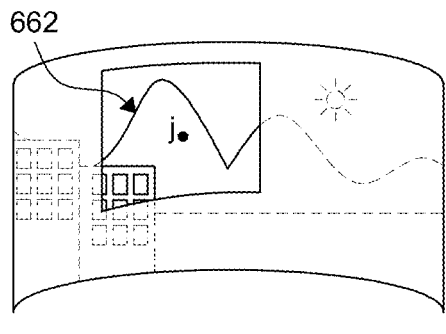

As illustrated in FIG. 15B, it can be seen that the resolution of an ROI 662 is higher than that of the ROI 652 of FIG. 15A.

Figure 15C:
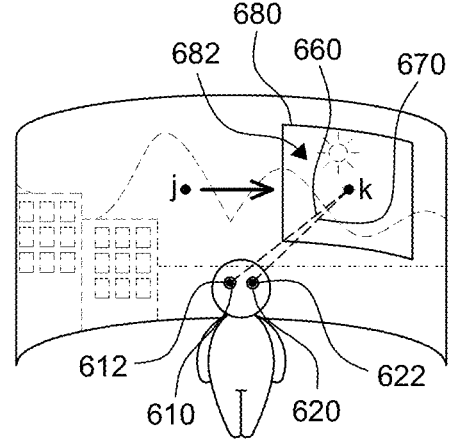

Meanwhile, as illustrated in FIG. 15C, when it is determined that the motion of the user's head and/or pupil has moved from a left direction to a right direction (here, the position of the user's gaze moves from a point j to a point k), an ROI 682 may be newly determined based on the user's motion. Even in this case, as described with reference to FIG. 15A, the point k may be determined as the position point of the user's gaze based on a gaze direction 660 of the left eye 610 and a gaze direction 670 of the right eye 620. In addition, the ROI 682 may be determined by designating the position k of the central point of the range 680 of the predetermined ROI 682 as the position point k of the gaze. Alternatively, the range of the ROI 682 is not predetermined, but may be changed according to the user's gaze.

As described above, the ANN adapted to improve video quality may perform the video improvement processing for the target video corresponding to the newly determined ROI 682. For example, it is possible to process the super resolution computation for the target video corresponding to the ROI 682.

Figure 15D:
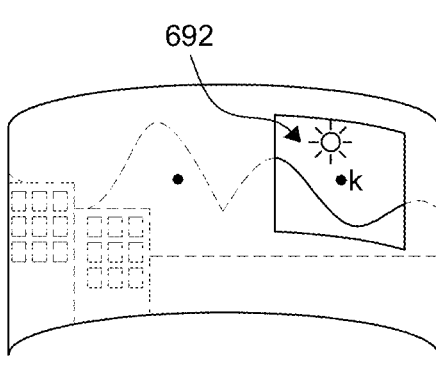

Referring to FIG. 15D, it can be seen that the resolution of the video in an ROI 692 becomes higher than that of the ROI 682 of FIG. 15C through the super resolution process to clear the video.

As described above, only the video quality of the determined ROI is improved to minimize the computation amount required for image processing, thereby increasing the response rate of images (e.g., realistic content) provided to the user. Therefore, it is possible to provide natural and high-immersive realistic content to the user.

Until now, it has been described that the ANN adapted to improve video quality performs the video improvement processing to increase the resolution on the target video corresponding to the ROI, but it is not limited thereto, and various computations related to video improvement such as compressing and decoding computation, preprocessing computation, etc. described above may be processed. According to an embodiment, the ANN adapted to improve video quality may perform the video improvement on a part or all of the video if necessary, like performing the video improvement processing on the entire video, without performing the video improvement processing only on the target video corresponding to the ROI.

Figure 16A:
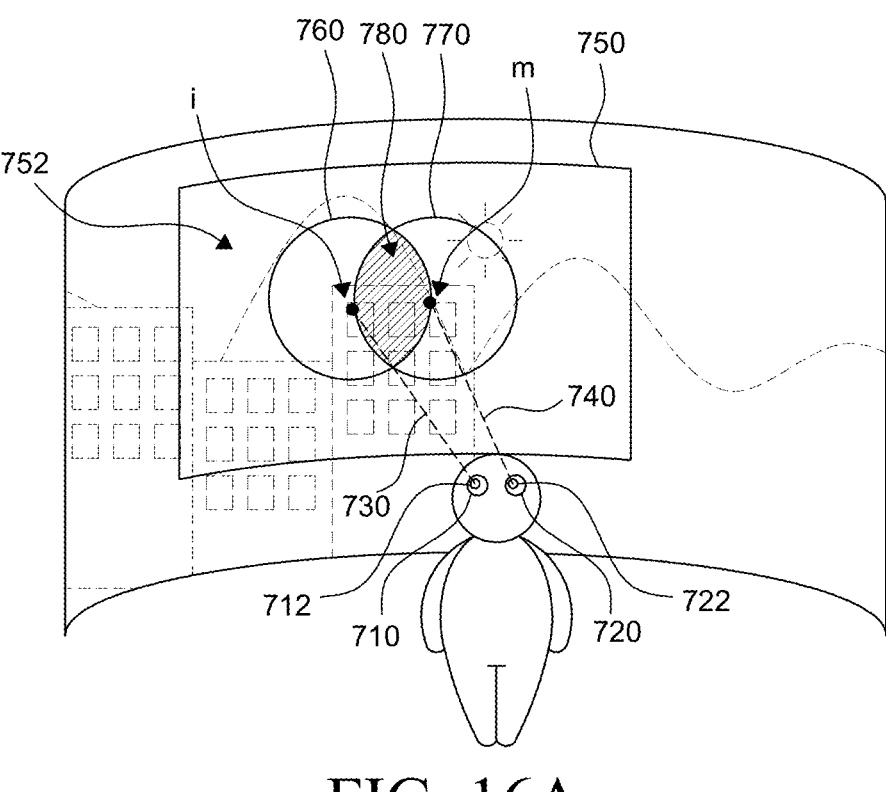
FIGS. 16A and 16B are exemplary diagrams respectively illustrating a video improvement processing as performed on a region of interest (ROI) determined based on a detected user's gaze.
Figure 16B:
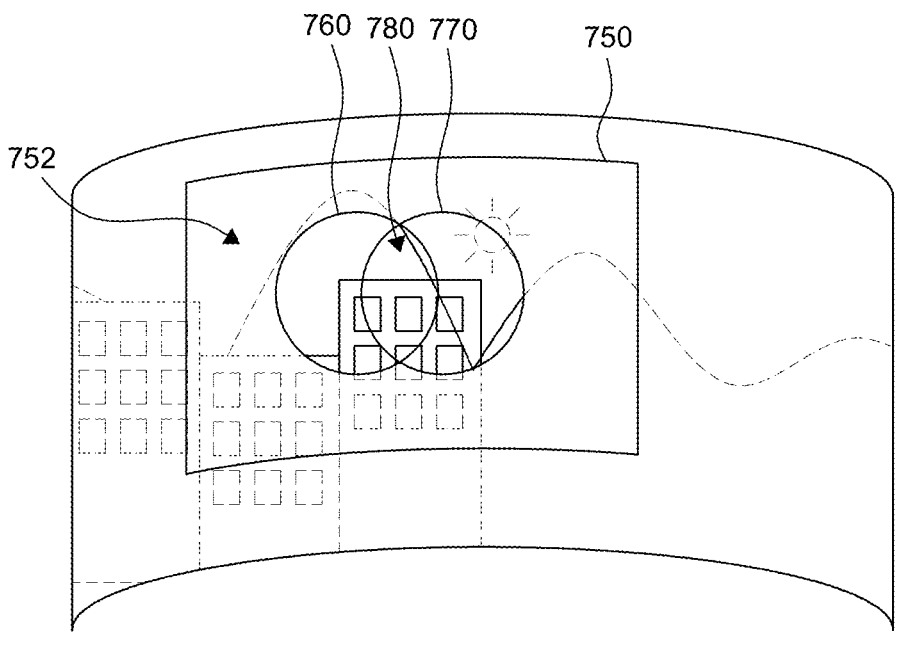

FIGS. 16A and 16B respectively illustrate a process of improving an image of a region of interest (ROI) determined based on a detected user's gaze. Here, it is assumed that the XR device is worn on the user's head.

An ROI is determined based on the motion detected by the gyro sensor and/or the acceleration sensor and the user's gaze information detected through the camera, and the video improvement processing may be performed on each ROI.

The ANN adapted to extract ROI computed by the NPU may determine the ROI based on the detected motion. For example, the ANN adapted to extract ROI computed by the NPU may determine a range 750 of an ROI 752 on the display by detecting a position of the user's head (e.g., skull) based on at least one of the head direction and the head slope. As illustrated in FIG. 16A, the ROI 752 based on the head direction and the head slope may be determined based on the range 750 of the ROI 752.

Further, the ANN adapted to extract ROI computed by the NPU may detect a point (1, m) on the display which meets a gaze direction 730 of a left eye 710 at a position 712 of the pupil of the left eye 710 and a gaze direction 740 of a right eye 720 at a position 722 of the pupil of the right eye 720 to determine ROIs 760 and 770 of the left eye 710 and the right eye 720, respectively.

The ANN adapted to improve video quality computed by the NPU determines a ranking of each ROI and may perform a video improvement processing (e.g., super resolution computation, compression decoding computation, preprocessing computation, etc.) for each ROI stepwise based on the determined ranking. For example, the ANN adapted to improve video quality may determine the ranking of the ROI of the user in order of a region 780 where the ROIs of the left eye and the right eye overlap with each other, the ROIs 760 and 770 of the left eye and the right eye, and the ROI 752 based on the head direction and the head slope.

As illustrated in FIG. 16B, based on the determined ranking, the ANN adapted to improve video quality may render the resolution of the region 780 where the ROIs of the left eye and the right eye overlap with each other at the highest quality (e.g., 8K). In addition, the ROIs 760 and 770 of the left eye and the right eye may be rendered at high quality (e.g., 4K) lower than the resolution of the region 780 where the ROIs overlap with each other. In addition, the resolution of the ROI 752 based on the head direction and the head slope may be rendered at high quality (e.g., 4K) much lower than the resolution of the ROIs 760 and 770 of the left eye and the right eye.

As described above, the video improvement processing computation is performed according to each ROI, thereby providing realistic contents with maximized vividness and immersion to the user.

Figure 17A:
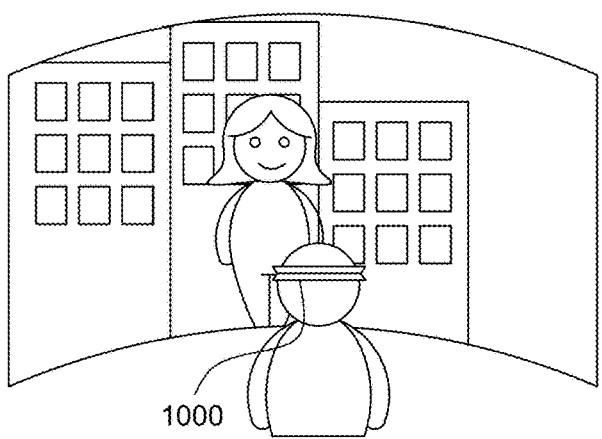
FIGS. 17A-17C are exemplary diagrams illustrating an example provided by synthesizing an augmented reality video in a region of interest determined based on a detected user's gaze.
Figure 17B:
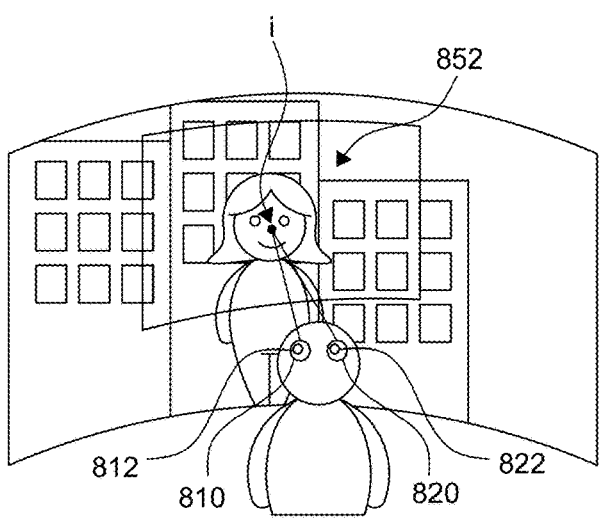
Figure 17C:
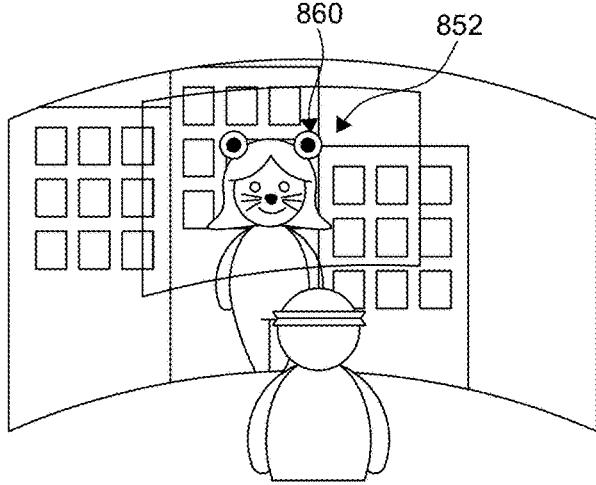

FIGS. 17A-17C illustrate an example provided by synthesizing an augmented reality video in a region of interest (ROI) determined based on a detected user's gaze.

The ANN adapted to extract ROI computed by the NPU may determine a region of interest (ROI) 752 based on at least one of the user's head motion detected by the gyro sensor and/or the acceleration sensor and the user's gaze detected by the camera.

As an example, a point I on the display which meets gaze directions of a left eye 810 and a right eye 820 may be detected by detecting positions 812 and 822 of user's pupil.

As illustrated in FIG. 17A, a point on the display inclined in a left direction may be determined as the position point I of the gaze, and an ROI 852 may be determined based on the corresponding position point I.

As illustrated in FIG. 17B, it has been described that the ROI is determined based on the user's gaze, but is not limited thereto, and the ROI may be determined based on the user's head motion or based on the head motion and the gaze.

On the other hand, as described above, the XR device 1000 may have a plurality of cameras. At this time, a first camera may capture a video viewed by the user, and a second camera and a third camera may capture user's left eye and right eye, respectively.

The first camera may capture a reality video 860 corresponding to the ROI 852 as illustrated in FIG. 17C. Then, the XR device 1000 may synthesize the reality video 860 to the ROI 852 and output the synthesized video. Before the reality video 860 is synthesized to the ROI 852, the reality video 860 may be processed for the video improvement by the ANN adapted to improve video quality.

Meanwhile, the display of the XR device 1000 may include a transparent glass configured to view the actual reality through a person's eyes. Here, the display of the XR device 1000 may be implemented by a transparent glass. In other words, the user may not only view the actual reality through the transparent glass using the user's own eyes, but also view the reality video output on the transparent glass. The ROI 852 inferred by the ANN adapted to extract the ROI computed by the NPU may include a region to be displayed on the transparent glass. The XR device 1000 may generate the reality video 860 and display the reality video 860 on the ROI, thereby overlapping the reality video 860 in a general view. As an example, this reality video 860 may be processed for video improvement by the ANN adapted to improve video quality before being displayed on the display.

Figure 18:
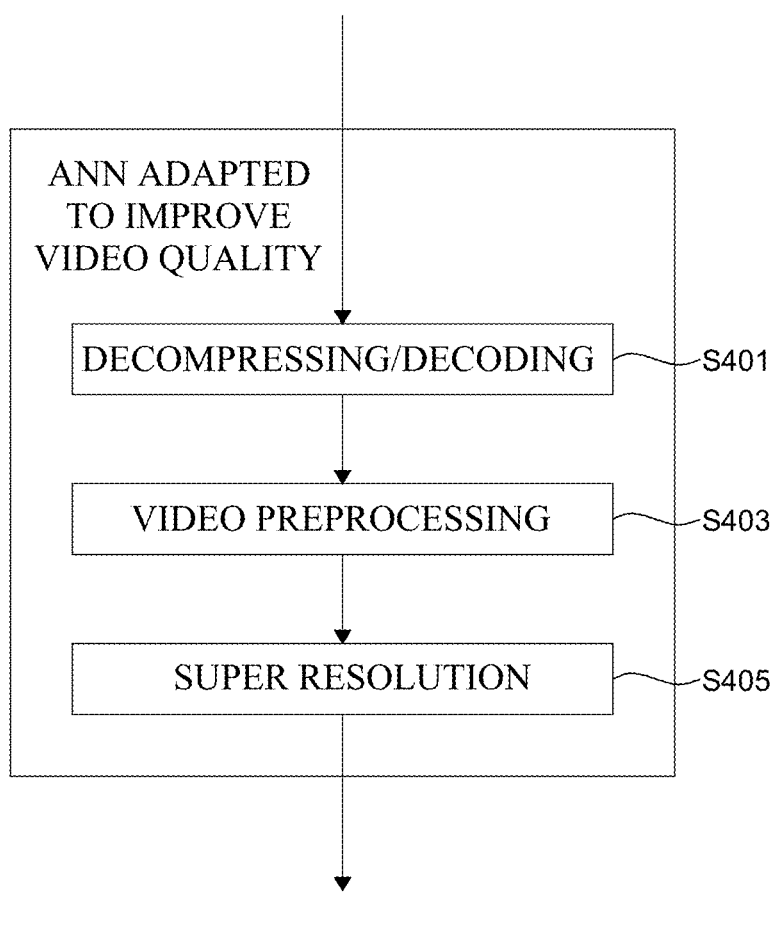
FIG. 18 is a flowchart illustrating a process for video improvement.

FIG. 18 illustrates a process for video improvement.

Referring to FIG. 18, the video improvement may include a decompressing/decoding process (S401), a video preprocessing process (S403), and a super resolution process (S405).

In the decompressing/decoding process (S401), when a video (e.g., AR/VR video) is a compressed video, the video is decompressed and then decoded to be output to the display 1041.

Here, the compressed video may be, for example, a compressed video with a commercialized video compression technique such as HEVC, H.265, and MPEG.

The entire video may be compressed. However, the decompression may be performed only for a portion of the video corresponding to the ROI in the image.

Meanwhile, when the received video is a video which is not compressed or not encoded, the decompressing/decoding process (S401) may be skipped.

Next, the video quality may be improved for the video of the portion corresponding to the ROI of the entire video. For improvement of video quality, the video preprocessing process (S403) and/or the super resolution process (S405) may be performed.

For example, the video preprocessing process (S403) may include a video signal processing process and/or a process of adjusting a parameter of the video. Here, the parameter adjusting process may mean using at least one of a demosaicing method, a wide dynamic range (WDR) or high dynamic range (HDR) method, a deblur method, a denoise method, a color tone mapping method, a white balance method, and a decompression method.

In the parameter adjusting process, a plurality of parameters for the video may be adjusted in sequence or in parallel.

When describing the sequential adjustment, a second parameter may be adjusted for the video in which a first parameter is adjusted. To this end, an ANN model may be implemented in the form of a first layer that adjusts the first parameter and a second layer that adjusts the second parameter. For example, the first layer of the ANN model may be for applying the demosaicing method for the video, and the second layer may be for applying the deblur method.

When describing the parallel adjustment, the first parameter and the second parameter may be adjusted simultaneously. In this case, the first layer of the ANN model may include a first node for adjusting the first parameter and a second node for adjusting the second parameter. For example, in the case of an ANN model learned for the demosaicing method and the deblur method, when the video is input to the first layer of the learned ANN model, the video output from the first layer may be a video applied with the demosaicing method and the deblur method.

The super resolution process (S405) may be performed to increase the resolution of the video. Here, the super resolution has been performed through an existing interpolation method, but according to the present disclosure, the super resolution may be performed through the ANN.

The super resolution process may also be performed for the entire video.

Alternatively, the super resolution process may be performed only for the video in the ROI. Specifically, the resolution of the ROI in which the user's gaze is positioned may be rendered at high quality (e.g., 4K or 8K) and may be rendered at normal quality (e.g., full HD) when out of the user's gaze. That is, if the preprocessing process (S403) is performed on the video corresponding to the ROI to improve the video quality, the super resolution process (S405) may be performed on the video corresponding to the ROI in which the preprocessing process has been performed.

When an original video is a high-quality video, the preprocessing process and/or the super resolution process may not be applied. However, if the original video is the high-quality video, there is a disadvantage that a significant load occurs and the power consumption increases to perform the decompressing and/or decoding process. Accordingly, the preprocessing process and/or the super resolution process is performed only for the video in the ROI of the user to reduce the entire computation amount, thereby lowering the load. Therefore, even if the original video does not have high quality (for example, a low-resolution video), the video in the ROI of the user is improved through the preprocessing process and/or the super resolution process to be output to a high-quality video capable of maximizing the immersion to the user.

Until now, it has been described that the preprocessing process and the super resolution process are performed together on the video in the ROI, but when the video in the ROI is divided into several zones, only the preprocessing process is performed on the first zone, and the preprocessing process and the super resolution process may be performed together on the second zone.

Figure 19A:
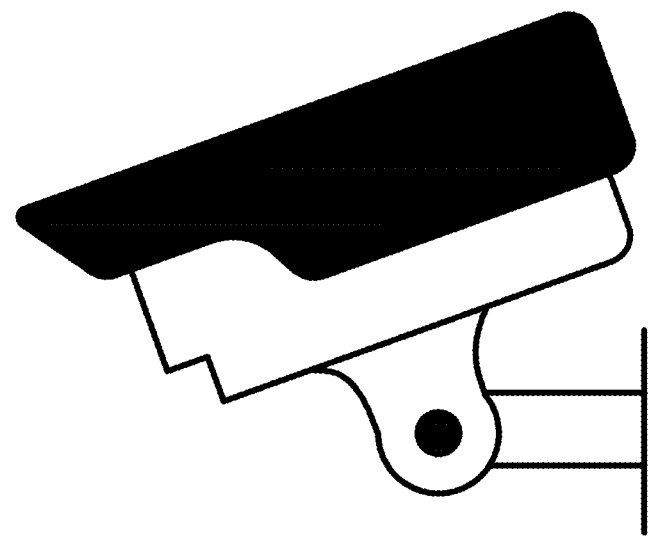
FIGS. 19A and 19B are exemplary diagrams illustrating the edge device as a camera device and as a drone, respectively.
Figure 19B:
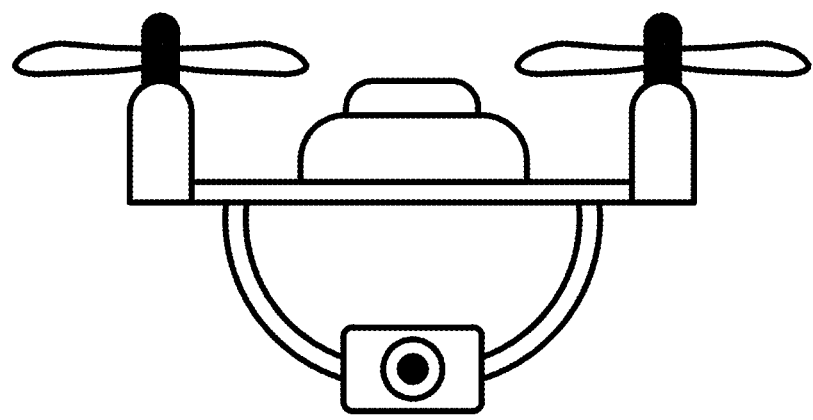

FIG. 19A illustrates an example of a camera device as an edge device, and FIG. 19B illustrates an example of a drone as the edge device.

As can be seen with reference to FIG. 19A, the edge device 1000 may be a closed-circuit television (CCTV), which may be an Internet Protocol (IP)-based or web-based camera. In order to photograph a remote subject through a general camera, a high magnification optical lens is required. However, there was a disadvantage that the high magnification optical lens is quite expensive, and an actuator (that is, a motor) needs to be driven to zoom in/out the lens, but the frequent driving of the motor cannot secure durability under bad conditions. Further, there was a disadvantage that while photographing the remote subject by zooming out the remote subject, a near-field subject cannot be photographed.

Accordingly, the present disclosure provides inputting a video captured through a single lens to at least one of an ANN adapted to improve video quality, a CNN, an ANN adapted to recognize object, and an ANN adapted to predict an object movement path. Specifically, the present disclosure provides performing preprocessing and super resolution of a video captured through a single lens through the ANN adapted to improve video quality and recognizing a specific subject (e.g., a certain person) as an object in the super resolution video through the ANN adapted to recognize object. Further, the present disclosure provides predicting a path through which the subject recognized as the object is to move through ANN adapted to predict the object movement path and then rotating a camera in vertical and horizontal directions inferred through the ANN adapted to determine the movement path.

Meanwhile, as can be seen with reference to FIG. 19B, the edge device 1000 may be a drone having a camera.

In order to capture a moving target object while tracking, people need to adjust the drones remotely using a controller. However, since significant skills are required, high costs have been accompanied.

Accordingly, the present disclosure provides performing preprocessing and super resolution of a video captured through the camera mounted on the drone through the ANN adapted to improve video quality and recognizing a specific subject (e.g., a certain person) as an object in the super resolution video through the ANN adapted to recognize object. Further, the present disclosure provides predicting a path through which the subject recognized as the object is to move through ANN adapted to predict the object movement path and then automatically adjusting the drone in a direction inferred through the ANN adapted to determine the movement path.

Figure 20A:
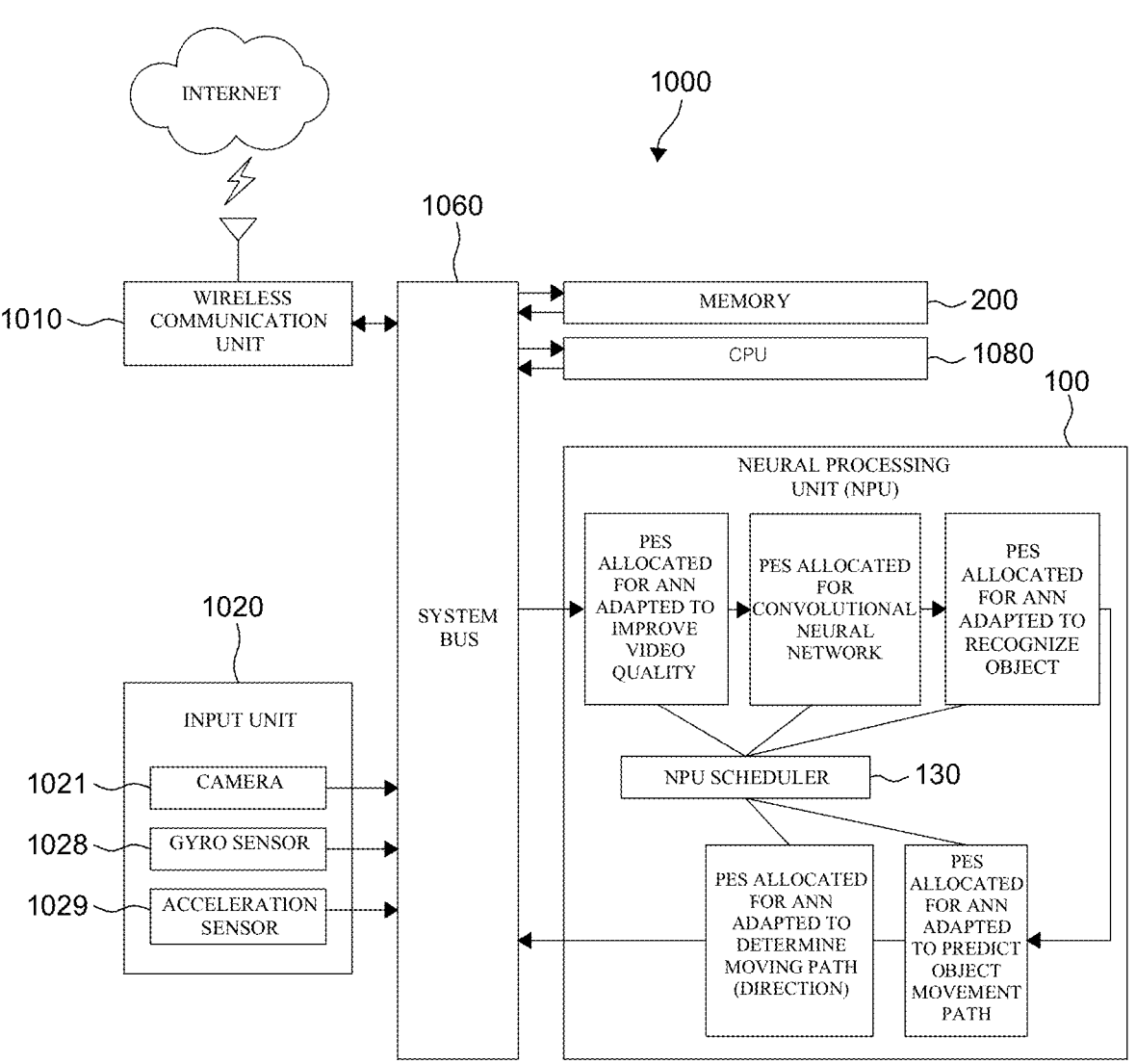
FIG. 20A is a block diagram exemplarily illustrating a configuration of the camera device of FIG. 19A or the drone of FIG. 19B.

FIG. 20A illustrates a configuration of the camera device of FIG. 19A or the drone of FIG. 19B.

Referring to FIG. 20A, a camera device or a drone as an example of the edge device 1000 may include the NPU 100, the memory 200, the wireless communication unit 1010, the input unit 1020, the system bus 1060, and the CPU 1080 of FIG. 1 or 3.

The NPU 100 may perform computations for a plurality of ANNs required for the edge device. For example, the plurality of ANNs required for the edge device may include at least one of an ANN adapted to improve video quality, a CNN, an ANN adapted to recognize object, an ANN adapted to predict an object movement path, and an ANN adapted to determine a moving path (direction).

The NPU scheduler 130 of the NPU 100 may allocate computations for the plurality of ANNs to PEs. That is, the computations for a first ANN may be allocated to a first group of PEs and the computations for a second ANN may be allocated to a second group of PEs. Specifically, the NPU scheduler 130 may allocate computations for the ANN adapted to improve video quality to the first group of PEs, allocate computations for the CNN to the second group of PEs, allocate computations for the ANN adapted to recognize object to a third group of PEs, allocate computations for ANN adapted to predict the object movement path to a fourth group of PEs, and allocate computations for ANN adapted to determine the moving path (direction) to a fifth group of PEs.

Figure 20B:
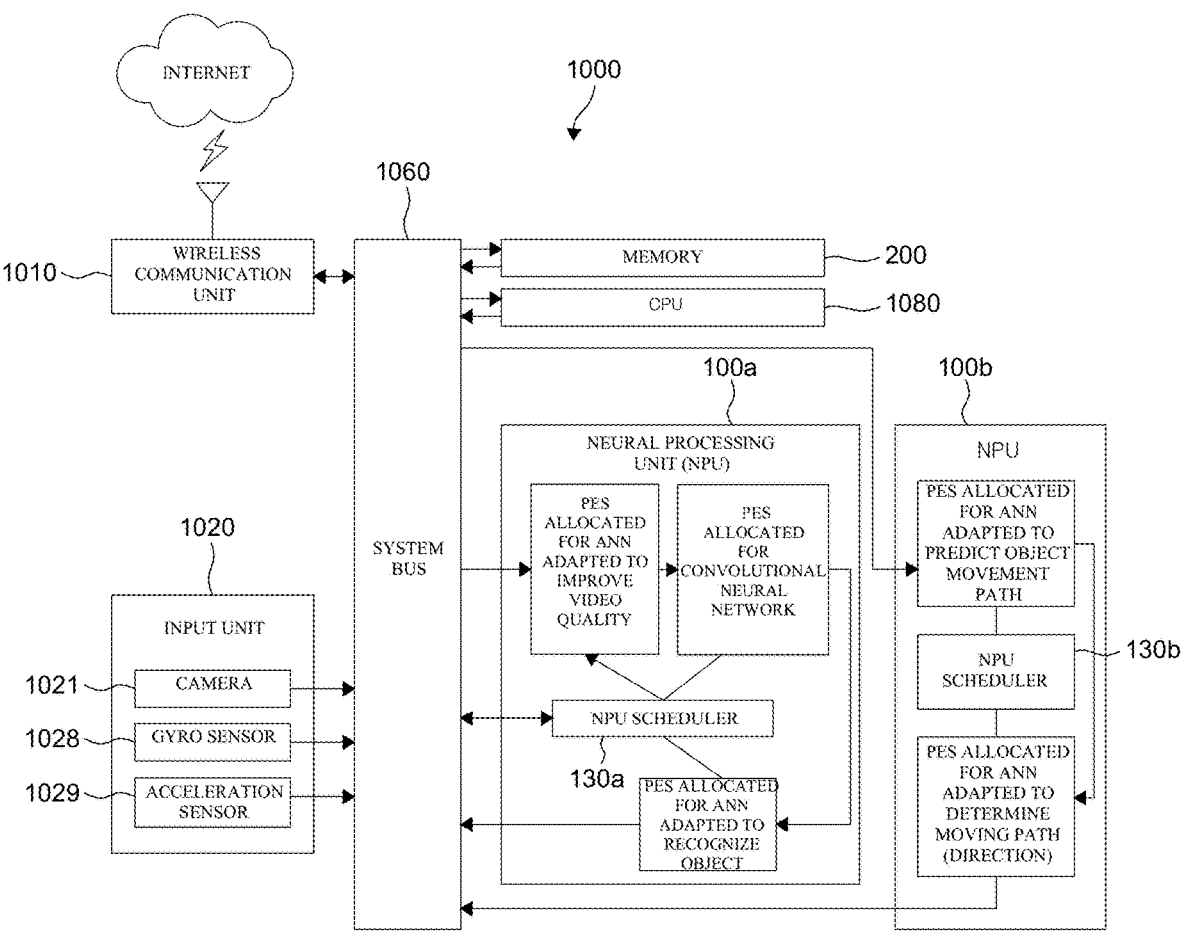
FIG. 20B is a block diagram illustrating a modification of FIG. 20A.

FIG. 20B illustrates a modification of FIG. 20A.

The edge device 1000 of FIG. 20B may include a plurality of NPUs, for example, two NPUs 100*a* and 100*b*, unlike FIG. 20A.

The CPU 1080 may acquire combination information on ANN models from the memory 200. In addition, the CPU 1080 may acquire information on a plurality of ANN models from the memory 200 based on the acquired combination information.

Thereafter, the CPU 1080 may allocate the first ANN model to the first group of PEs and allocate the second ANN model to the second group of PEs.

In the allocation by the CPU 1080 as an example, FIG. 20B illustrates the first NPU 100*a* including a first group of PEs for performing computations for an ANN adapted to improve video quality, a second group of PEs for performing computations for a CNN, and a third group of PEs for performing computations for an ANN adapted to recognize object. In addition, FIG. 20 shows that the second NPU 100*b* may include a fourth group of PEs for performing computations for an ANN adapted to predict an object movement path and a fifth group of PEs for performing computations for an ANN adapted to determine a moving path (direction). However, this is only an example, and the type or number of ANNs performed by the first NPU 100*a* and the second NPU 100*b* may be freely modified.

Hereinafter, the ANN adapted to recognize object will be described in detail.

When the ANN adapted to recognize object receives a video, the ANN adapted to recognize object may recognize an object included in the video. The accuracy, that is, the object recognition rate of recognizing objects included in a plurality of images having different image parameters may be different. Here, the image parameter may refer to any parameter indicating the feature of the image or a combination thereof. Alternatively, the image parameter may include any subparameter representing each of the detailed features of the image. For example, the image parameter may include a subparameter associated with at least one of demosaicing, wide dynamic range (WDR) or high dynamic range (HDR), deblur, denoise, color tone mapping, white balance, and decompression, However, the image parameter is not limited thereto, and may include any parameter or subparameter capable of representing the feature of the image.

Figures 21A, 21B:
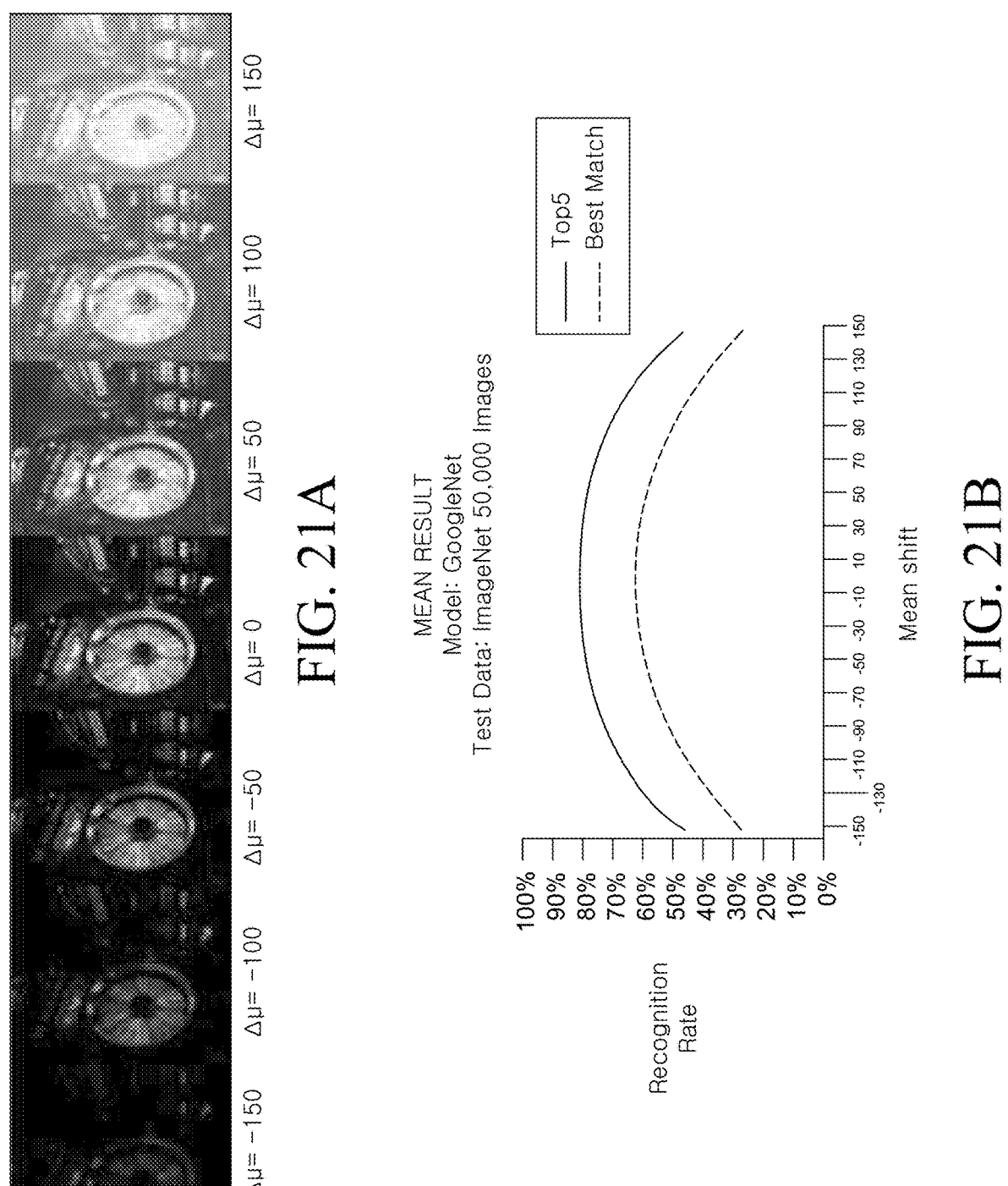
FIGS. 21A and 21B are exemplary diagrams respectively illustrating a video result according to a change in light amount and a recognition rate according to a change in light amount.

FIG. 21A illustrates a video result according to a change in light amount, and FIG. 21B illustrates a recognition rate according to a change in light amount.

A graph shown in FIG. 21B illustrates an experimental result of measuring a recognition rate by using a deep learning recognition model called GoogleNet while adjusting a light amount in each image from data of 50,000 images called ImageNet.

The object recognition rate of the received image may vary depending on a feature representing the image, that is, a light amount as one of image parameters or subparameters.

As illustrated in FIG. 21A, it is confirmed that a value $\Delta\mu$ which is an average value of light amounts of the received images is changed to change the light amount of the video and as the value of $\Delta\mu$ is increased, the light amount is increased.

A preferred image among a plurality of images that changes the light amount of an image capturing the same object may vary for each person. That is, since each of retinal visual cells (e.g., cone cells) for each person varies, each of people who view such images may prefer different images.

On the other hand, in the case of using the ANN adapted to recognize object, such a preference does not contribute at all. For example, according to the preference, a person may select an image having a value of $\Delta\mu$ of 50 as the most appropriate image for object recognition, but as shown in FIG. 22B, when the value of $\Delta\mu$ is 0, the object recognition rate in the ANN adapted to recognize object was the highest. That is, it is meant that when the light amount has a suitable value, the recognition rate of the deep-learning recognition model is the highest. In this example, a GoogleNet model has been used as ANN model for recognizing the object, but it may not be limited thereto.

Figure 22A:
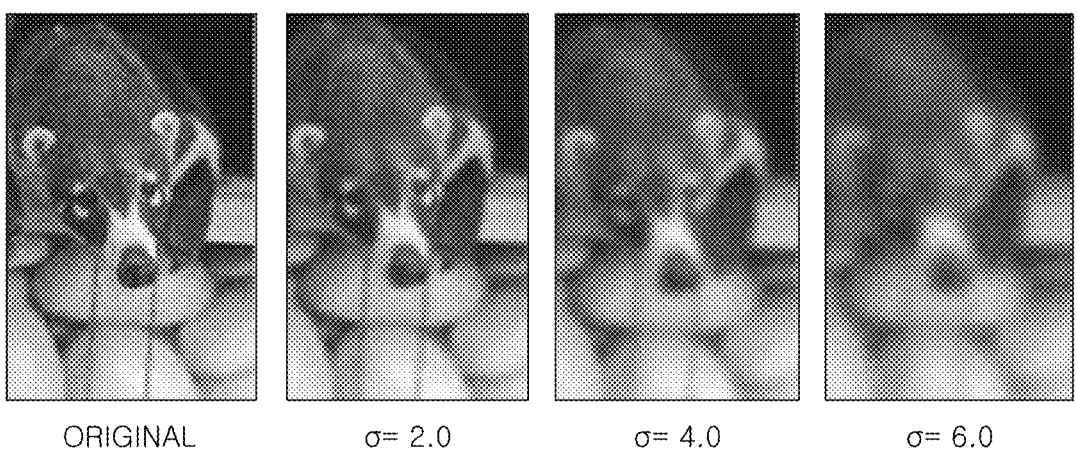
FIGS. 22A and 22B are exemplary diagrams respectively illustrating a video result according to a change in definition and a recognition rate according to a change in definition.
Figure 22B:
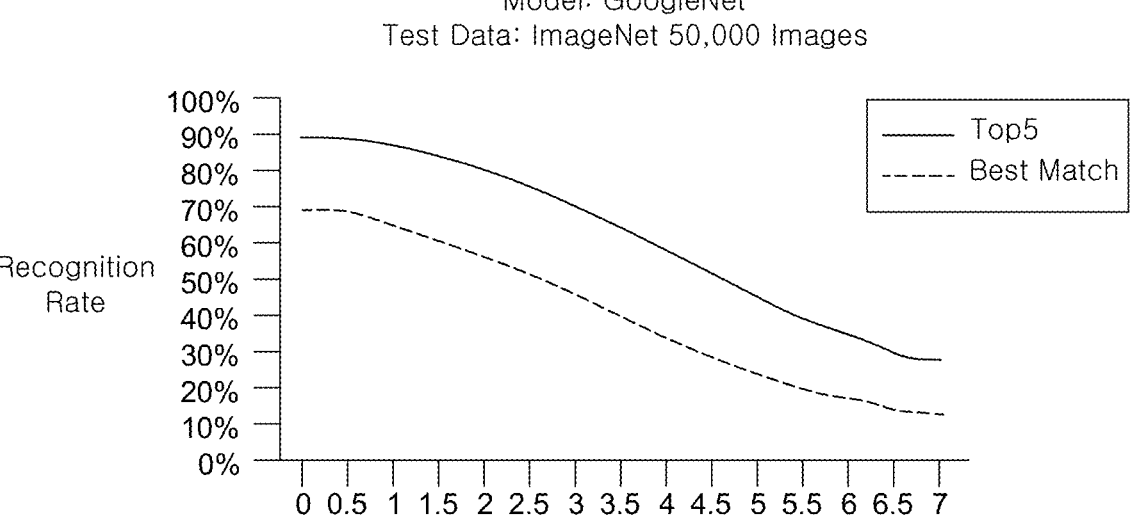

FIG. 22A illustrates a video result according to a change in light amount, and FIG. 22B illustrates a recognition rate according to a change in definition.

As described above, the object recognition rate may vary depending on the definition, which is one of image parameters or subparameters, as well as the amount of light. A value of 6 associated with the definition of the received image may be changed to change the definition of the image.

As illustrated in FIG. 22A, it may be confirmed that when the value of 6 is zero (that is, an original), the example is the clearest, and as the value of 6 is increased, the video is gradually blurred.

A graph shown in FIG. 22B illustrates an experimental result of measuring a recognition rate by using a deep-learning recognition model called GoogleNet while adjusting the definition in each image from data of 50,000 images called ImageNet.

As illustrated in FIG. 22B, when the value of 6 is zero (that is, an original), the object recognition rate in an object recognition module of an object recognition device is the highest. That is, when the value of 6 associated with the definition is the smallest, the recognition rate of the deep-learning recognition model is the highest. As described above, the GoogleNet model has been used as ANN model adapted to recognize object, but it may not be limited thereto.

Referring to FIGS. 21A and 22B and FIGS. 22A and 22B, it can be seen that when the light amount of the video has an appropriate value, and the definition is high, the recognition rate of the ANN adapted to recognize object is high.

As described above, there may be a difference between the high-definition image preferred by a person and the image capable of maximizing the recognition rate of the object recognition device based on the ANN. For example, a probability of classifying dogs by types may be more effective than human in an ANN. That is, before the input image is input to an input layer of the ANN adapted to recognize object, an improvement process may be performed on the video to maximize the object recognition rate. This video improvement process will be described below.

Conventional video preprocessing techniques are implemented to output a high-definition image preferred by a person, while the video processing technology targeted in the present disclosure aims to improve the recognition rate of the ANN adapted to recognize object.

Figure 23:
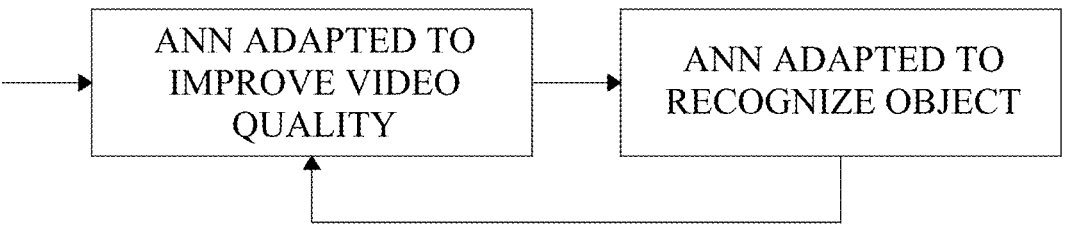
FIG. 23 is a block diagram illustrating a process of recognizing an object included in an image and providing feedback data.

FIG. 23 illustrates a process of recognizing an object included in an image and providing feedback data. Specifically, FIG. 23 shows an ANN adapted to improve video quality, which may perform an improvement process on the input image and which then outputs and transmits the processed image to the ANN adapted to recognize object.

As can be seen with reference to FIG. 18, the ANN adapted to improve video quality may include a decompressing/decoding process (S401), a video preprocessing process (S403), and a super resolution process (S405). The video preprocessing process (S403) may use any function and variable used for signal processing of the image. The video preprocessing process (S403) may preprocess and then output the input image through a video preprocessing ANN model. Here, the video preprocessing ANN model may include any probability model for maximizing an object recognition rate in the image in the ANN adapted to recognize object. As another example, the video preprocessing ANN model may include CNNs, a deblur network, and a denoise network.

The video preprocessing ANN model may be learned to output an image optimized for the recognition of the object. Specifically, the video preprocessing ANN model feeds back a plurality of reference images and an object recognition result for each of the plurality of reference images and may be repetitively learned so that the image optimized for the recognition of the object is output. Here, the reference image may be a pair of learning data configured by a degradation image and an original image.

For this purpose, the video preprocessing process (S403) may further include a learning process. The learning process may generate a video preprocessing ANN model for inferring an image optimized for the recognition of the object based on the plurality of reference images and the object recognition result for each of the plurality of reference images. The video preprocessing ANN model may be learned through a machine learning algorithm to output an image optimized for the recognition of the object. That is, the video preprocessing ANN model may be learned to output an image optimized for the recognition of the object.

The video preprocessing process (S403) receives an image received from an external device or an image captured from a camera, and outputs an image optimized for recognition of the object to transmit the optimized image to an ANN adapted to recognize object.

The ANN adapted to recognize object may receive an image output by the ANN adapted to improve video quality and recognize an object included in the image. Then, the ANN adapted to recognize object may feedback the recognition result of the object included in the image output from the ANN adapted to improve video quality to the ANN adapted to improve video quality.

The ANN adapted to recognize object may be the pre-learned deep neural network (DNN) as an example. Alternatively, the ANN adapted to recognize object may detect or recognize an object in the image input by using a reader network (e.g., VGG, ResNet, YOLO, SSD, etc.).

The fed-back recognition result may include information on whether or not the object included in the image is recognized. For example, whether the object is recognized may be determined based on whether the object recognition rate exceeds a predetermined or more threshold recognition rate. As another example, the recognition of the object in the image may be determined by calculating not only the probability of object recognition but also a confidence level.

The fed-back recognition result may include any processing information for the recognition result of the object as well as whether the object is recognized.

The fed-back recognition result is not limited to including only information on the object recognition, and may include various parameters occurring in object recognition or various factors involved in object recognition, such as an object recognition speed, accuracy of object recognition (or object recognition rate), and parameters of an image recognizing an object.

The video preprocessing process (S403) in the ANN adapted to improve video quality may adjust variables used to perform the video improvement process of the image, based on the feedback recognition result. Here, the variable may be a value to be changed when performing a video improvement processing technique (e.g., signal processing computation). For example, such a variable may include a factor for determining image parameters.

The video preprocessing process (S403) in the ANN adapted to improve video quality may perform the video improvement processing of the image by adjusting the image parameters. For example, the video preprocessing process (S403) may perform the video improvement process by adjusting a blur parameter or a subparameter of the image received by using the following equation of a Gaussian filter.

$$g_a(x, y) = \frac{1}{2\pi\alpha^2} e^{-(x^2+y^2)/2\alpha^2} \qquad \text{[Equation 1]}$$

Here, σ represents a variable for determining the degree of blurring, and as the value of the variable σ is increased, the image may be further blurred. For example, the video preprocessing process (S403) may adjust the value of the variable σ based on the feedback recognition result by the ANN adapted to recognize object and perform the video improvement processing of the image received by the adjusted variable, thereby outputting the image optimized for the object recognition rate.

When the video preprocessing process (S403) performs the video improvement processing of the image input through the video preprocessing ANN model, the video preprocessing ANN model may be relearned or updated by using the recognition result feedback by the ANN adapted to recognize object. For example, the video preprocessing process (S403) may analyze the feedback recognition result and correct weight values included in the video preprocessing ANN model based on the analyzed result.

Specifically, the video preprocessing process (S403) may train parameters (e.g., weight) of the video preprocessing ANN model based on the recognition result of the object included in the preprocessed image and feedback data thereto, which are output values output through the pre-learned ANN adapted to recognize object so as to output the preprocessed image capable of maximizing the object recognition rate of the ANN adapted to recognize object.

The ANN adapted to recognize object may recognize an object by using the image output from ANN adapted to perform video preprocessing. A weight of the ANN adapted to improve video quality (specifically, ANN adapted to improve video quality) may be updated by using the recognition result feedback from the ANN adapted to recognize object. Therefore, the recognition rate of the ANN adapted to recognize object may be improved.

The ANN adapted to perform video preprocessing and the ANN adapted to recognize object may be a pre-learned network such as a deep learning model but is not limited thereto. As described above, the learning is repeated, thereby improving the accuracy and/or reliability of ANN adapted to perform video preprocessing and the ANN adapted to recognize object.

Figure 24:
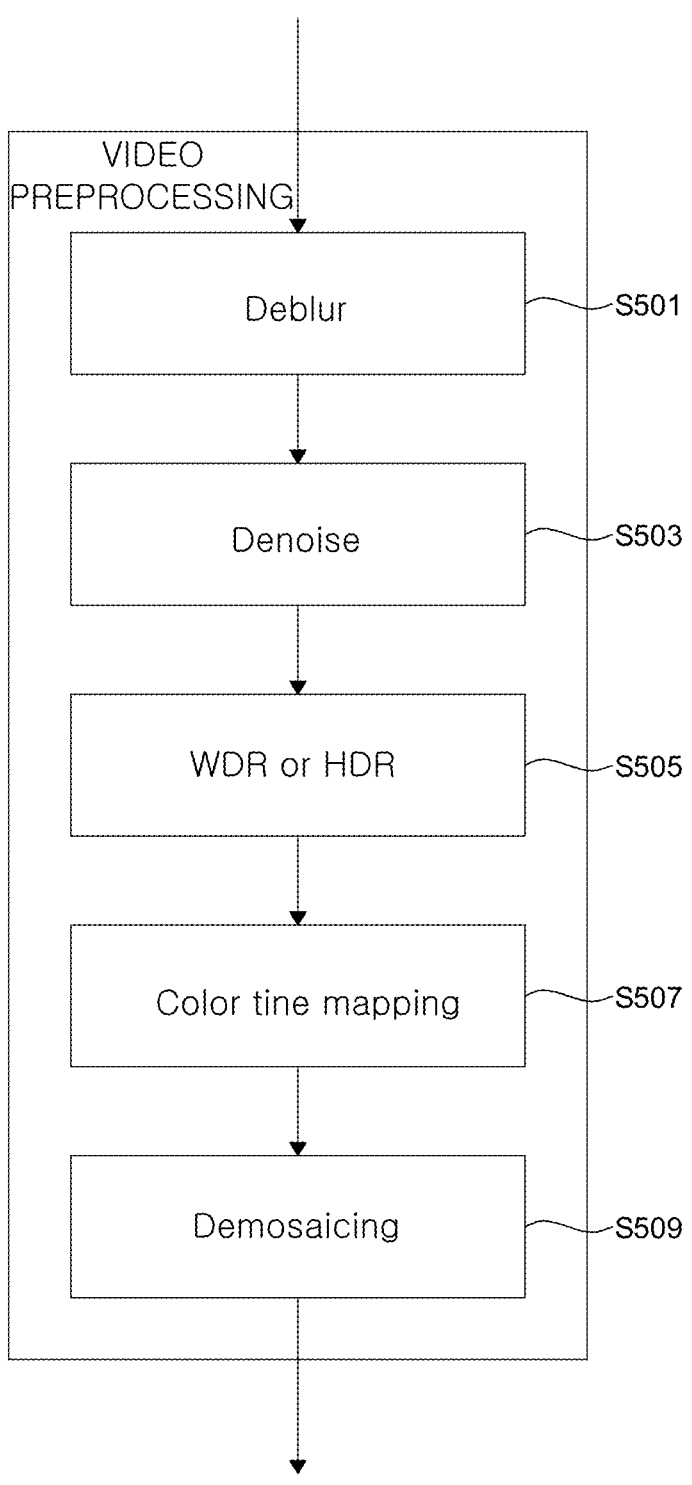
FIG. 24 is a flowchart illustrating a detailed process of a video preprocessing process.

FIG. 24 illustrates a detailed process of a video preprocessing process.

A video preprocessing process illustrated in FIG. 24 may correspond to the video preprocessing process (S403) illustrated in FIG. 18.

The illustrated video preprocessing process may perform the improvement processing by adjusting parameters of the input image. Here, the image parameter may include an image subparameter representing at least one of deblur, denoise, a wide dynamic range (WDR) or high dynamic range (HDR), color tone mapping, and demosaicing of the received image.

The video preprocessing process may adjust a plurality of image subparameters in sequence, respectively. For example, when each of the plurality of image subparameters is adjusted, an adjustment result of a first subparameter may be reflected when adjusting a second subparameter.

As illustrated in FIG. 24, the video preprocessing process may include at least one of a process (S501) of deblurring an image, a process (S503) of denoising the image, a process (S505) of performing a process for HDR or WDR on the image, a process (S507) of performing a color tone mapping of the image, and a process (S509) of demosaicing the image.

The video preprocessing process may be performed by using the video preprocessing ANN model as described above. The video preprocessing ANN model may be learned to perform the deblurring process (S501), the denoising process (S503), the process (S505) of performing the process for HDR or WDR, the process (S507) of performing the color tone mapping of the image, and the demosaicing process (S509) in sequence. Alternatively, the video preprocessing ANN model may be learned to perform the processes S501, S503, S505, S507, and S509 at the same time.

The video preprocessing process may be performed by using the learned video preprocessing ANN model so as to output the preprocessing image optimized for the object recognition by adjusting a plurality of parameters for the received image, instead of adjusting the respective subparameters in sequence.

In FIG. 24, it is illustrated that the video preprocessing process includes the deburring process (S501), the denoising process (S503), the process (S505) of performing the process for HDR or WDR, the process (S507) of performing the color tone mapping of the image, and the demosaicing process (S509), but may not be limited thereto. Further, the order of the processes may not be limited to the order illustrated in FIG. 24.

Figure 25:
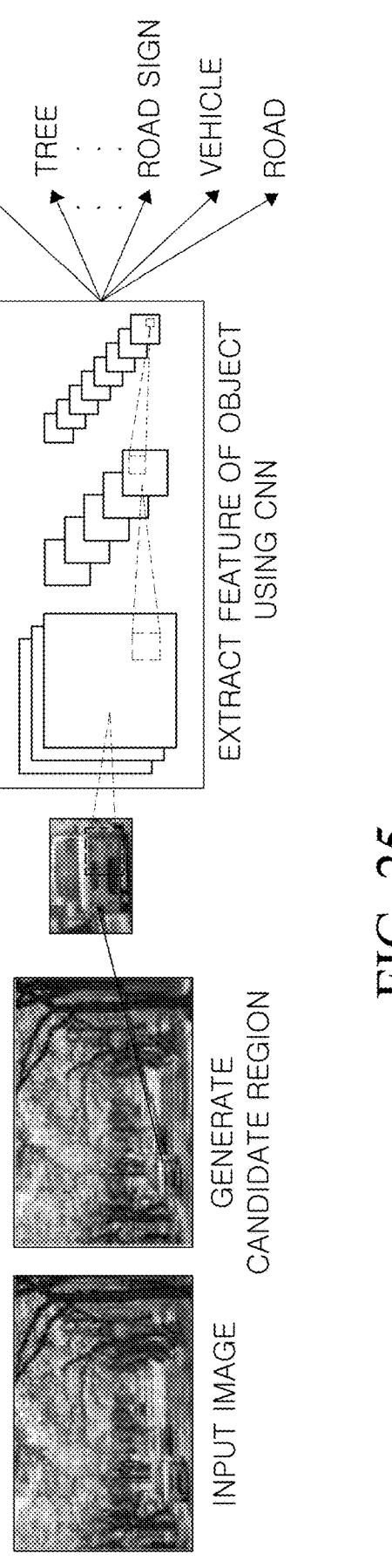
FIG. 25 is an exemplary diagram illustrating an example of recognizing an object included in an image.

FIG. 25 illustrates an example of recognizing an object included in an image.

An object recognition process may recognize an object included in the received image by using a region with CNN (R-CNN). As illustrated in FIG. 25, the R-CNN may generate candidate regions by using a selective search algorithm in the input image. The generated candidate regions are converted to the same size and features of the object included in the image may be extracted through the CNN. The objects in the candidate region may be classified by using a support vector machine using the extracted features. As illustrated in FIG. 25, the objects included in the image may be classified into various objects, such as people, trees, and vehicles. The object recognition process may detect or recognize the object in the image based on the classified object.

In FIG. 25, it is exemplarily illustrated that the object recognition process uses the R-CNN, but is not limited thereto, and the object recognition process may use any ANN capable of recognizing the objects in the image. That is, an object included in the image may be recognized using a pre-trained network such as AlexNet or GoogleNet.

The ANN adapted to recognize object may be constructed by learning. Specifically, features for identifying each object may be learned by analyzing thousands to tens of thousands of learning data (learning images), and a method for identifying a difference in each object is learned so that the ANN adapted to recognize object may be constructed.

Figure 26C:
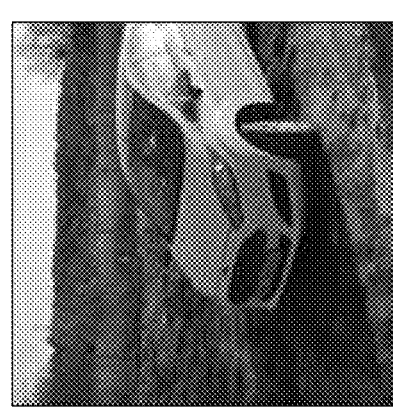
FIGS. 26A-26C are exemplary diagrams respectively illustrating results of recognizing an object included in an image.
Figure 26B:
Figure 26A:

FIGS. 26A-26C respectively illustrate results of recognizing an object included in an image.

As an image illustrated in FIG. 26A, it may be confirmed that, when an object of an image that is shaken during its capturing is recognized through a DNN, the object recognition rate is shown as 61%. As illustrated in FIG. 26B, it may be confirmed that when an object of a normally captured (Ground truth) image is recognized through the DNN, the object recognition rate is shown as 74%.

Therefore, before recognizing the object as described above, it is possible to perform the video improvement process by deblurring.

When the deblurring process is performed by using the ANN adapted to improve video quality, the image of FIG. 26A may be the same as the image of FIG. 26C. That is, the image of FIG. 26A may be restored like the image of FIG. 26C. Therefore, the object recognition rate may be improved to 82%.

Figure 27A:
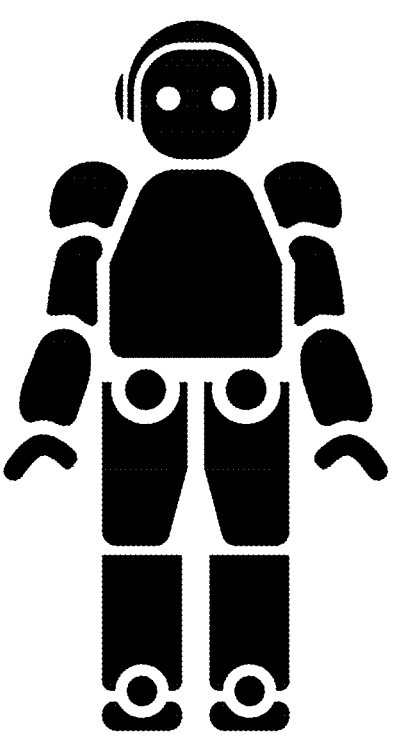
FIGS. 27A and 27B are exemplary diagrams respectively illustrating a robot as an edge device and an autonomous driving vehicle as the edge device.
Figure 27B:
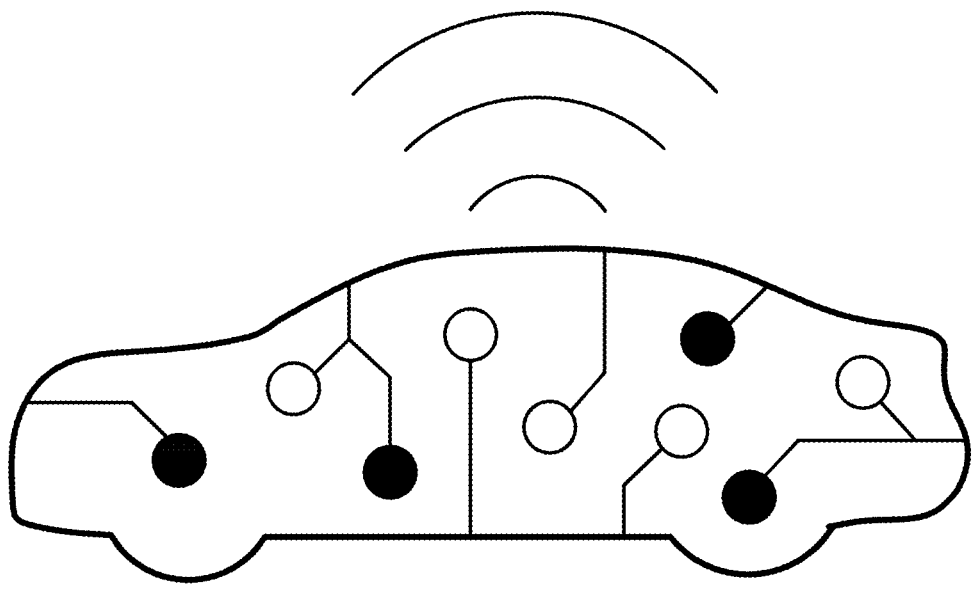

FIG. 27A illustrates an example of a robot as an edge device, and FIG. 27B illustrates an example of an autonomous driving vehicle as the edge device.

FIG. 27A shows the edge device is a two-legged walking robot. However, unlike this, the edge device may be a four-legged walking robot or a robot with wheels. Further, FIG. 27B illustrates that the edge device is a vehicle. However, unlike this, the edge device may be commercial vehicles, such as a truck or a bus.

Figure 28A:
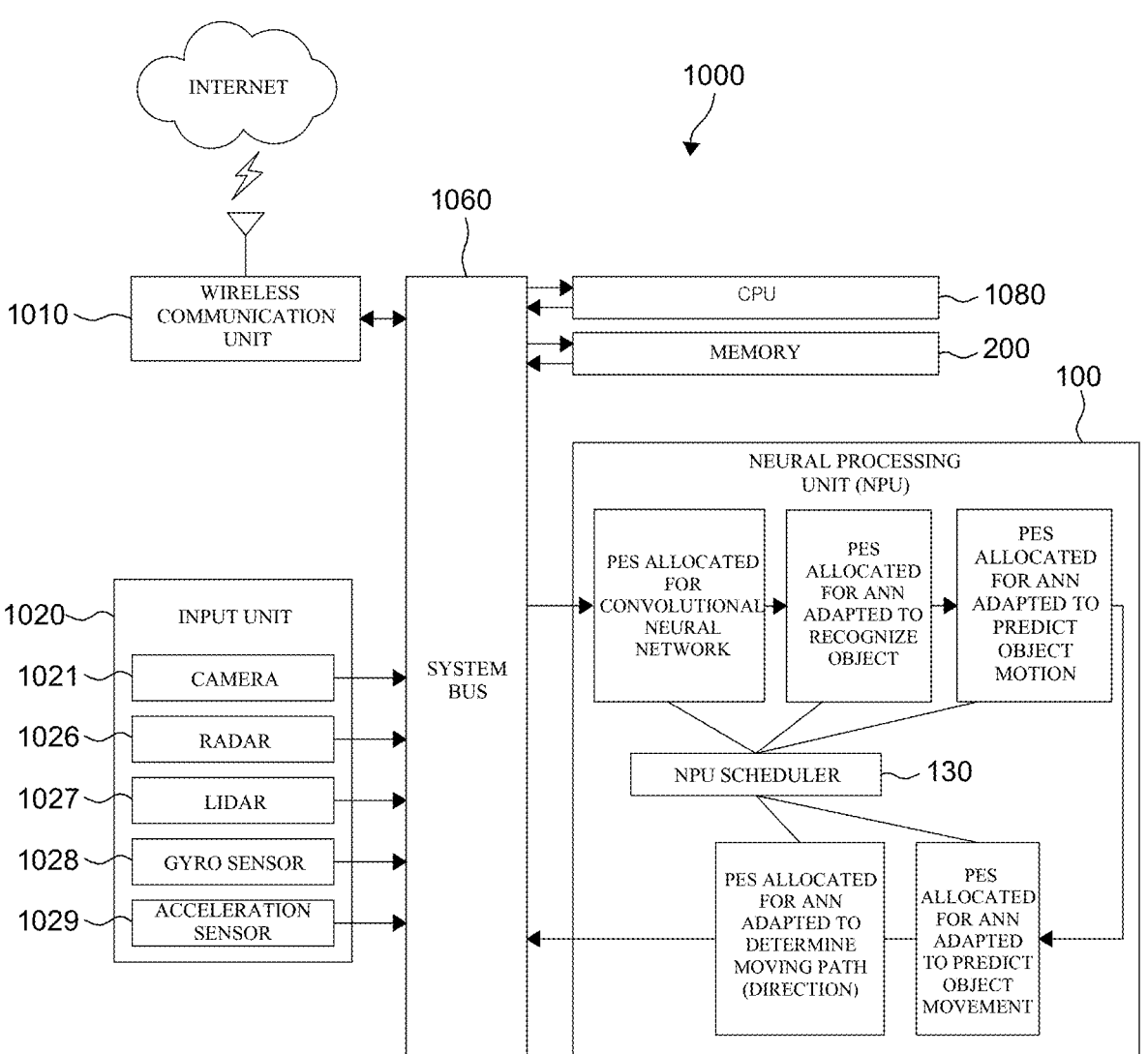
FIG. 28A is an exemplary block diagram illustrating a configuration of the edge device of FIG. 27A or 27B.

FIG. 28A illustrates a configuration of the edge device of FIG. 27A or 27B.

Referring to FIG. 28A, a robot or an autonomous driving vehicle as an example of the edge device 1000 may include the NPU 100, the memory 200, the wireless communication unit 1010, the input unit 1020, the system bus 1060, and the CPU 1080 of FIG. 1 or 3.

The input unit 1020 may include at least one of the camera 1021, the radar 1026, the LiDAR 1027, the gyro sensor 1028, and the acceleration sensor 1029.

The memory 200 may include an ANN model storage unit and a combination information storage unit of the ANN models.

The NPU 100 may perform computations for a plurality of ANNs required for the edge device. For example, the plurality of ANNs required for the edge device may include at least one of a CNN, an ANN adapted to recognize object, an ANN adapted to predict a motion of the object, an ANN adapted to predict an object movement path, and an ANN adapted to determine a moving path (direction).

The NPU scheduler 130 of the NPU 100 may allocate computations for the plurality of ANNs to PEs. That is, the computations for a first ANN may be allocated to a first group of PEs and the computations for a second ANN may be allocated to a second group of PEs. Specifically, the NPU scheduler 130 may allocate computations for the CNN to the first group of PEs, allocate computations for the ANN adapted to recognize object to the second group of PEs, allocate the ANN adapted to predict the motion of the object to a third group of PEs, allocate ANN adapted to predict the object movement path to a fourth group of PEs, and allocate ANN adapted to determine the moving path (direction) to a fifth group of PEs.

Figure 28B:
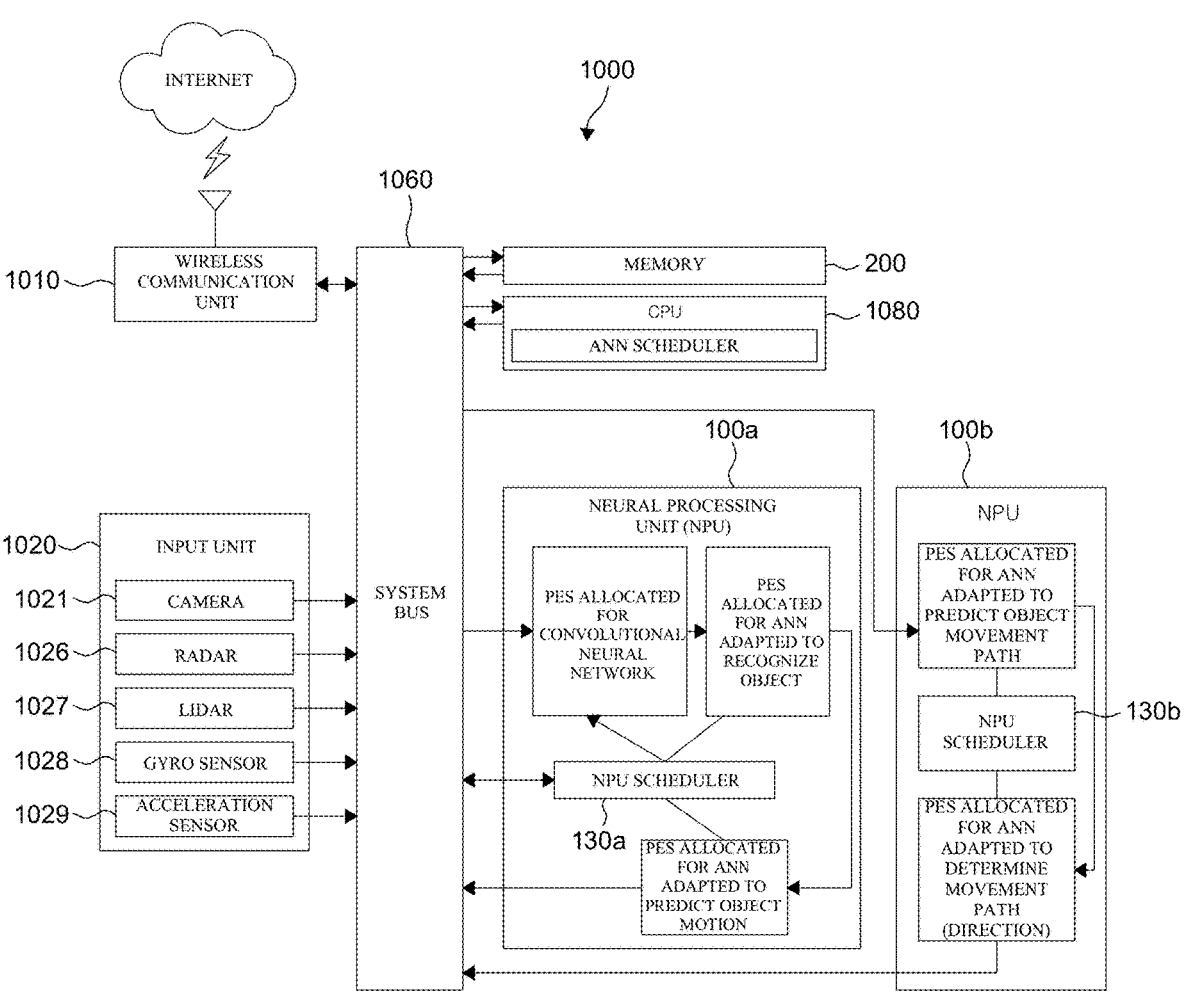
FIG. 28B is a block diagram illustrating a modification of FIG. 28A.

FIG. 28B illustrates a modification of FIG. 28A.

The edge device 1000 of FIG. 28B may include a plurality of NPUs, for example, two NPUs 100*a* and 100*b*, unlike FIG. 28A.

The input unit 1020 may include at least one of the camera 1021, the radar 1026, the LiDAR 1027, the gyro sensor 1028, and the acceleration sensor 1029.

The memory 200 may include an ANN model storage unit and a combination information storage unit of ANN models.

The CPU 1080 may acquire combination information on the ANN models from the memory 200. The CPU 1080 may acquire information on a plurality of ANN models from the memory 200 based on the acquired combination information.

Thereafter, the CPU 1080 may allocate the first ANN model to the first group of PEs and allocate the second ANN model to the second group of PEs.

In the allocation by the CPU 1080 as an example, FIG. 28B illustrates the first NPU 100*a* including the first group of PEs for performing the computation for the CNN, the second group of PEs for performing the computation for the ANN adapted to recognize object, and the third group of PEs for performing the computation for ANN adapted to predict the object motion. In addition, FIG. 28B shows that the second NPU 100*b* may include a fourth group of PEs for performing computations for an ANN adapted to predict an object movement path and a fifth group of PEs for performing computations for an ANN adapted to determine a moving path (direction). However, this is only an example, and the type or number of neural networks performed by the first NPU 100*a* and the second NPU 100*b* may be freely modified.

Hereinafter, the allocation will be described with reference to FIGS. 28A and 28B together.

A robot or an autonomous driving vehicle as an example of the edge device 1000 may transmit a video captured through the camera 1021 to the CPU 1080. The captured video may be transmitted to the CPU 1080 after being temporarily stored in the memory 200.

The CNN may perform a convolution computation on the image captured through the camera 1021 to extract a feature and then transmit the extracted feature to the ANN adapted to recognize object. The ANN adapted to recognize object may recognize a plurality of objects in the image.

The plurality of objects recognized in the image may be tracked by the radar 1026 and/or the LiDAR 1027.

The ANN adapted to predict the object motion and ANN adapted to predict the object movement path may predict the motion and/or the movement path of the objects tracked by the radar 1026 and/or the LiDAR 1027.

The ANN adapted to determine moving path (direction) may infer a moving path (direction) capable of avoiding the object by the robot or the autonomous driving vehicle based on the motion and/or moving path of the predicted objects.

The CPU 1080 may move the robot or the autonomous driving vehicle to a path (or direction) output from ANN adapted to determine the moving path (direction).

Figure 29A:
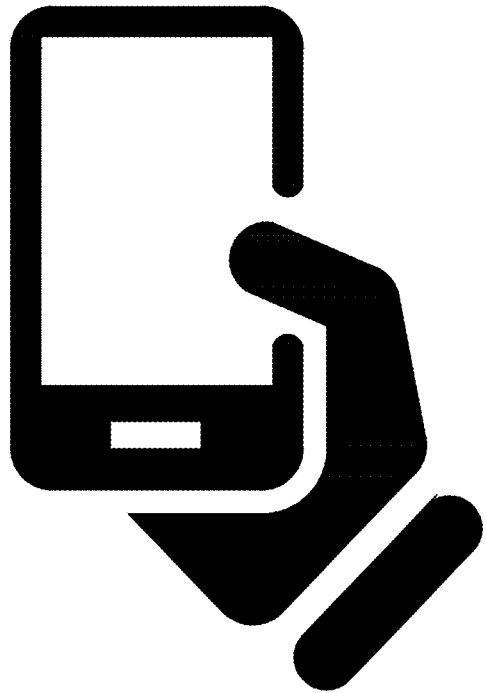
FIGS. 29A-29F are exemplary diagrams respectively illustrating the edge device embodied as a smartphone, a wearable device, a smart speaker, a television, and household appliances (e.g., a refrigerator and a washing machine)
Figure 29B:
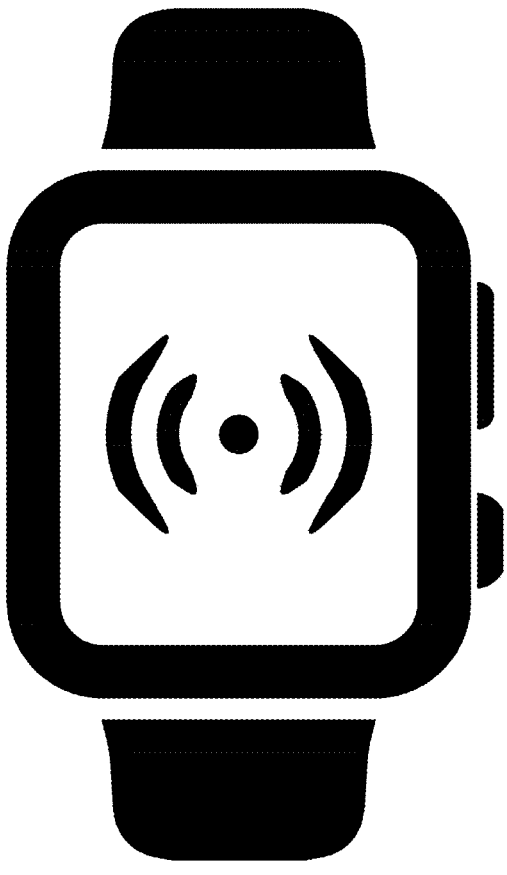
Figure 29C:
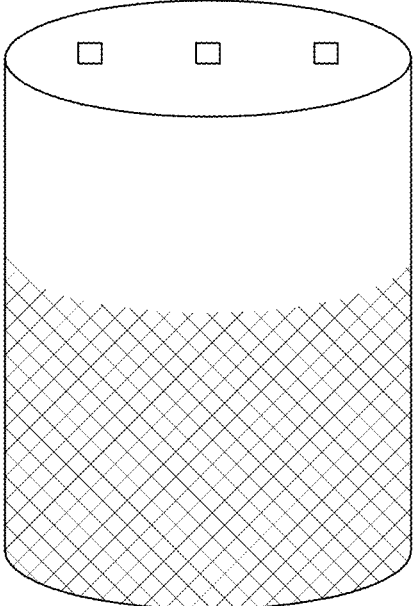
Figure 29D:
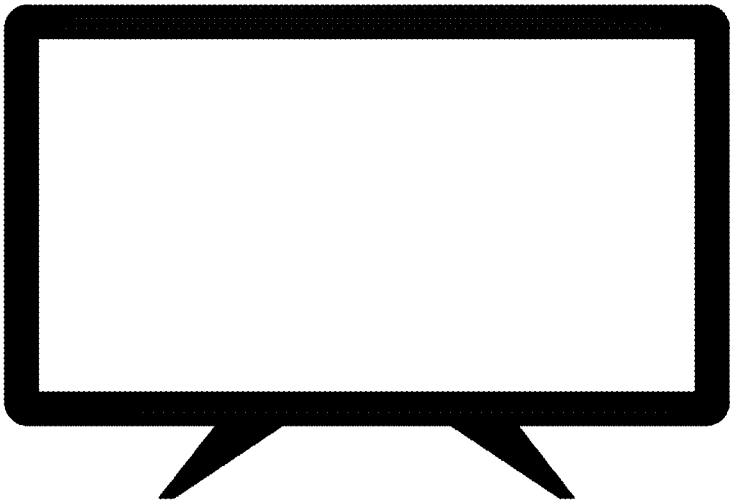
Figure 29E:
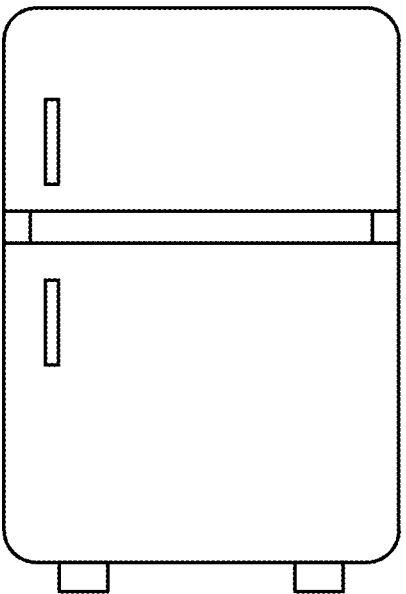
Figure 29F:
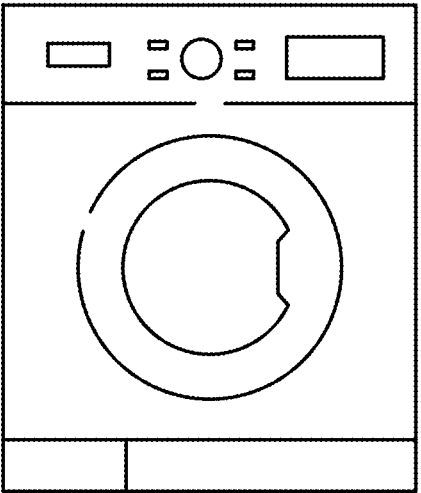

FIG. 29A illustrates an example of a smartphone as an edge device, FIG. 29B illustrates an example of a wearable device as the edge device, FIG. 29C illustrates an example of a smart speaker as the edge device, FIG. 29D illustrates an example of a television as the edge device, FIG. 29E illustrates an example of a refrigerator which is a household appliance as the edge device, and FIG. 29F illustrates an example of a washing machine which is a household appliance as the edge device.

As illustrated in the drawings, the edge device may be various electronic products to be used by the user. For example, the edge device may be user equipment such as a tablet, a notebook, or a laptop computer in addition to the illustrated smartphone or wearable device. As another example, the edge device may be a microwave oven, a boiler, an air conditioner, etc., in addition to the household appliances illustrated.

Figure 30A:
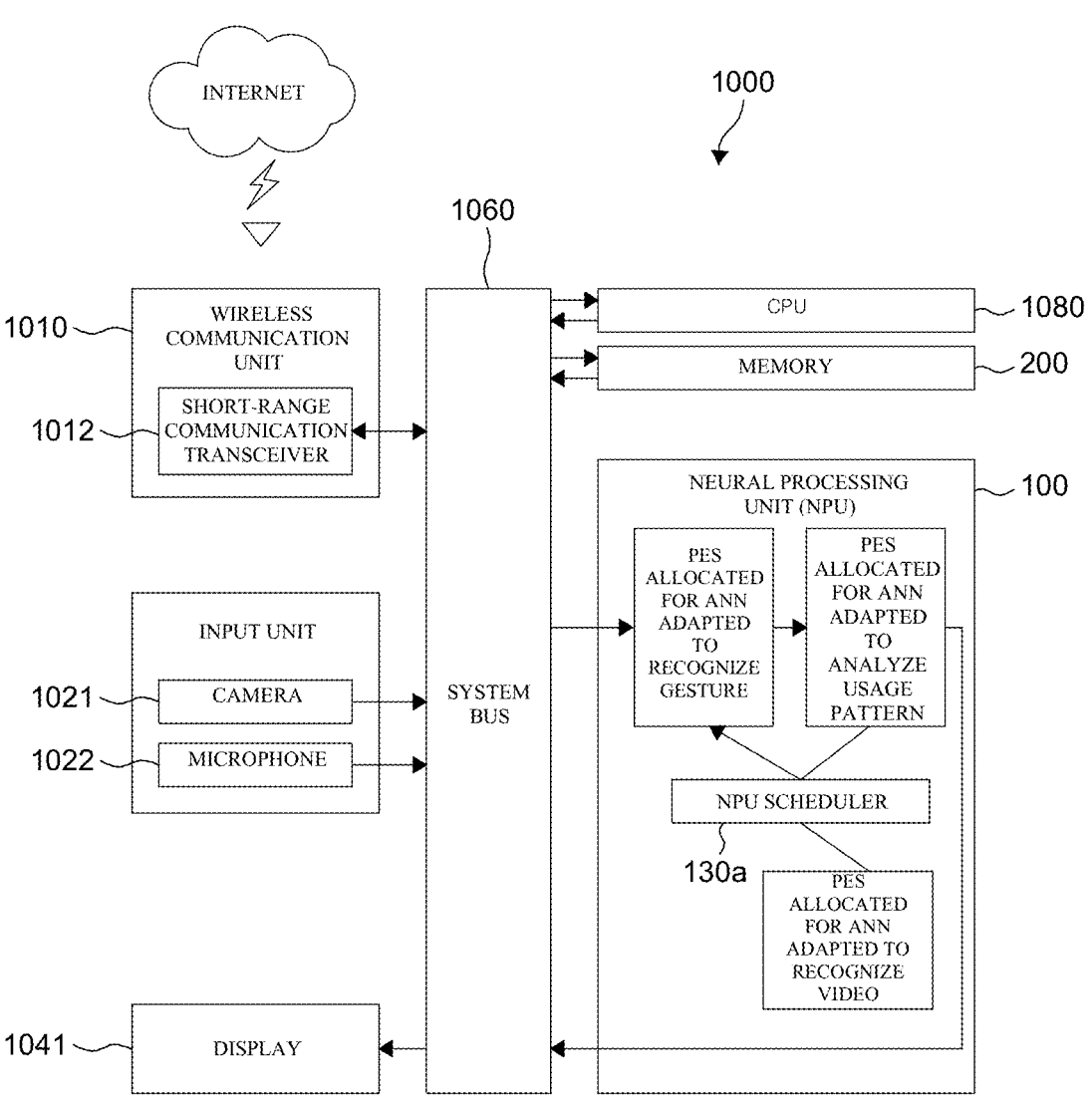
FIG. 30A is an exemplary block diagram illustrating a configuration of the edge device of FIG. 29A to 29F.

FIG. 30A illustrates a configuration of the edge device of FIG. 29A to 29F.

As can be seen with reference to FIG. 30A, the edge device 1000 of FIGS. 29A to 29F may include the NPU 100, the memory 200, the wireless communication unit 1010, the input unit 1020, the system bus 1060, and the CPU 1080 of FIG. 1 or 3.

The input unit 1020 may include at least one of the camera 1021 and the microphone 1022.

The memory 200 may include an ANN model storage unit and a combination information storage unit of ANN models.

The NPU 100 may perform computations for a plurality of ANNs required for the edge device. For example, the plurality of ANNs required for the edge device may include at least one of an ANN adapted to recognize gesture, an ANN adapted to analyze a usage pattern, and an ANN adapted to recognize voice.

The NPU scheduler 130 of the NPU 100 may allocate computations for the plurality of ANNs to PEs. That is, the computations for a first ANN may be allocated to a first group of PEs and the computations for a second ANN may be allocated to a second group of PEs. Specifically, the NPU scheduler 130 may allocate computations for the ANN adapted to recognize gesture to the first group of PEs, allocate computations for an ANN adapted to analyze a usage pattern to the second group of PEs, and allocate the ANN adapted to recognize voice to a third group of PEs.

Figure 30B:
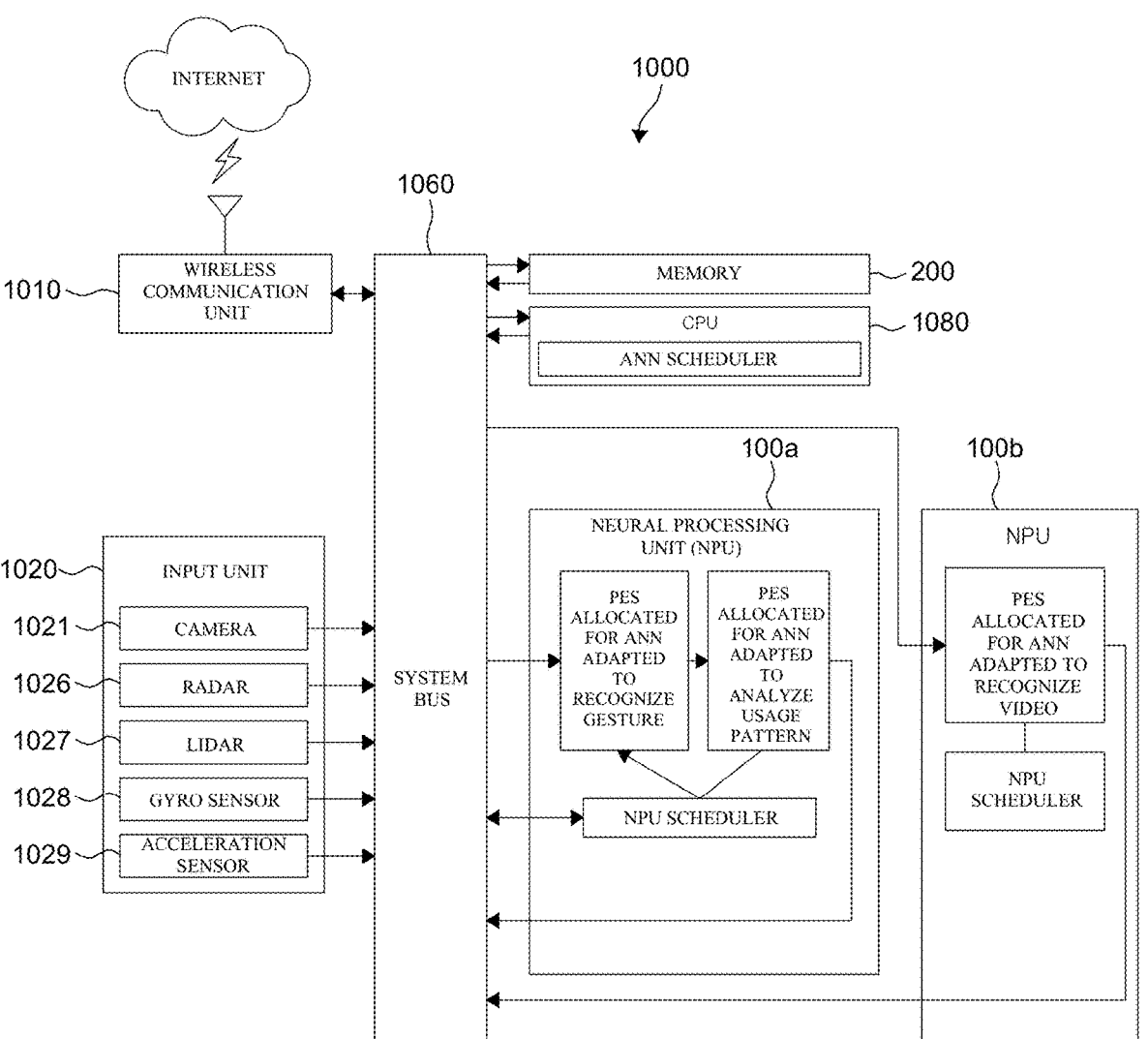
FIG. 30B is a block diagram illustrating a modification of FIG. 30A.

FIG. 30B illustrates a modification of FIG. 30A.

The edge device 1000 of FIG. 30B may include a plurality of NPUs, for example, two NPUs 100a and 100b, unlike FIG. 30A.

The input unit 1020 may include at least one of the camera 1021 and the microphone 1022.

The memory 200 may include an ANN model storage unit and a combination information storage unit of ANN models.

The CPU 1080 may acquire combination information on ANN models from the memory 200. The CPU 1080 may acquire information on a plurality of ANN models from the memory 200 based on the acquired combination information.

Thereafter, the CPU 1080 may allocate the first ANN model to the first group of PEs and allocate the second ANN model to the second group of PEs.

In the allocation by the CPU 1080 as an example, FIG. 28B illustrates the first NPU 100a including a first group of PEs for performing computations for the ANN adapted to recognize gesture and a second group of PEs for performing computations for an ANN adapted to analyze a usage pattern. FIG. 28 also shows that the second NPU 100b may include a third group of PEs for performing computations for the ANN adapted to recognize voice. However, this is only an example, and the type or number of ANNs performed by the first NPU 100a and the second NPU 100b may be freely modified.

Hereinafter, this will be described with reference to FIGS. 30A and 30B together.

Hereinafter, for convenience of the description, an example of performing inference through an ANN based on a signal input through the camera 1021 and the microphone 1022 will be described.

The ANN adapted to recognize voice may be learned to infer keywords based on an acoustic signal received from the microphone 1022. The ANN adapted to recognize gesture may be learned to infer a user's gesture based on a video signal in response to the keyword inference result.

At this time, the ANN adapted to recognize voice may be an ANN learned to recognize only specific keywords. For example, the specific keywords may include simple keyword commands such as "Alexa," "Hey Siri," "Volume up," "Volume Down," "Search," "Turn on," "Turn off," "Internet," "Music," and "Movie." For example, the specific keywords may be one or more of a hundred frequently used keyword commands.

The ANN adapted to recognize gesture may be an ANN learned to recognize only a specific gesture. For example, the specific gestures may be specific a hand gesture, a body gesture, a facial expression, etc.

The ANN adapted to analyze a usage pattern may analyze patterns of the user using the edge device 1000 based on a usage pattern of the user, that is, user's voice or gesture. Depending on the analyzed pattern, the edge device 1000 may recommend multiple proposals to the user.

The edge device 1000 may be switched to a second mode from a first mode by the inference result. The first mode is a low-power mode, that is, a standby mode, and the second mode may be a gesture mode.

The CPU 1080 may control the edge device 1000 to be in the second mode by receiving the inference result of the ANN adapted to recognize voice. The CPU 1080 may be configured to supply power to the camera 1021 in the second mode. In the second mode, the ANN adapted to recognize gesture may perform the inference computation.

The NPU 100 of the edge device 1000 may operate in an independent mode or a stand-alone mode. That is, the edge device 1000 may perform an ANN-based inference computation by itself by using the NPU 100 without receiving a cloud AI service through the Internet. If the edge device 1000 receives an ANN inference service from a cloud computing-based server through the wireless communication unit 1010, the edge device 1000 stores data of the camera 1021 and the microphone 1022 for inference in the memory 200 and then needs to transmit the data through the wireless communication unit 1010. There is a disadvantage that this causes a time latency and increases power consumption.

However, according to the present disclosure, since the edge device 1000 includes the NPU 100 capable of independently operating, it is possible to shorten the time latency and reduce the power consumption.

In addition, the voice signal and the video signal may include private data. If the edge device continuously transmits a video captured by the conversation or the private life of the user through the wireless communication unit 1010, an invasion problem of privacy may occur.

Therefore, the edge device 1000 may perform the ANN-based inference computation on signals of the input unit 1020 in which privacy data may be included, by itself by using the NPU 100 and then delete the privacy data. That is, the video signal and the acoustic signal in which the privacy data may be included may be deleted after the inference computation by the NPU 100.

In addition, the edge device 1000 may block transmitting the signals of the input unit 1020 in which the privacy data may be included through the wireless communication unit 1010.

In addition, the edge device 1000 may not store the signals of the input unit 1020 in which the privacy data may be included in the memory 200.

In addition, the edge device 1000 may classify the signals of the input unit 1020 in which the privacy data may be included as data in which the privacy data is included.

According to the aforementioned configurations, the edge device 1000 has an effect of providing convenience to users and blocking a privacy data leakage problem while reducing power consumption.

Figure 31A:
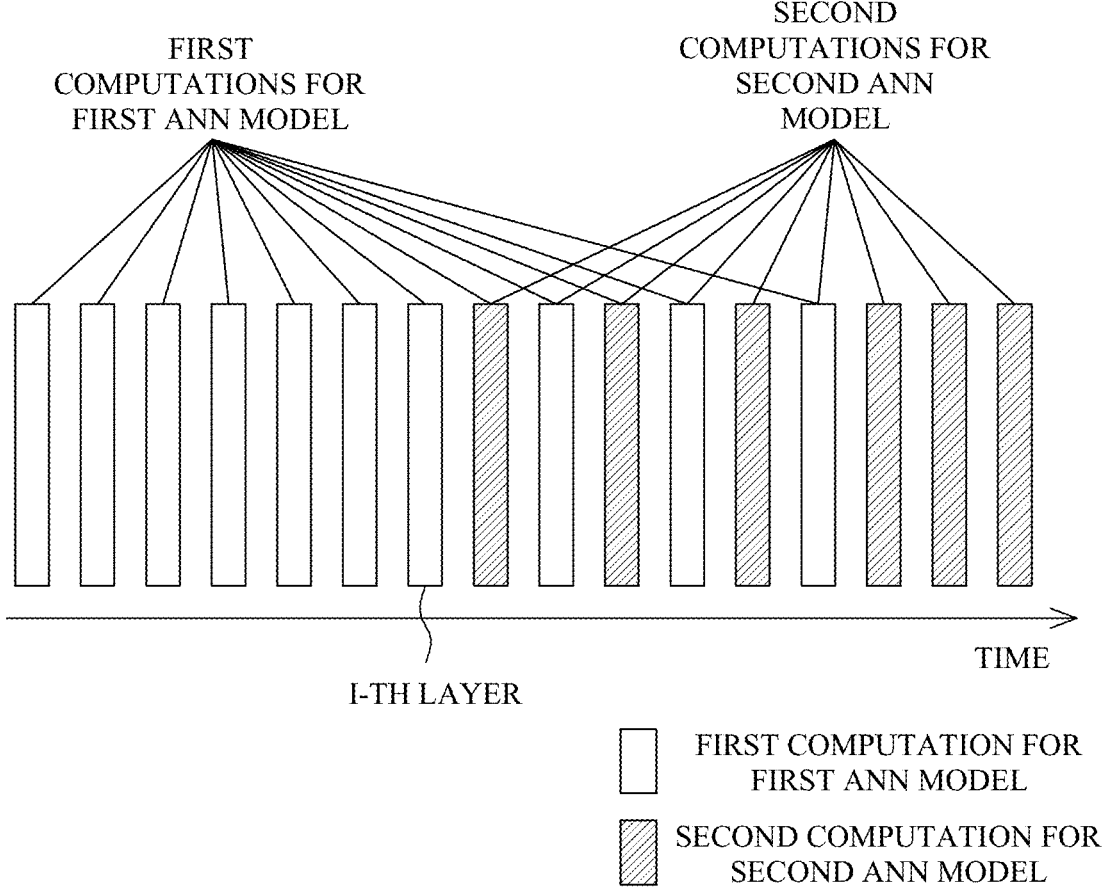
FIG. 31A is an exemplary diagram illustrating computations that are performed for a plurality of artificial neural network models.

FIG. 31A illustrates an example in which computations for a plurality of ANN models are performed.

As can be seen with reference to FIG. 31A, the first computations for the first ANN model are performed. When a computation of an ith layer of the first ANN model is performed, the second computations for the second ANN model may start. As illustrated in FIG. 31, the first computations for the first ANN model and the second computations for the second ANN model may be performed in time division.

Figure 31B:
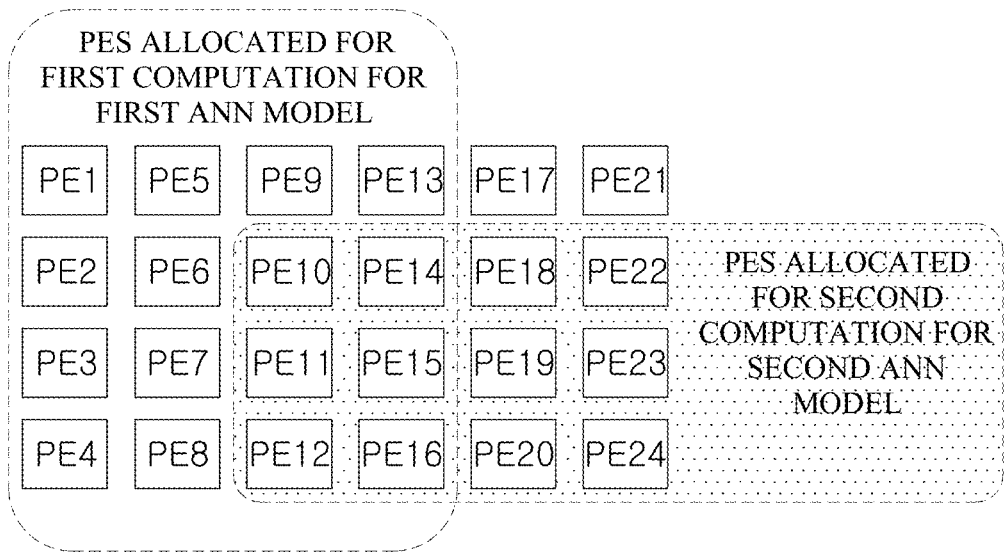
FIG. 31B is an exemplary diagram illustrating PEs to which computations of a plurality of artificial neural network models are allocated.

FIG. 31B illustrates PEs to which computations of a plurality of ANN models are allocated.

FIG. 31B illustrates that a total of 24 PEs from PE1 to PE24 are present as an example. The PEs allocated for the first computation for the first ANN model may be a total of sixteen from PE1 to PE16. The PEs allocated for the second computation for the second ANN model may be a total of twelve as PE10, PE11, PE14, PE15, PE16, PE18, PE19, PE20, PE22, PE23, and PE24.

Referring to FIGS. 31A and 31B together, for the computation for the first ANN model, a total of sixteen PEs from PE1 to PE16 may be allocated. Then, when the computation for the ith layer of the first ANN model is performed, among PE1 to PE16, PE10, PE11, PE14, PE15 and PE16 may be reallocated for the computation for the second ANN model. That is, the subsequent computations for the first ANN model may be performed by only the remaining PEs, that is, PE1, PE2, PE3, PE4, PE5, PE6, PE7, PE8, PE9, and PE13.

As illustrated in the drawing, the first computations for the first ANN model and the second computations for the second ANN model may be performed in parallel or in a time division manner.

In addition, as illustrated in the drawing, the first group of PEs allocated for the computations for the first ANN model and the second group of PEs allocated for the computations for the second ANN model may be partially the same as or completely different from each other.

In FIG. 31A, it is illustrated that when the computation for the ith layer of the first ANN model is performed, the second computation for the second ANN model starts, but unlike this, other modifications are possible. For example, the second computation for the second ANN model may start based on information on a computation order of the plurality of ANNs.

The information on the computation order may include at least one of information on a layer, information on a kernel, information on a processing time, information on a remaining time, and information on a clock.

The information on the layer may indicate an ith layer among all layers of the first ANN model. The computations for the second ANN model may start after the computation for the ith layer of the first ANN model starts.

The information on the kernel may indicate a kth kernel among all kernels of the first ANN model. The computations for the second ANN model may start after the computation for the kth kernel of the first ANN model starts.

The information on the processing time may indicate an elapsed time after performing the computation for the first ANN model. The computation for the second ANN model may start after the elapsed time.

The information on the remaining time may indicate a time which remains until the computations of the first ANN model are completed. The computation for the second ANN model may start before reaching the remaining time.

The embodiments of the present disclosure illustrated in the present specification and the drawings are just to provide specific examples to easily describe the technical contents of the present disclosure and help the understanding of the present disclosure and are not intended to limit the scope of the present disclosure. In addition to the embodiments described above, it will be apparent to those skilled in the art that other modifications can be implemented.

[National R&D Project Supporting this Invention]
    [Task Identification Number] 1711117015
    [Task Number] 2020-0-01297-001
    [Name of Ministry] Ministry of Science and ICT
    [Name of Project Management (Specialized) Institution]
       Institute of Information & Communications Technology Planning & Evaluation
    [Research Project Title] Next-generation Intelligent Semiconductor Technology Development (Design) (R&D)
    [Research Task Title] Technology Development of a Deep Learning Processor Advanced to Reuse Data for Ultra-low Power Edge
    [Contribution Rate] 1/1
    [Name of Organization Performing the Task] DeepX Co., Ltd.
    [Research Period] 2020.04.01~2020.12.31

What is claimed is:

1. A neural processing unit (NPU) comprising:
at least one internal memory for storing information on combinations of a plurality of artificial neural network (ANN) models, the plurality of ANN models including a first ANN model and a second ANN model;
a first circuitry provided for a plurality of processing elements (PEs), each of which includes a multiplier, an adder and an accumulator,
a second circuitry provided for a scheduler operably configurable to
    divide the plurality of PEs into a first group of PEs and a second group of PEs, based on an instruction related to information on an operation sequence of the plurality of ANN models,
    allocate to the first group of PEs a part of first operations for the first ANN model, and
    allocate to the second group of PEs a part of second operations for the second ANN model,
wherein operations of the second ANN model are initiated before completing operations of the first ANN model, and
wherein the scheduler is further configured to:
    reuse memory addresses in the at least one internal memory for intermediate computation results to improve memory reuse rate, and
    perform zero-skipping operations to reduce unnecessary computations.

2. The NPU of claim 1, wherein each of the allocations by the scheduler is further based on ANN data locality information.

3. The NPU of claim 1, wherein the first operations for the first ANN model and the second operations for the second ANN model are performed in parallel or in a time division.

4. The NPU of claim 1, wherein the first group of PEs includes at least one PE that is different from the second group of PEs.

5. The NPU of claim 4, wherein the first group of PEs includes at least one PE that coincides with the second group of PEs.

6. The NPU of claim 1, wherein the information on the operation sequence includes at least one of:

information on a layer, information on a kernel, information on a processing time, information on a remaining time, and information on a clock.

7. The NPU of claim 6, wherein the information on the layer represents an ith layer among all layers of the first ANN model, and wherein the second ANN model is initiated after the ith layer of the first ANN model is initiated.

8. The NPU of claim 6, wherein the information on the kernel represents a kth kernel among all kernels of the first ANN model, and wherein the second ANN model is initiated after the kth kernel of the first ANN model is used.

9. The NPU of claim 6, wherein the information on the processing time represents a time elapsed after performing operations of the first ANN model, and wherein the second ANN model is initiated after the elapsed time.

10. The NPU of claim 6, wherein the information on the remaining time represents a time remaining until completing operations of the first ANN model, and wherein the second ANN model is initiated before reaching the remaining time.

11. The NPU of claim 1, wherein the information on the operation sequence of the plurality of ANN models is stored in the at least one internal memory.

12. The NPU of claim 1, wherein the scheduler generates the instruction based on the information on the operation sequence of the plurality of ANN models.

13. The NPU of claim 1, wherein the NPU is mounted in an edge device, and wherein the edge device comprises a memory and a central processing unit (CPU) configured to execute commands for an application.

14. The NPU of claim 13, wherein the memory of the edge device is configured to store the information on the operation sequence of the plurality of ANN models.

15. The NPU of claim 13, wherein the CPU of the edge device generates the instruction when the CPU executes the commands for the application.

16. An edge device comprising:

a system bus;

a memory electrically connected to the system bus;

a central processing unit (CPU) electrically connected to the system bus, the CPU being configured to access the memory via the system bus and execute commands for an application; and a plurality of neural processing units (NPUs) electrically connected to the system bus, the plurality of NPUs including a first NPU and a second NPU, each NPU including:

at least one internal memory for storing information on combinations of a plurality of artificial neural network (ANN) models, the plurality of ANN models including a first ANN model and a second ANN model, a plurality of processing elements (PEs), each of which includes a multiplier, an adder and an accumulator, and a scheduler operably configurable to divide the plurality of PEs into a first group of PEs and a second group of PEs, based on an instruction related to information on an operation sequence of the plurality of ANN models, wherein a part of first operations for the first ANN model is allocated to the first NPU or to the first group of PEs in the first NPU, wherein a part of second operations for the second ANN model is allocated to the second NPU or to the second group of PEs in the first NPU, wherein operations of the second ANN model are initiated before completing operations of the first ANN model, and wherein the scheduler is further configured to:

reuse memory addresses in the at least one internal memory for intermediate computation results to improve memory reuse rate, and perform zero-skipping operations to reduce unnecessary computations.

17. The edge device of claim 16, wherein the first operations for the first ANN model and the second operations for the second ANN model are performed in parallel or in a time division.

18. The edge device of claim 16, wherein the first group of PEs includes at least one PE that is different from the second group of PEs.

19. The edge device of claim 18, wherein the first group of PEs includes at least one PE that coincides with the second group of PEs.

* * * * *